United States Patent Office 3,338,928
Patented Aug. 29, 1967

---

3,338,928
FUSED HALOCYCLOPROPYL STEROIDS
Colin C. Beard, Portola Valley, Calif., and Alexander D. Cross, Mexico City, Mexico, assignors to Syntex Corporation, Panama, Panama, a corporation of Panama
No Drawing. Filed Sept. 9, 1965, Ser. No. 486,226
22 Claims. (Cl. 260—397.4)

This invention relates to chemical processes useful in the preparation of novel steroids and to the steroids thus produced.

In particular, the process of this invention involves the formation of a fused halocyclopropyl group in various steroid nuclei through the addition of a mono- or dihalomethylene group, each halogen atom being chloro or fluoro, across a double bond in conjugation with a keto group. The keto group may be in substantially any position of the steroid nucleus, the most significant being the 3- and 20-position of a pregnane, 19-nor pregnane or 9β, 10α-pregnane, the 3- and 17-position of an estrane or 18-methylestrane, the 3- and 17-position of an androstane. Adjacent to the carbonyl carbon is a conjugated system of one or more double bonds. In the latter case; addition occurs predominantly at the double bond most remote to the keto group.

The process of this invention comprises the treatment of a keto steroid, having a conjugated system of unsaturation but no unconjugated unsaturation, with a molar excess of an alkali metal or alkaline earth metal salt of an acid having the formula W—CXY—COOH, in which W is chloro, iodo, or bromo, X is chloro or fluoro and Y is hydrogen, chloro or fluoro. Suitable acids include bromochloroacetic acid, dichloroacetic acid, trichloroacetic acid, chlorofluoroacetic acid, dichlorofluoroacetic acid and the like. Preferably the salt employed is an alkali metal salt such as those of potassium, lithium, or particularly sodium. The use of a dihaloacetate results in the formation of a fused monohalocyclopropyl grouping whereas the dihalocyclopropyl group is formed via the use of a trihaloacetate.

The reaction is performed at temperatures above that at which the salt decomposes, as evidenced by the evolution of carbon dioxide, the specific temperature depending upon the particular polyhaloacetate and steroid employed. Thus in the case of sodium trichloroacetate, a reaction temperature from 80° C. to 150° C. is generally used whereas with sodium chlorodifluoroacetate, a temperature from 150° C. to 180° C. is employed. The reaction is preferably effected in the presence of an inert, nonaqueous, organic solvent which is sufficiently polar to dissolve the polyhaloacetate. When the reaction is conducted in the conventional manner at atmospheric pressure, the solvent is selected so that its boiling point is at or above the reaction temperature of the polyhaloacetate, with the reaction being carried out at or below the reflux temperature. Alternatively the reaction can be conducted under suitable pressure to permit the use of lower boiling solvents. Particularly useful solvents are hydrocarbon polyethers such as dimethoxyethane, dimethyl diethylene glycol ether, dimethyl triethylene glycol ether, and the like. Other solvents include dimethylformamide, dioxane, dimethylsulfoxide, and the like. The reaction time will also vary depending upon the selection of solvent and reagents but may be followed through observation of the ultraviolet absorption spectra, the reaction involving the loss of keto-conjugated unsaturation. Isolation of the product is accomplished via conventional procedures such as chromatography.

Examples of some transformations which result through the use of this process may be diagrammatically represented as follows, employing only those portions of the steroid molecule which are involved:

A-Ring Additions

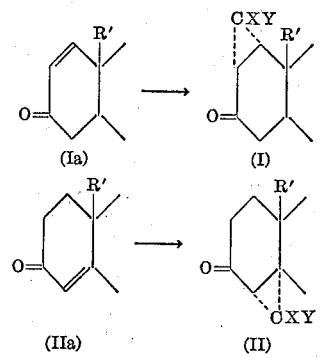

B-Ring Additions

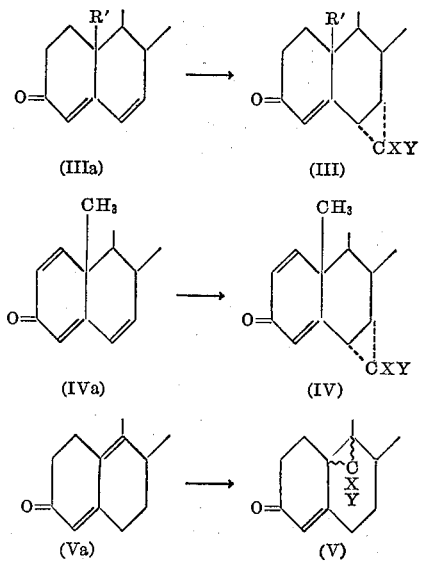

C-Ring Addition

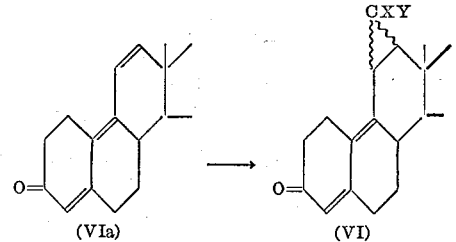

D-Ring Additions

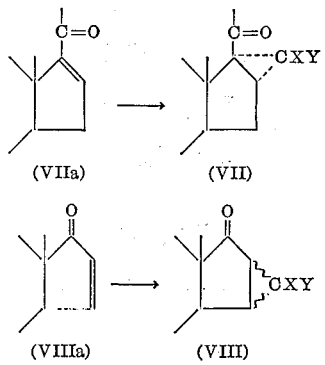

In the foregoing transformations, X and Y are as defined above and $R^1$ is hydrogen or methyl. A wavy line ⸾ embraces both α- and β-configurations.

Compounds comprising the structure shown in Formula I may be represented as follows:

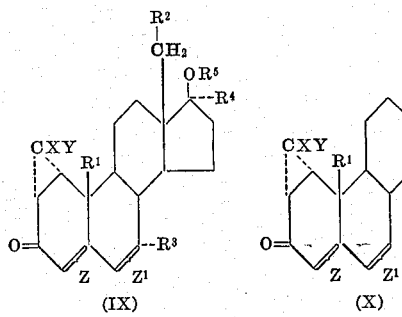

(IX)  (X)

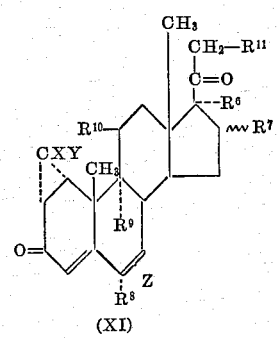

(XI)

In Formulas IX, X, and XI, $R^1$, $R^2$ and $R^3$ each represent hydrogen or methyl;

$R^4$ represents hydrogen or an aliphatic hydrocarbon group, such as alkyl, alkenyl or alkynyl, including haloalkynyl, of 6 or less carbon atoms;

$R^5$ represents hydrogen, tetrahydropyranyl, or a hydrocarbon carboxylic acyl group of less than 12 carbon atoms;

$R^6$ represents hydrogen, hydroxy or a hydrocarbon carboxylic acyloxy group of less than 12 atoms;

$R^7$ represents hydrogen, methylene, α-methyl, β-methyl, α-fluoro, α-chloro, α-hydroxy, hydrocarbon carboxylic acyloxy group of less than 12 carpon atoms, or when taken together with $R^6$, the group

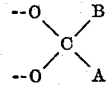

in which A is hydrogen or alkyl of up to 8 carbon atoms and B is hydrogen, or alkyl or aryl of up to 8 carbon atoms;

$R^8$ represents hydrogen, methyl, chloro or fluoro;

$R^9$ represents hydrogen, chloro or fluoro;

$R^{10}$ represents hydrogen, keto, hydroxy, or chloro, $R^9$ being the same as $R^{10}$ when $R^{10}$ is hydrogen or chloro;

$R^{11}$ represents hydrogen, hydroxy, fluoro, chloro, iodo, tetrahydropyranyloxy, phosphato (including mono and dialkalimetal salts thereof), a hydrocarbon carboxylic acyloxy group of less than 12 carbon atoms or when taken together with $R^6$ the group

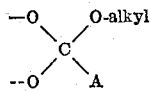

or the group

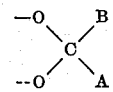

at least one of $R^{10}$ and $R^{11}$ being other than hydrogen;

Each of Z and Z' is a carbon-carbon double bond, or a carbon-carbon single bond, Z being a double bond when Z' is a double bond.

In the foregoing, the hydrocarbon carboxylic acyl and acyloxy groups of less than 12 carbon atoms may be of a straight, branched, cyclic or cyclic-aliphatic chain structure which is saturated, unsaturated, or aromatic and optionally substituted by functional groups such as hydroxy, alkoxy containing up to 5 carbon atoms, acyloxy containing up to 12 carbon atoms, nitro, amino, halogeno, and the like. Typical esters thus including acetate, propionate, enanthate, benzoate, trimethylacetate, t-butylacetate, β-chloropropionate, adamantoate, and the like.

A typical class of compounds comprising the structure shown in Formula II may be represented as follows:

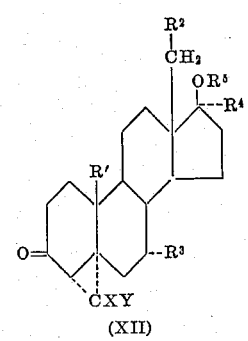

(XII)

Among the classes of compounds comprising the structures shown in Formulas III and IV are the following:

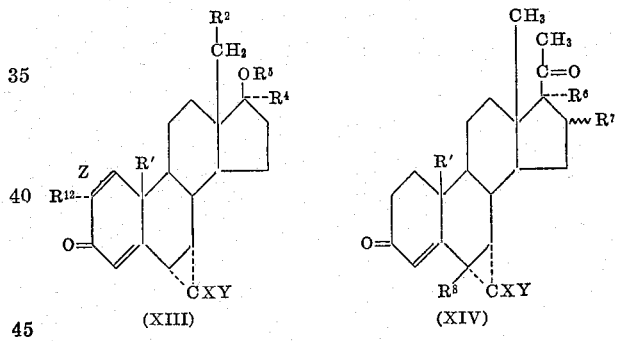

(XIII)  (XIV)

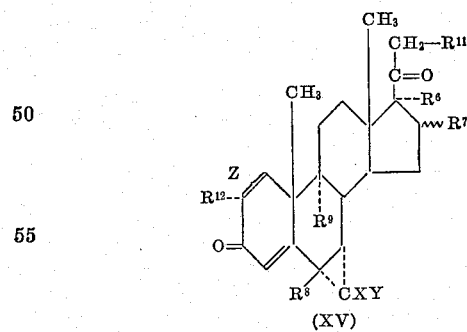

(XV)

A typical class of compounds comprising the structure shown in Formula V are those of the formula:

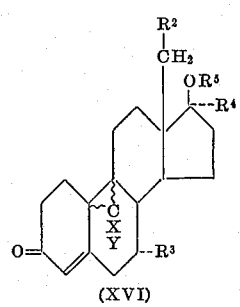

(XVI)

The structure shown in Formula VI may be typified by the class of compounds having the formula:

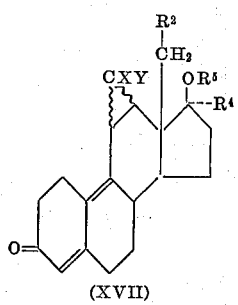

(XVII)

Classes of compounds comprising the structure shown in Formula VII may be typified by the following formulas:

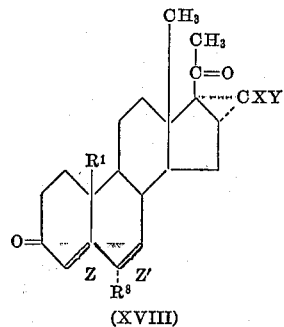

(XVIII)

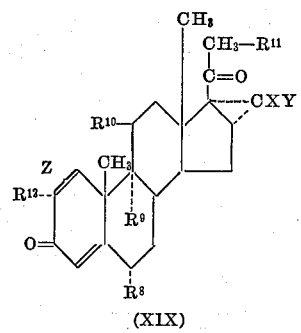

(XIX)

Among the classes of compounds comprising the structure shown by Formula VIII is that represented by the formula:

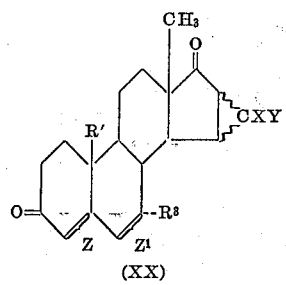

(XX)

In the foregoing formulas $R^1$, $R^2$, $R^3$, $R^4$, $R^5$, $R^6$, $R^7$, $R^8$, $R^9$, $R^{10}$, $R^{11}$, X, Y, Z and Z' have the same meaning heretofore described and $R^{12}$ is hydrogen or methyl.

The reagents and conditions employed in the process of this invention permit highly selective formation of a halocyclopropyl group, the principal restriction on the nature of substituents elsewhere in the molecule being the absence of any non-conjugated unsaturation. In practice, it is also desirable to protect hydroxy groups, as through ester formation, or to utilize a group easily convertible to a hydroxy group such as a keto, ester, or ether group. This preference is not an absolute necessity however, for while free hydroxy groups will generally become involved in side reactions under the conditions of the process, they may be readily regenerated by executing a mild alkaline hydrolysis step after completion of the principal reaction.

The relative stability of the halocyclopropyl group permits a wide selection in chemical procedures which may be used subsequent to the introduction of such group as hereinafter described.

The novel compounds of the present invention of the androstane or estrane series may be prepared by the processes illustrated in the following diagrams:

DIAGRAM A

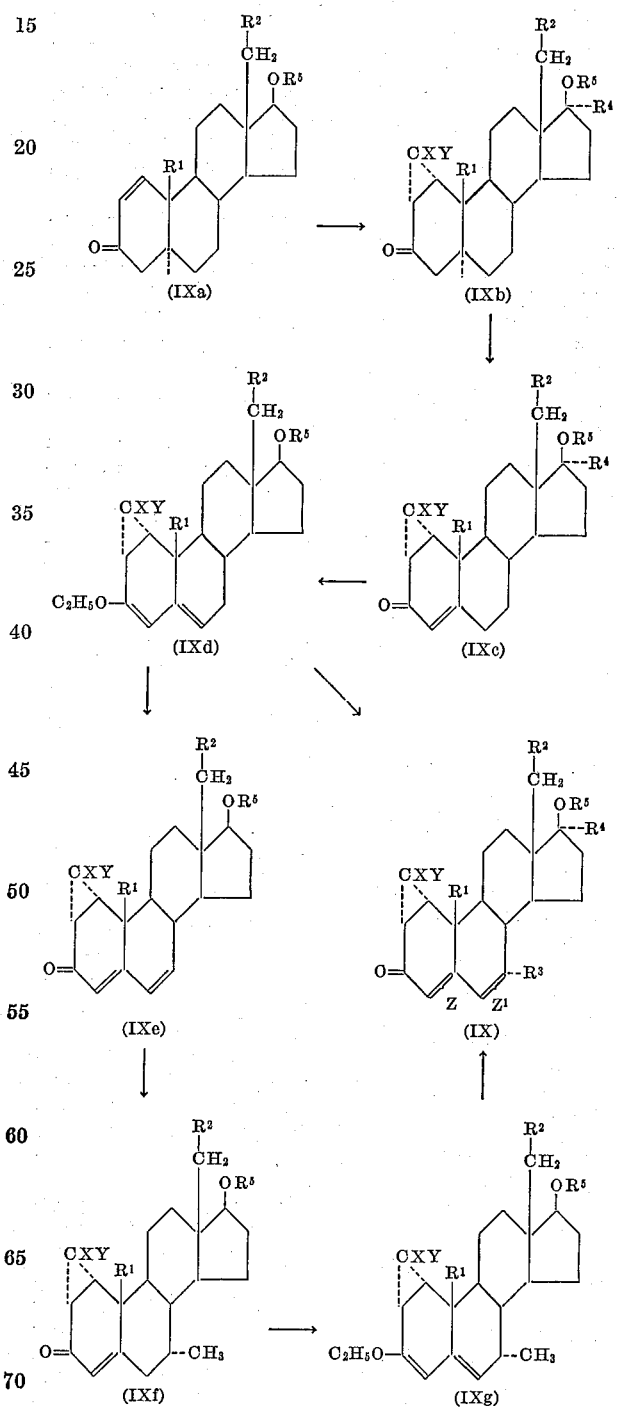

In the above equation $R^1$, $R^2$, $R^3$, $R^4$, $R^5$, X, Y, Z, and Z' have the same meaning as previously set forth and $R^{13}$ represents an aliphatic hydrocarbon of the type described heretofore.

In practicing the process outlined above, a 17β-acyloxy-Δ¹-5α-androsten-3-one (IXa: $R^1$=methyl, $R^2$=hydrogen, $R^5$=acyl) is treated with an alkali metal salt of a polyhaloacetate, such as sodium chlorodifluoroacetate, in an inert, non-aqueous organic solvent of the type described heretofore, to form 1α,2α-difluoromethylene-17β-acyloxy-5α - androstan - 3-one (IXb: $R^1$=methyl, $R^2$=$R^4$=hydrogen, $R^5$=acyl, X=Y=fluorine).

Upon conventional saponification as by treatment with dilute methanolic potassium hydroxide there is formed the corresponding free alcohol, i.e., 1α,2α-difluoromethylene-5α-androstan-17β-ol-3-one.

An aliphatic hydrocarbon grouping can be introduced at C–17α by first protecting the 3-keto group as the cylic ketal in the usual manner, thereafter oxidizing the 17β-hydroxy group preferably with chromic acid in pyridine, followed by treatment with the appropriate Grignard reagent to introduce the desired alkyl, alkenyl or alkinyl group and subsequent treatment with acid to regenerate the 3-keto group.

To prepare the corresponding Δ⁴ compounds, the compounds resulting from the first step (IXb) are conventionally brominated, followed by dehydrobromination as with lithium carbonate or calcium oxide to produce 1α,2α-difluoromethylene-17β-acyloxy testosterone (IXc: $R^1$=methyl, $R^2$=$R^4$=hydrogen, $R^5$=acyl, X=Y=fluorine). Upon conventional saponification as described above, there is formed the corresponding free alcohol, i.e., 1α,2α-difluoromethylene-testosterone.

The 1α,2α-difluoromethylene-testosterone acylate (IXc: $R^1$=methyl, $R^2$=$R^4$=hydrogen, $R^5$=acyl, X=Y=fluorine) is converted in the usual manner into the 3-enol ether (IXd) as by treatment with ethyl orthoformate in mixture with ethanol and dioxane in the presence of p-toluenesulfonic acid. Upon treatment of the thus formed enol ether with 2,3-dichloro-5,6-dicyano-1,4-benzoquinone, there is formed the corresponding 1α,2α-difluoromethylene-17β - acyloxy-Δ⁴,⁶ - androstadien-3-one (IXe: $R^1$=methyl, $R^2$=hydrogen, $R^5$=acyl, X=Y=fluorine).

Treatment of the Δ⁴,⁶-diene with a methyl magnesium halide results in the introduction of a methyl group in a configuration at C–7 with concomitant formation of the free 17β-ol, thus forming 1α,2α-difluoromethylene-7α-methyl testosterone (IXf: $R^1$=methyl, $R^2$=$R^5$=hydrogen, X=Y=fluorine). The latter is then transformed into the 3-enol ether in the usual manner to thus produce 1α,2α-difluoromethylene-3 - ethoxy-7α-methyl-Δ³,⁵-androstadien-17β-ol (IXg: $R^1$=methyl, $R^2$=$R^5$=hydrogen, X=Y=fluorine).

The enol ethers IXd and IXg containing a free 17β-hydroxy group are oxidized, preferably with chromium trioxide, to produce the corresponding 17-ketone, which upon treatment with an alkyl, alkenyl or alkinyl magnesium halide, are transformed into the corresponding 17α-aliphatic-17β-ol derivative. The latter are converted into the corresponding 3-keto-Δ⁴-androstenes (IX: Z=double bond, Z'=single bond) or 3-keto-Δ⁴,⁶-androstadienes (IX: Z=Z'=double bond) through acidic cleavage of the enol ether in the absence or presence of 2,3-dichloro-5,6-dicyano-1,4-benzoquinone.

The 17α-unsubstituted-17β-ols are conventionally esterified in pyridine with an acylating agent, for example, the anhydride of a hydrocarbon carboxylic acid of the type previously defined. The 17α-substituted-17β-ols are conventionally acylated in the presence of p-toluenesulfonic acid with an acylating agent thus giving the corresponding 17β-acylates.

The 17α-unsubstituted and 17α-substituted 17β-ols can be etherified as with dihydropyran in benzene, under substantially anhydrous conditions, in the presence of an acid catalyst such as p-toluenesulfonic acid, boron trifluoride etherate or the like, to afford the corresponding tetrahydropyranyl ether.

DIAGRAM B

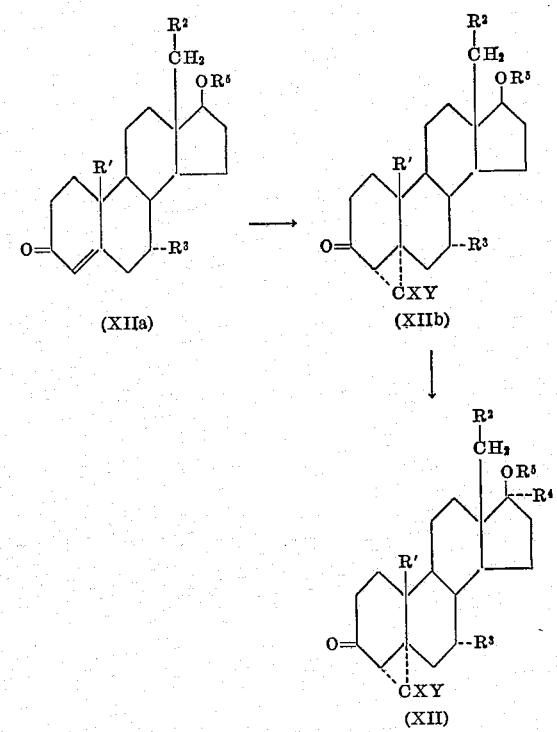

In the above formulas $R^1$, $R^2$, $R^3$, $R^4$, $R^5$, X and Y have the same meaning previously defined.

The foregoing conversion of (XIIa) to (XIIb), carried out in the manner described above, is followed by hydrolysis of the 17β-acyloxy compound (XIIb), oxidation to the corresponding 17-keto compound and introduction of the 17α-substituent as described previously. Alternatively the 3-keto group of (XIIb) may be protected in the form of the 3-ethylene ketal with regeneration of the keto group subsequent to introductions of the 17α-substituent.

DIAGRAM C

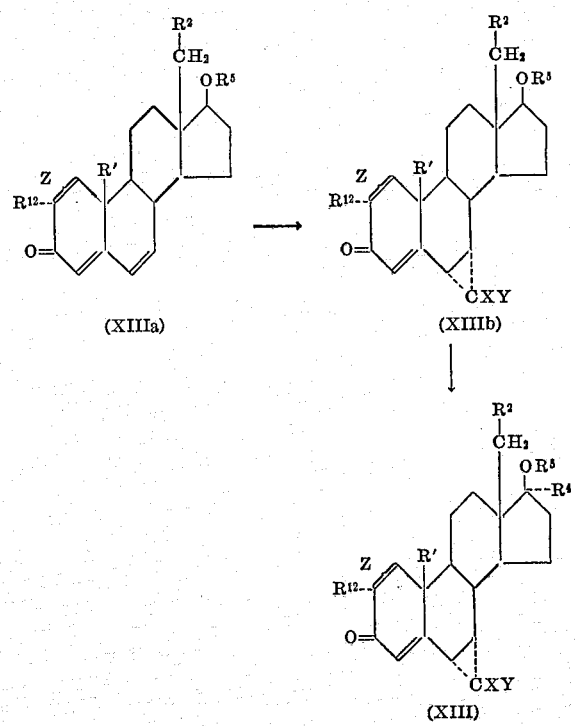

In the above formula, $R^1$, $R^2$, $R^4$, $R^5$, $R^{12}$, X, Y, and Z have the same meaning described hereinabove.

Formation of compounds of Formula XIII having the halocyclopropyl group fused to the 6α,7α positions may be accomplished according to this invention with either a 3-keto-Δ$^{4,6}$-diene or 3-keto-Δ$^{1,4,6}$-triene such as those of Formula XIIIa. When $R^{12}$ is methyl, it may be present in the starting material or may be introduced at a later stage of the synthesis as through formation of a 2-hydroxymethylene compound via known methods followed by reduction to the 2-methyl group.

After introduction of the 6α,7α-halomethylene group, the 17β-acyloxy group is hydrolysed to the corresponding 17β-hydroxy group and then oxidized as with chromic acid to form the 17-keto group. Alternatively, the starting material of Formula XIIIa may bear a 17-keto group rather than the 17β-acyloxy group. In either case, introduction of the 17α-aliphatic hydrocarbon group then follows according to the conventional methods, as described above, with or without protection of the 3-keto group. The latter may be protected as the enol ether or the oxime.

DIAGRAM D

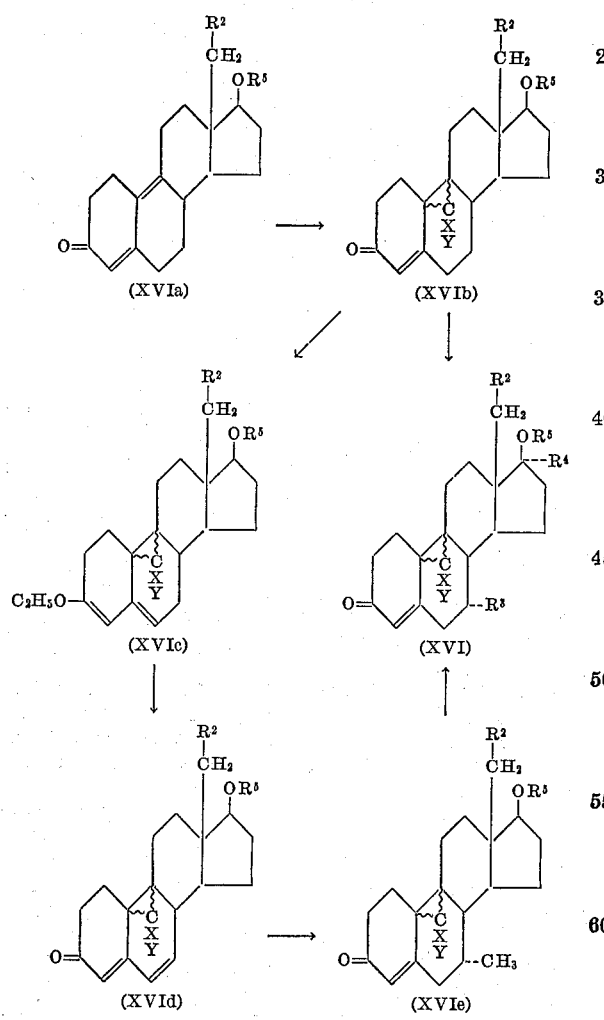

In the above formulas, $R^2$, $R^4$, $R^5$, X and Y have the same meaning as previously defined.

Introduction of the halocyclopropyl group in the 9 and 10 position of estrenes as described above results in the two isomeric products, each of unnatural configuration, i.e. the 9α,10α- and 9β,10β-halomethylene derivatives. These may be separated by conventional methods such as chromatography, either immediately after formation (XVIb) or at a subsequent stage of the synthesis.

Introduction of the Δ$^{4,6}$-diene system is accomplished through formation of the enol ether (XVIc) as described above, followed by treatment with 2,3-dichloro-5,6-dicyano-benzoquinone to yield (XVId) which may be treated with methylmagnesium bromide to yield the corresponding 7α-methyl-Δ$^4$-ene (XVIe).

Hydrolysis of the 17β-acyloxy group, oxidation of the resultant hydroxy group to keto and introduction of a 17α-aliphatic hydrocarbon group may then be effected in the conventional manner with or without protection of the 3-keto group, to afford the 17α-substituted compounds (XVI).

DIAGRAM E

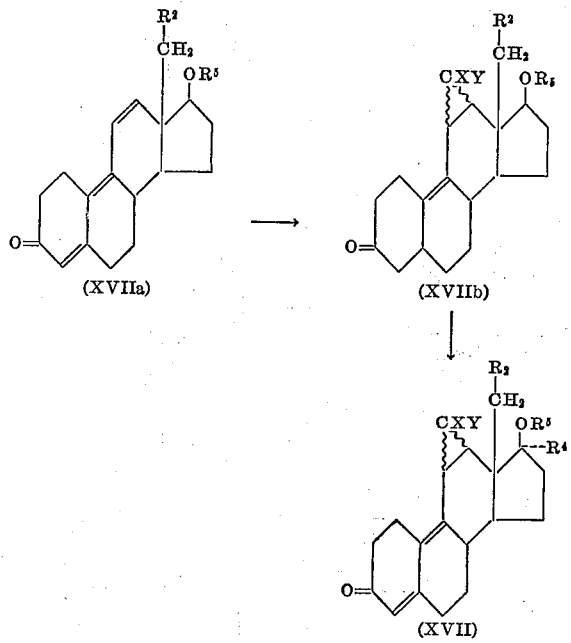

In the above formulas, $R^2$, $R^4$, $R^5$, X and Y have the same meaning as previously set forth.

As in the case of the compounds of Formula XVI, two isomeric products are formed upon formation of the halocyclopropyl group in the 11 and 12 position, the 11α,12α-, and 11β,12β-forms. These two may be separated, as by chromatography, either directly after formation or at a subsequent stage of the synthesis. Elaboration of the 17-position through hydrolysis, oxidation, and 17α-substitution is then accomplished according to the procedures described above.

DIAGRAM F

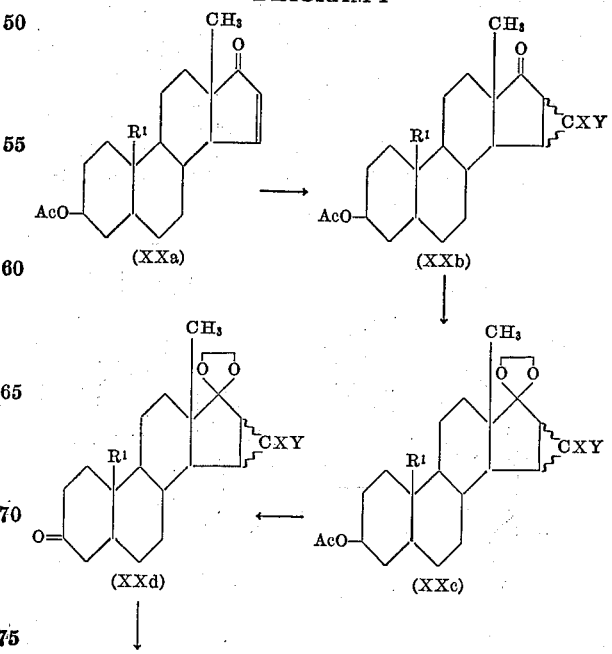

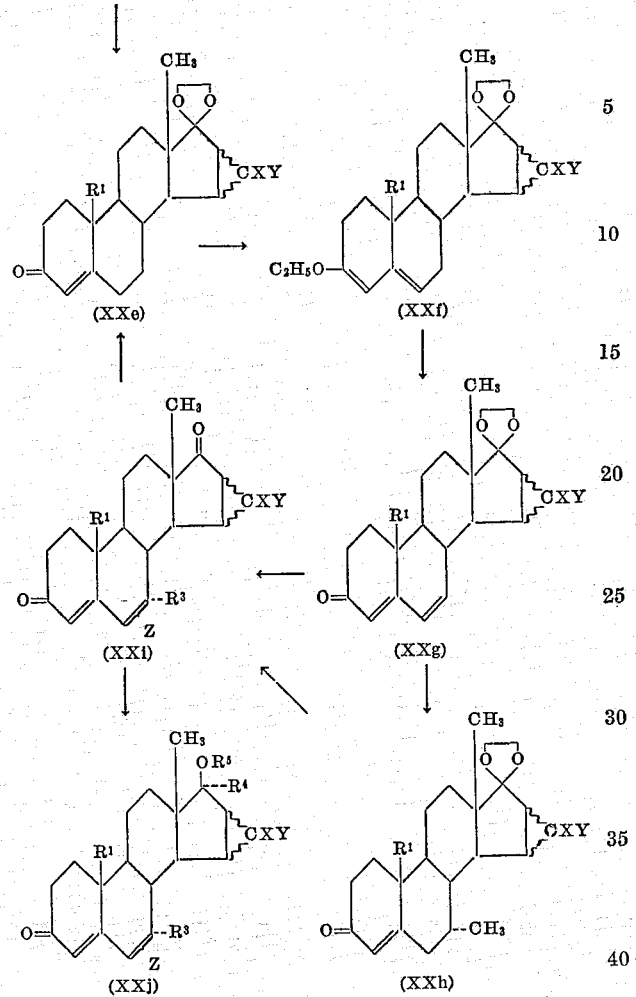

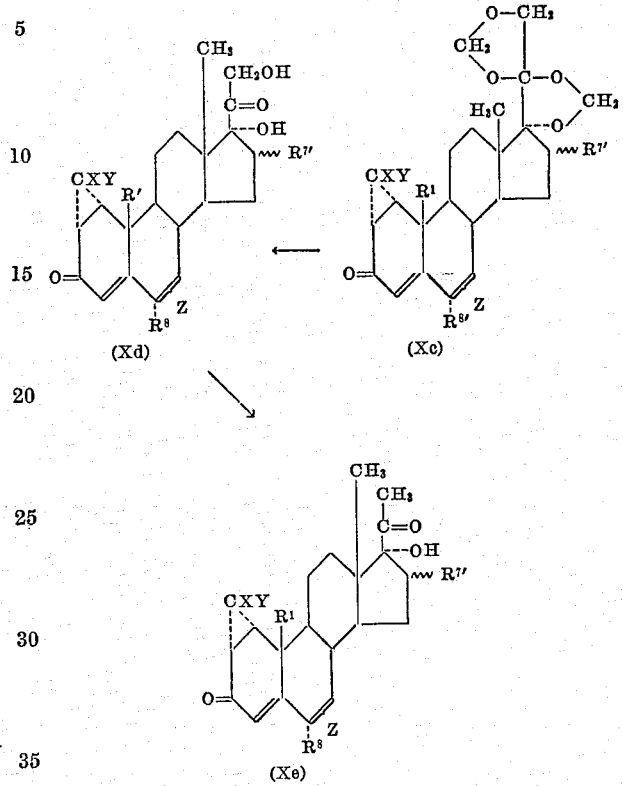

In the above formulas, $R^1$, $R^3$, $R^4$, $R^5$, X, Y and Z have the heretofore defined meaning.

In the foregoing reaction sequence, subsequent to introduction of the halocyclopropyl group, the 17-keto group is protected as the cyclic ketal by treatment with ethylene glycol and acid in the conventional manner. Hydrolysis of the 3-acyloxy group and oxidation to 3-keto and introduction of the $\Delta^4$-ene or $\Delta^{4,6}$-diene system as well as the introduction of a 7α-methyl group then follows in a manner analogous to that described above.

In the pregnane series the halocyclopropyl group is introduced in similar fashion, with subsequent elaboration as desired and appropriate for the particular substitution involved. The compounds of Formula X wherein $R^8$ is hydrogen or methyl ($R^{8'}$) and $R^7$ is other than methylene ($R^{7'}$) may thus be prepared according to the following route:

DIAGRAM G-1

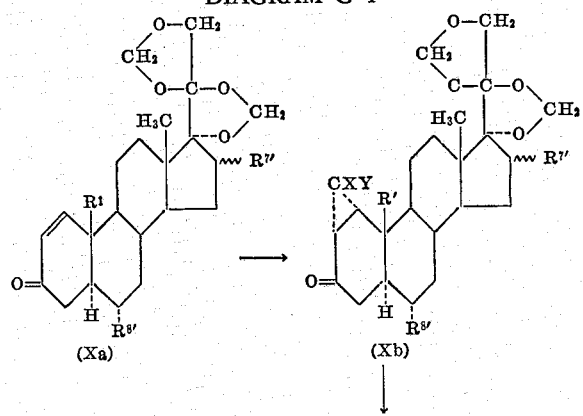

In the above formulas, $R^1$, $R^7$, $R^{7'}$, $R^8$, $R^{8'}$, X, Y and Z have the same meaning described above.

The starting material (Xa) may be obtained through reduction of the 17α,20;20,21-bismethylenedioxy-3-keto-$\Delta^4$-ene with sodium in liquid ammonia to the 3-keto saturated compound. Treatment of this allopregnane with bromine, sodium acetate and p-toluenesulfonic acid yields the 2-bromo-3-keto derivative which is dehydrobrominated with calcium carbonate in dimethylacetamide to afford the $\Delta^1$ dehydro starting compound.

Introduction of the $\Delta^4$-ene system is accomplished in the same manner as previously described followed by subsequent enol ether formation through the use of ethyl orthoformate and generation of the $\Delta^{4,6}$-diene system by treatment with 2,3-dichloro-5,6-dicyanobenzoquinone as described above.

The 21-desoxy compounds are obtained by first conventionally hydrolyzing the bis methylenedioxy group as with an acid such as hydrofluoric acid to regenerate the dihydroxy acetone side chain. The latter is then converted into the corresponding 21-tosylate or 21-mesylate as by treatment with p-toluenesulfonic acid chloride or methanesulfonyl chloride; the tosylate or mesylate group is then substituted by iodine by reaction with sodium iodide in mixture with acetone, and finally the resulting 21-iodo compound is deiodinated by treatment with sodium bisulfite in mixture with aqueous methanol or by reaction with chromous chloride, thus affording the compounds of Formula Xe.

When a 6-chloro or 6-fluoro compound of Formula X is desired, the enol ether (Xf) is treated with N-chlorosuccinimide or perchloryl fluoride respectively, followed by treatment with acid to convert any 6β-isomer to 6α and thus form compounds of Formula Xg. Regeneration of the enol ether (Xh) and treatment with 2,3-dichloro-5,6-dicyanobenzoquinone yields the 6-fluoro or 6-chloro- 3-keto-$\Delta^{4,6}$-diene (Xi). These latter reactions may be represented as follows:

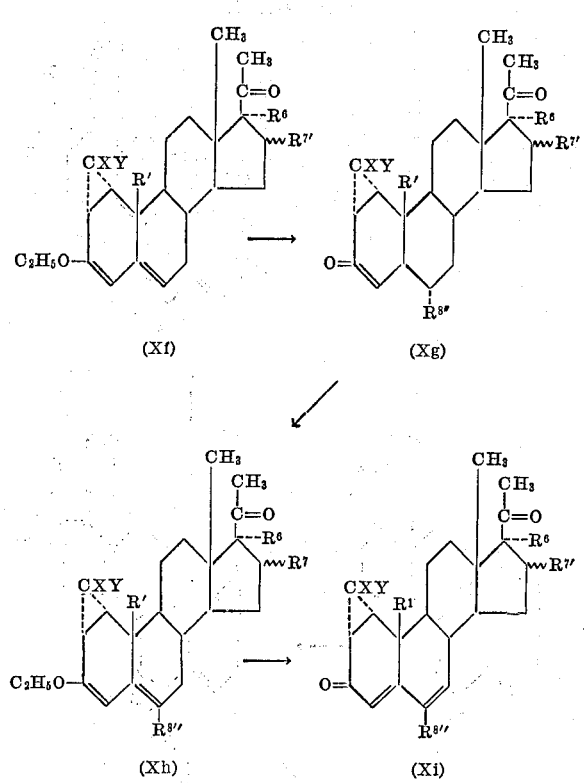

DIAGRAM G-2

In the foregoing R', $R^6$, $R^{7'}$, X and Y have the same meaning as hereinabove set forth and $R^{8''}$ is chloro or fluoro.

The enol ether (Xf) may also be treated with N-bromosuccinimide and the resulting 6-bromo compound then dehydrobrominated with calcium oxide to yield the 3-keto-$\Delta^{4,6}$-diene. This, upon treatment with chromyl chloride, yields the 6,7-chlorohydrin which, when subjected to the action of hydrogen bromide in acetic acid, affords the 6-chloro-$\Delta^{4,6}$-dien-3-one.

Compounds of Formula X wherein $R^7$ is methylene are obtained by introducing the 16-methylene substituent after formation of the halocyclopropyl group. Thus a $\Delta^{16}$-pregnene, obtained via formation of a 3,20-bis semicarbazone and subsequent treatment with acetic acid and pyruvic acid, is treated with diazomethane. Pyrolysis then yields the 16-methyl-$\Delta^{16}$-ene which is epoxidized to yield the 16α,17α-oxido-16β-methyl compound in which the oxido ring in cleaved as set forth in U.S. Patent 3,168,537 to Oliveto. Removal of the 21-hydroxy group through formation of the 21-tosylate, treatment with sodium iodide and dehalogenation with sodium metabisulfite may then follow in the manner herein described.

Substantially the same synthetic routes are employed in preparing the pregnanes of Formula XI, the corticoid side chain being protected, as before, through the formation of a bis methylenedioxy derivative. Acylation at C-21, formation of the 17α,21-ortho esters or formation of 16α,17α-alkylidenedioxy derivatives is performed after cleavage of the bis methylenedioxy group.

These reactions may be represented as follows:

DIAGRAM H-1

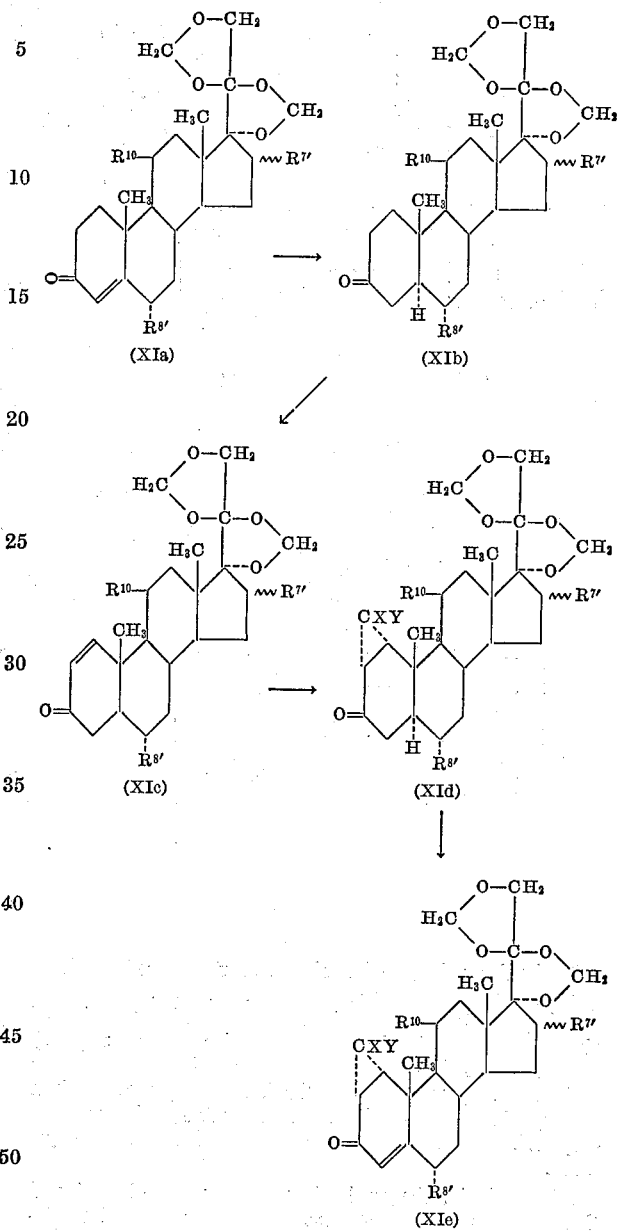

In the foregoing formulas $R^{10}$, X and Y have the same meaning as previously described, $R^{7'}$ is as defined for $R^7$ with the exclusion of methylene, and $R^{8'}$ is hydrogen or methyl.

DIAGRAM H-2

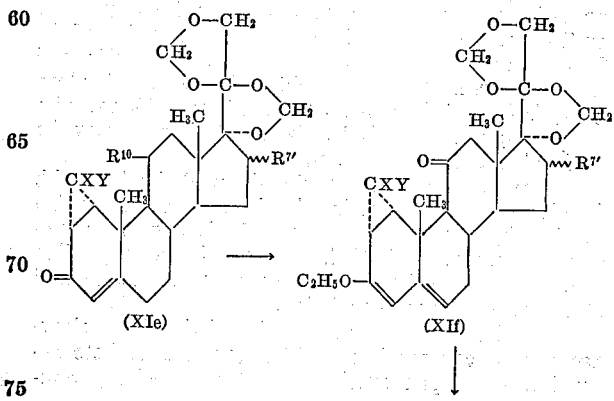

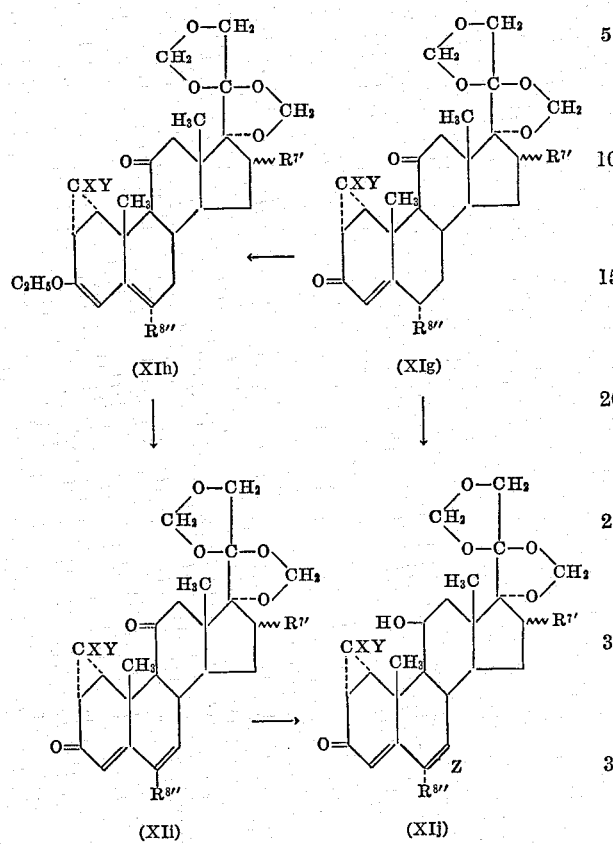

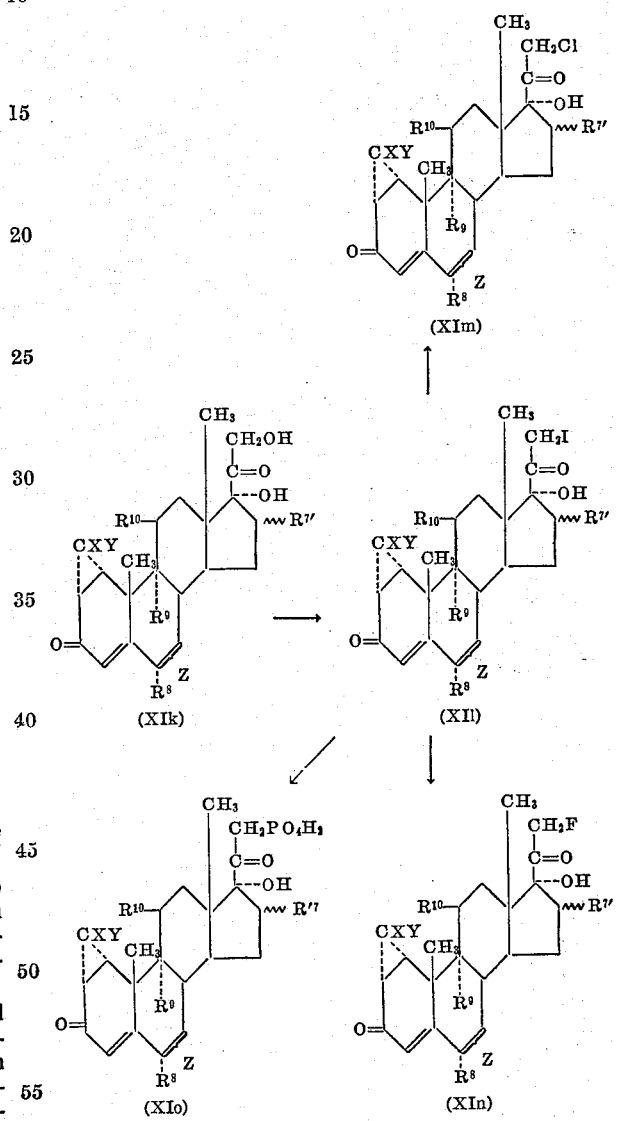

DIAGRAM H-3

In the foregoing, R⁸'' is chloro or fluoro and R⁷' is as defined for R⁷ with the exclusion of methylene.

It is generally desirable during the above introduction of chloro or fluoro in the 6-position of a pregnane (XIe) wherein $R^{10}$ is hydroxy to first oxidize such a group to keto and to subsequently reduce the keto group with sodium borohydride (followed by treatment with 2,3-dichloro-5,6-dicyanobenzoquinone to regenerate the 3-keto-Δ⁴-ene system).

Alternatively, the enol ether may be brominated and this 6-bromo compound then dehydrobrominated as described above to yield the 3-keto-Δ⁴,⁶-diene. Introduction of the 6,7-chlorohydrin function, as with chromyl chloride, and dehydration, then yields the 6-chloro-Δ⁴,⁶-dien-3-one.

Introduction of a 9α-fluoro or 9α-chloro substituent is accomplished in the usual manner through dehydration of an 11-hydroxy compound, such as (XIe: $R^{10}$=hydroxy) or (XIj) to the corresponding Δ⁹⁽¹¹⁾-ene, formation of the 9α,11β-bromohydrin, conversion to the 9β,11β-oxide, and treatment with hydrogen halide. The 9α,11β-dichloro group is formed through treatment of the Δ⁹⁽¹¹⁾-ene with chlorine gas. Alternatively, these substituents may be present in the starting material.

Treatment of the bismethylenedioxy derivatives with formic acid or hydrofluoric acid yields the corresponding 17α,21-dihydroxy-20-keto compound which may be subsequently acylated. If R⁷' is hydroxy, the corresponding 16α,17α-alkylidenedioxy derivative may also be formed at this stage, prior to 21-acylation.

In addition, the product of the bismethylenedioxy cleavage may be converted to a 21-halo or 21-phosphato derivative. Thus upon esterification of a 21-hydroxy compound to form the 21-methanesulfonyloxy or 21-p-toluenesulfonyloxy derivative and treatment of these esters with sodium iodide, there is obtained the corresponding 21-iodo compound which, when subjected to the action of silver chloride, silver fluoride or silver phosphate yields the 21-fluoro, 21-chloro or 21-phosphate compound respectively. These reactions may be summarized as follows:

In the above formulas, R⁷', R⁸, R⁹, $R^{10}$, X, Y and Z have the previously defined meaning. When R⁷' is hydroxy, a 16α,17α-alkylidenedioxy derivative is formed prior to acylation.

The 21-dihydrogenphosphate derivative may be titrated with an alkali metal base such as sodium methoxide or potassium methoxide in methanol to yield the mono alkali metal salt and dialkali metal salt.

Compounds of Formula XI wherein R⁷ is methylene are prepared in a similar but somewhat modified manner. Thus, subsequent to the above described steps of formation of the 1α,2α-halomethylene group, introduction if desired of a 9α-halo substituent, cleavage of the 17α,20,20,21-bis-methylenedioxy group and 21-acylation, a 3,20-bis-semicarbazone derivative is formed through treatment of the 3,20-diketo compound with semicarbazide. Upon subsequent treatment with acetic acid and pyruvic acid, a 3,20-diketo-Δ⁴,¹⁶-diene is generated which is allowed to react with diazomethane to form a 16α,17α-pyrazoline. Pyrolysis of this intermediate yields a 3,20-diketo-16-methyl-Δ⁴,¹⁶-diene which is epoxidized as with perbenzoic acid. Opening of the dioxide ring with hydrogen bromide in acetic acid then yields the 16-methylene derivative. These reactions may be summarized as follows:

DIAGRAM H-4

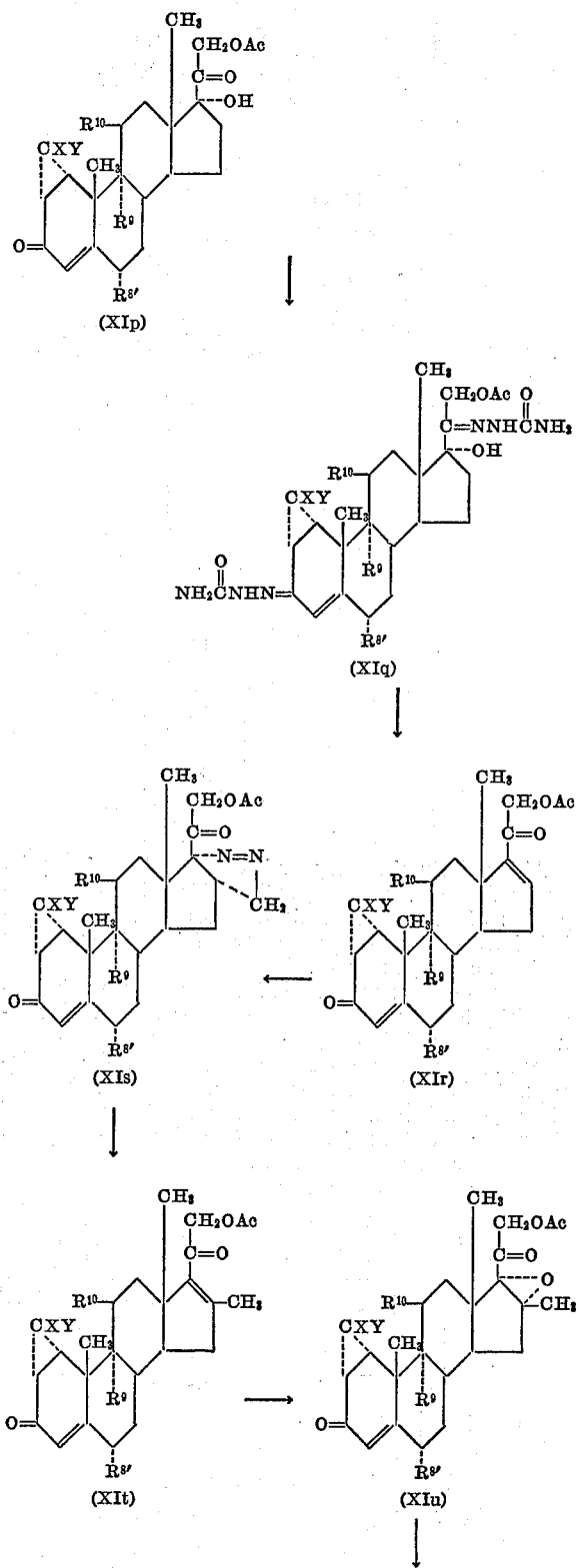

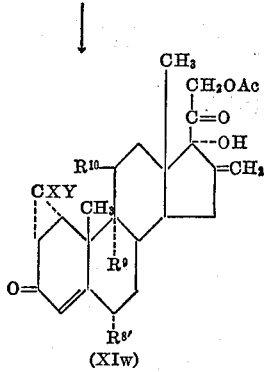

In the foregoing $R^{8'}$, $R^9$, $R^{10}$, X and Y are as defined above and Ac represents an acyl group as for example acetyl. After the above transformation, a 21-chloro, 21-fluoro or 21-phosphato substituent may be introduced in compounds of Formula XIw in a manner analogous to that described above in converting compounds of Formula XIe to those of Formula XIj.

Compounds of Formula XIV are obtained according to the process of this invention from the corresponding Δ⁴,⁶-dienes in a manner analogous to that described above.

DIAGRAM I-1

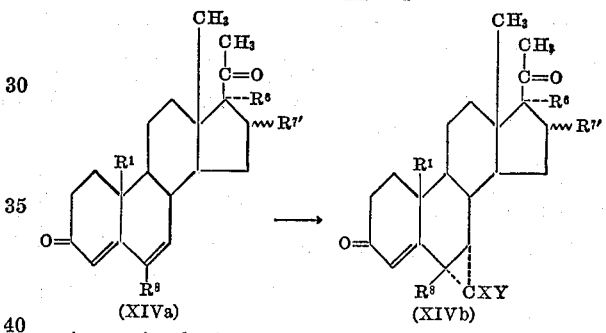

As previously described $R^1$, $R^6$, $R^{7'}$, $R^8$, X and Y have the same meaning. 16-methylene compounds of Formula XIV are obtained by introducing the 6α,7α-halomethylene function in a 3-keto-Δ⁴,⁶-diene compound possessing the 16β-methyl-16α,17α-oxido group and thereafter opening the oxido ring with hydrogen bromide and acetic acid.

DIAGRAM I-2

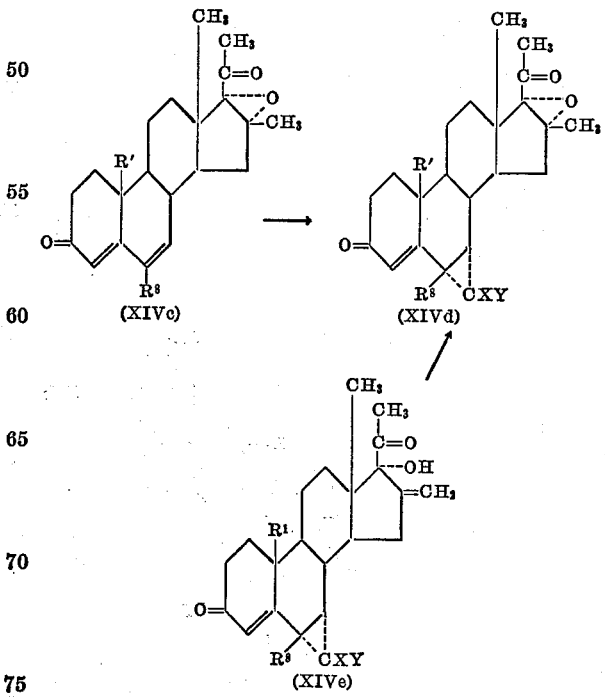

In the case of those compounds of Formula XV, it is again preferable to use the bis methylenedioxy derivative of the 3-keto-$\Delta^{4,6}$-diene or 3-keto-$\Delta^{1,4,6}$-triene starting material.

DIAGRAM J-1

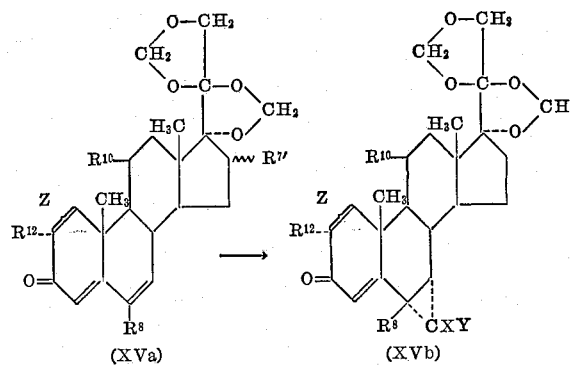

(XVa) → (XVb)

This bis methylenedioxy compound of Formula XVb wherein $R^{10}$ is hydroxy may be further modified if desired through introduction of a 9α-fluoro substituent or the 9α,11β-dichloro group according to the usual methods. Similarly, cleavage of the bis methylenedioxy group and subsequent 21-acylation, 21-etherification, formation of a 17α,21-orthoester, or generation of a 16a,17a-alkylidenedioxy function may follow according to known procedures.

Compounds of Formula XV wherein $R^7$ is methylene and $R^8$, $R^9$, $R^{10}$, $R^{12}$, X, Y and Z have the meaning described previously, may be prepared in a fashion analogous to that described above in converting (XIo) to (XIu), i.e.:

DIAGRAM J-2

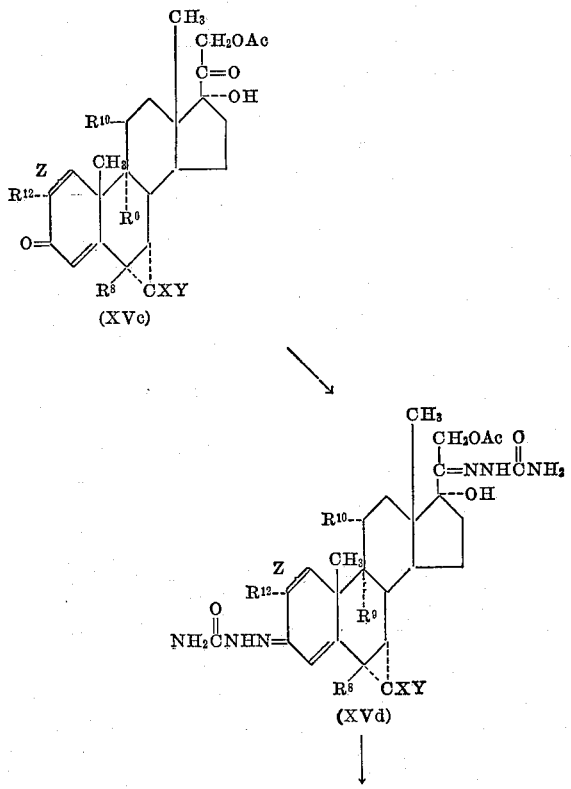

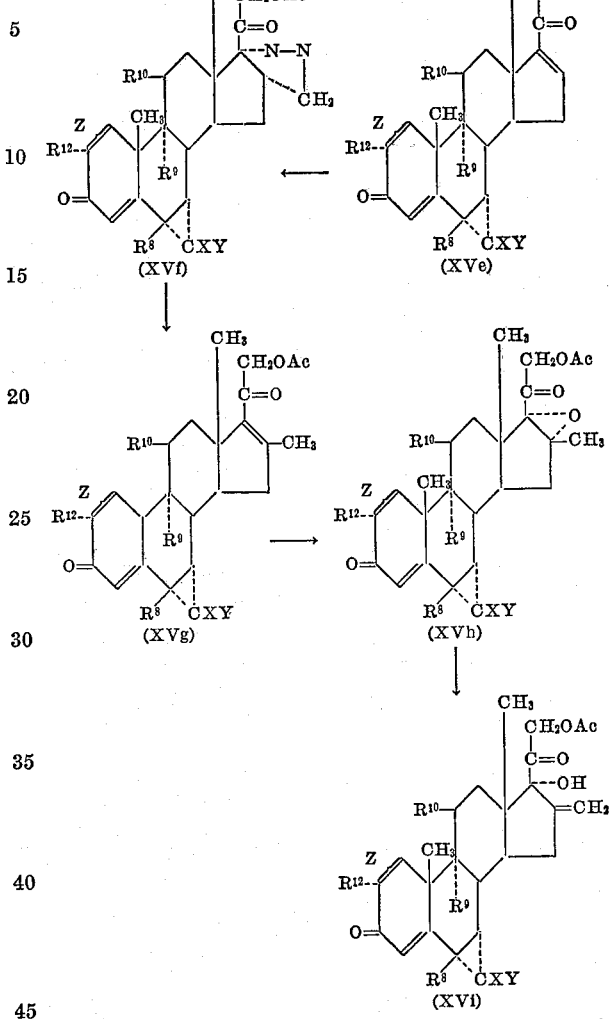

Alternatively, the compounds of Formula XV may be obtained from the corresponding 21-unsubstituted compounds of Formula XIV through formation of the 21-iodo intermediate with replacement of the iodine atom by acyloxy, chloro, or fluoro.

The compounds of Formula XVIII are prepared in substantially the manner as described above. Thus, after introduction of the 16α,17α-halomethylene function, the $\Delta^4$-ene system is generated through bromination and subsequent elimination of hydrogen bromide while the $\Delta^{4,6}$-diene system is then formed either through the action of chloranil on the 3-keto-$\Delta^4$-ene or 2,3-dichloro-5,6-dicyanobenzoquinone on the enol ether.

DIAGRAM K-1

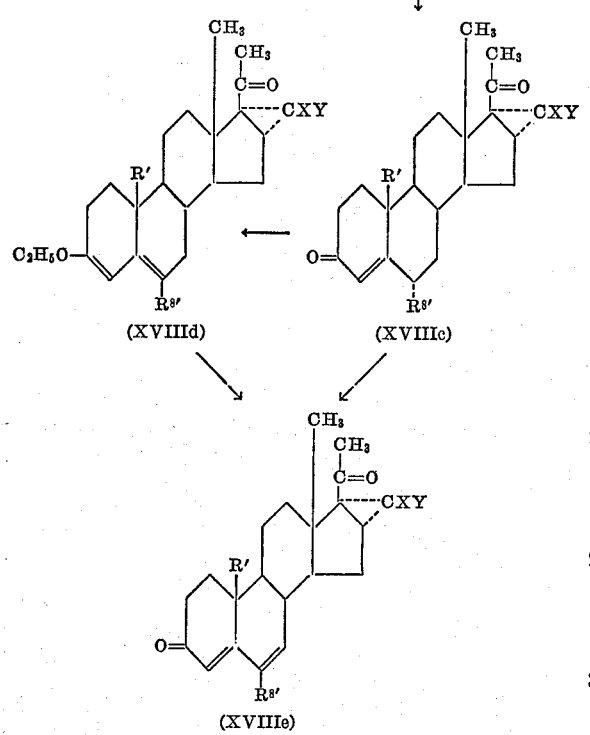

In the above formulas, R', R⁸', X and Y are as described heretofore.

Introduction of a chloro or fluoro group (R⁸'') at C-6 is similarly performed in the manner described above, i.e., with N-chlorosuccinimide or perchloryl fluoride on the enol ether and acidic isomerization of the 6-halo group as with p-toluenesulfonic acid, as indicated in the following diagram wherein R', X and Y are as described previously.

DIAGRAM K-2

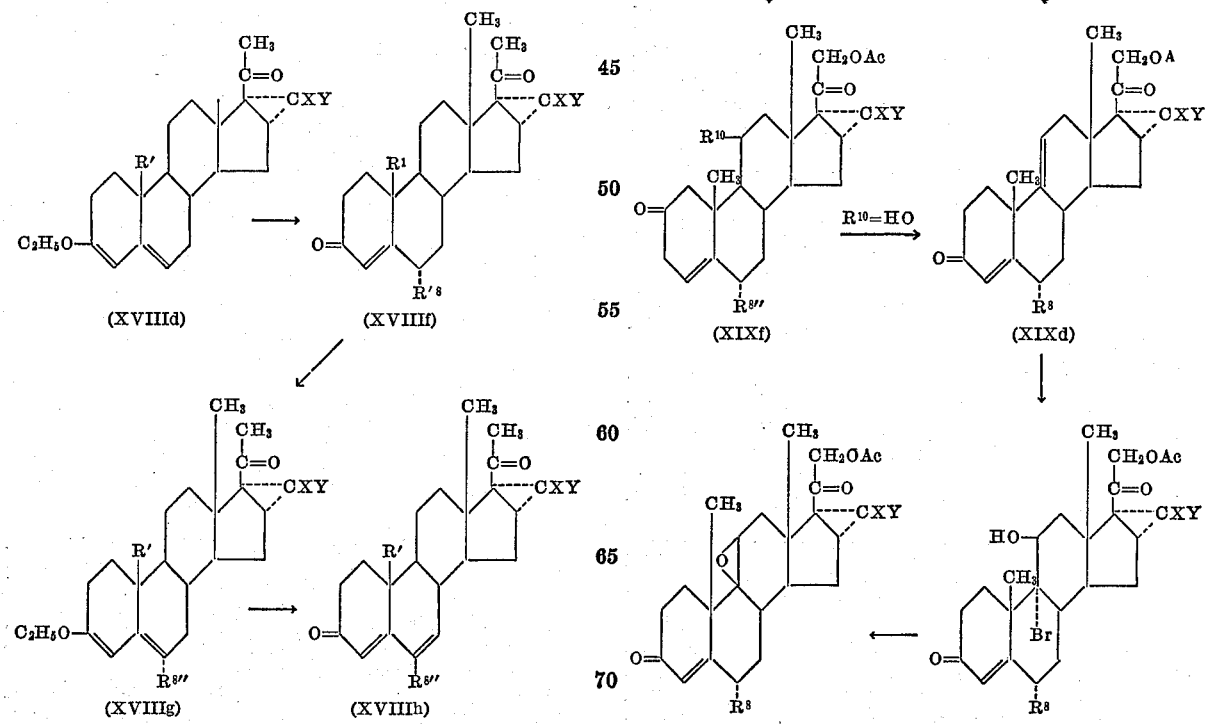

The pregnanes of Formula XIX are prepared in a fashion similar to that described for the compounds of Formula XVIII. After introduction of the 16α,17α-halo-methylene function, Δ⁴-unsaturation and, if desired, a 6α-chloro or 6α-fluoro substituent, a halogen atom may be introduced in the 9α-position through formation of a Δ⁹⁽¹¹⁾-ene, epoxidation and treatment of the 9β,11β-oxido compound with hydrogen fluoride or hydrogen chloride.

DIAGRAM L

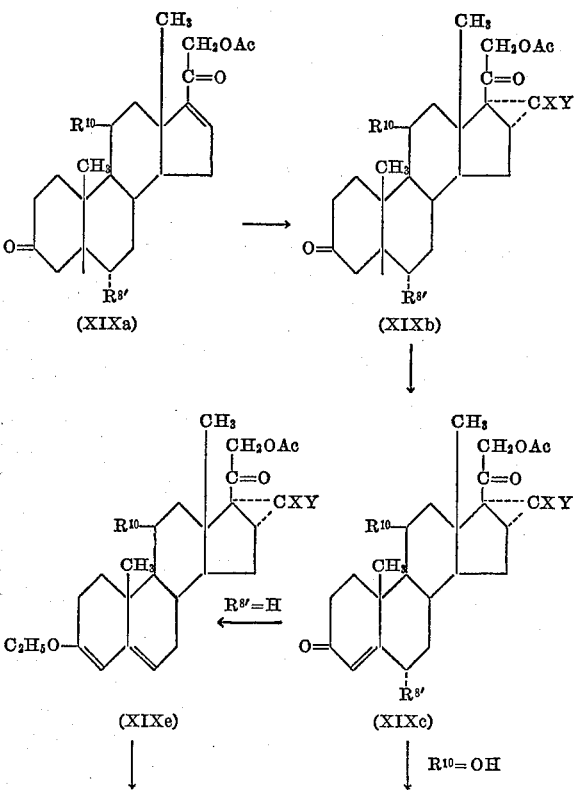

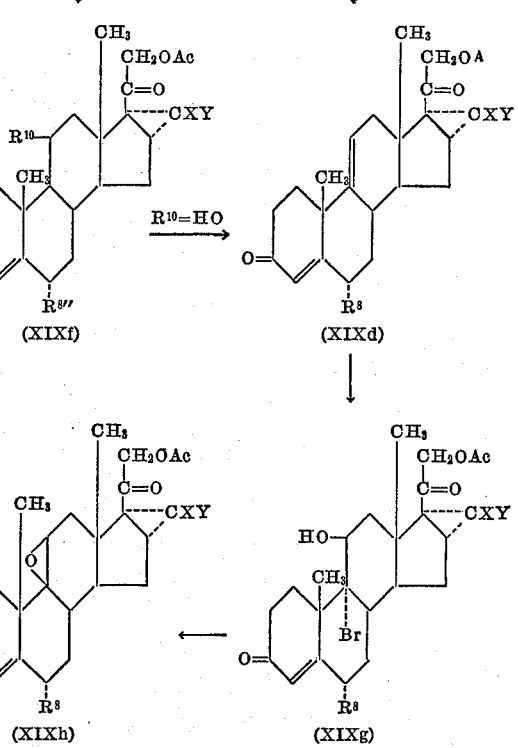

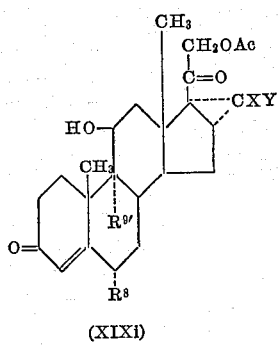

(XIXi)

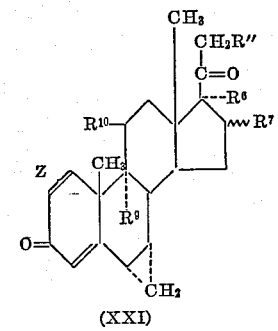

(XXI)

In the above formulas, $R^8$, $R^{8'}$, $R^{8''}$, $R^{10}$, X and Y are as defined previously and $R^{9'}$ is chloro or fluoro.

Introduction of the 3-keto-$\Delta^{1,4}$-diene system in compounds (XIXc), (XIXf) and (XIXi) is accomplished through the action of 2,3-dichloro-5,6-dicyanobenzoquinone or through the use of other known procedures.

A methyl group in the 2-position may be introduced in the compounds of Formulas XV and XIX through reduction of a 2-hydroxymethylene intermediate, the latter obtained via the action of ethyl formate and sodium hydride.

Hydrolysis of the 21-acyloxy group with base yields the corresponding free 21-hydroxy group which may be employed to prepare the corresponding 21-chloro, 21-fluoro, 21-phosphato or 21-desoxy derivatives via the 21-iodo intermediate, as described above.

The compounds of the present invention having the androstane nucleus such as those of Formulas IX, XII, XIII, XVI, XVII, and XX are anabolic agents with a favorable anabolic:androgenic ratio and are accordingly useful in the treatment of debilitatory conditions such as are encountered in post-operative conditions or old age. In addition, such compounds have anti-estrogenic, anti-gonadotrophic, anti-fibrillatory and appetite-stimulating properites, as well as the abilities to lower blood cholesterol levels, suppress the output of the pituitary gland and relieve premenstrual tension. Those compounds wherein $R^4$ is alkynyl, particularly ethynyl or haloethynyl, are progestational agents.

Compounds of the present invention having the pregnane nucleus but being unsubstituted in the 11 and 21-position, such as those of Formulas X, XVI, and XVII are progestational agents. They are useful in fertility control and in the management of various menstrual disorders. In addition such compounds have varying degrees of anti-androgenic, anti-gonadotrophic and anti-estrogenic activities.

Compounds of the present invention having the pregnane nucleus and being substituted in the 11 and/or 21-position, such as those of Formulas XI, XV, and XIX, demonstrate corticoid and anti-inflammatory activity and are useful in the treatment of skin conditions generally responsive to such agents, such as contact dermatitis, allergies and the like.

In addition to having the foregoing biological activities, these compounds are also useful in the preparation of other novel steroids. For example, the novel halogenated cyclopropyl group characterizing the compounds of the present invention may be reductively dehalogenated to yield the non-halogenated cyclopropyl group. This transformation may be accomplished, for example, with lithium aluminum hydride, followed where necessary by the reoxidation of hydroxy groups reduced during this reaction. One example of such a transformation involves the formation of the following class of anti-inflammatory compounds of the formula wherein $R^6$, $R^7$, $R^9$, $R^{10}$, $R^{11}$ and Z have the meaning hereinabove described:

While the above fused cyclopropyl compounds of Formula XXI correspond to fused halocyclopropyl compounds of Formula XV, the formation of the cyclpropyl group via this dehalogenation is performed well before the steps leading to the final compound and generally shortly, if not immediately, after introduction of the halomethylene group. In addition, while Formula XXI typifies $6\alpha,7\alpha$-methylene, this cyclopropyl group may likewise be generated via this dehalogenation in any of the other positions from the halomethylene group introduced by the process of this invention.

Other novel steroids which can be obained from the compounds of this invention include the following pyrazole derivatives:

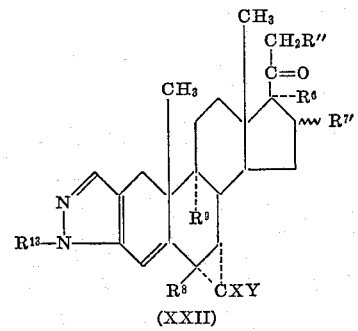

(XXII)

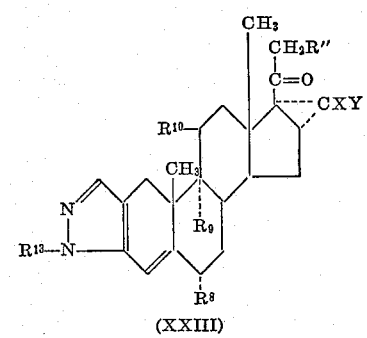

(XXIII)

In the foregoing compounds, which are anti-inflammatory agents, $R^6$, $R^{7'}$, $R^8$, $R^9$, $R^{10}$, $R^{11}$, X and Y are as previously described and $R^{13}$ is hydrogen, phenyl, fluorophenyl, chlorophenyl, methylphenyl or methoxyphenyl.

The compounds of Formula XXII are prepared for example by introducing a 2-hydroxymethylene group in a 3-keto-$\Delta^4$-pregnene, preferably a bis methylenedioxy derivative such as those of Formula XVb and allowing this 2-hydroxymethylene compound to react with a hydrazine of the structure $R^{13}$—NH—NH$_2$. The 2-hydroxymethylene group is introduced by the action of ethylformate and sodium hydride in benzene. These reactions may be represented as follows:

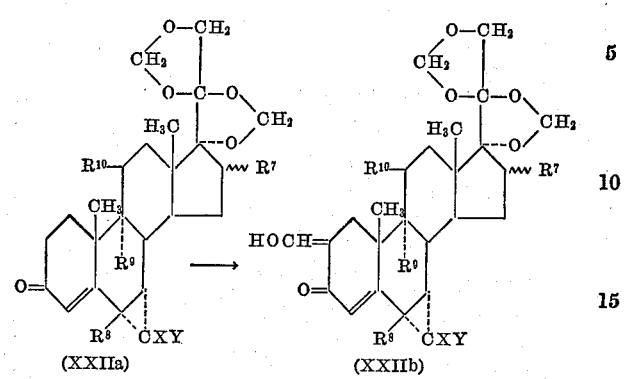

(XXIIa)  (XXIIb)

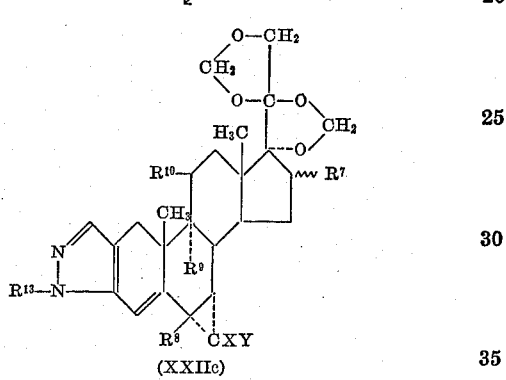

(XXIIc)

Cleavage of the bis methylenedioxy derivative (XXIIc) as with hydrofluoric acid or formic acid then yields the corresponding 17α,21-dihydroxy-20-keto compound. Formation of the 21-acylates, 21-tetrahydropyranyl ether, 17α,21-ortho esters, 17α,21-alkylidenedioxy derivatives 16α,17α-alkylidenedioxy derivative, 21-halo compounds, 21-phosphates or 21-desoxy derivatives may then follow in the manners described herein.

In those cases were $R^7$ is hydroxy, it is preferable to form the 16α,17α-alkylidenedioxy rather than the 17α, 20;20,21-bis methylenedioxy derivative and to protect the 21-hydroxy group through conversion to the 21-tetrahydropyranyloxy group.

Compounds of Formula XXIII are prepared in an analogous fashion, employing however the 21-tetrahydropyranyloxy or 21-acylate rather than the bis methylenedioxy derivative. Briefly these transformations may be represented as follows:

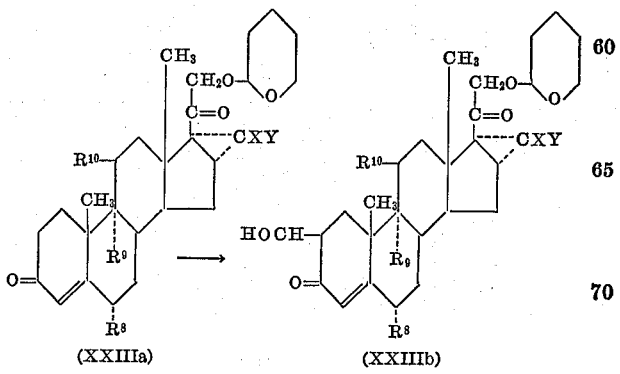

(XXIIIa)  (XXIIIb)

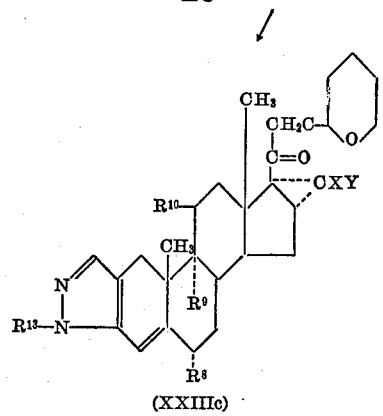

(XXIIIc)

The 21-ether may, if desired, be converted to a 21-hydroxy group through simple acid treatment.

Similar derivatives which can be obtained from the compounds of the present invention are the anti-inflammatory compounds of the formulas wherein $R^6$, $R^7$, $R^8$, $R^9$, $R^{10}$, $R^{11}$ and $R^{13}$ have the same meaning as previously described:

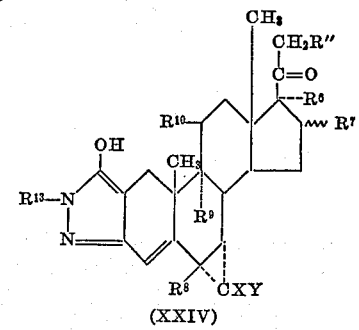

(XXIV)

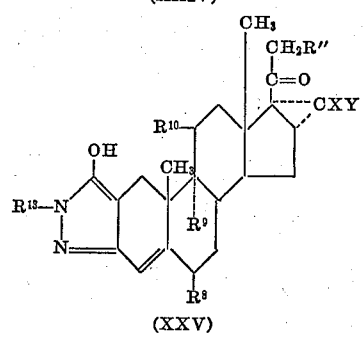

(XXV)

Compounds of the Formulas XXIV and XXV are obtained via procedures analogous to those described for (XXII) and (XIII), respectively, utilizing however a 2-ethoxyformyl derivative in the hydrazine reaction in place of the 2-hydroxymethylene compounds of structures (XXIIc) and (XXIIIb). The 2-ethoxyformyl intermediate is obtained via pyrolysis on glass of the corresponding 2-ethoxyoxalyl derivative:

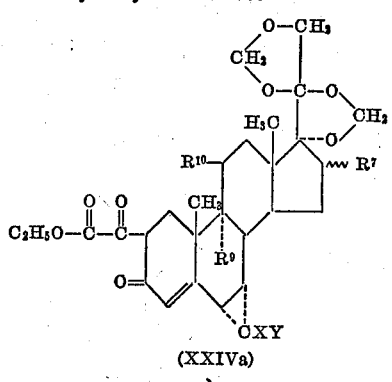

(XXIVa)

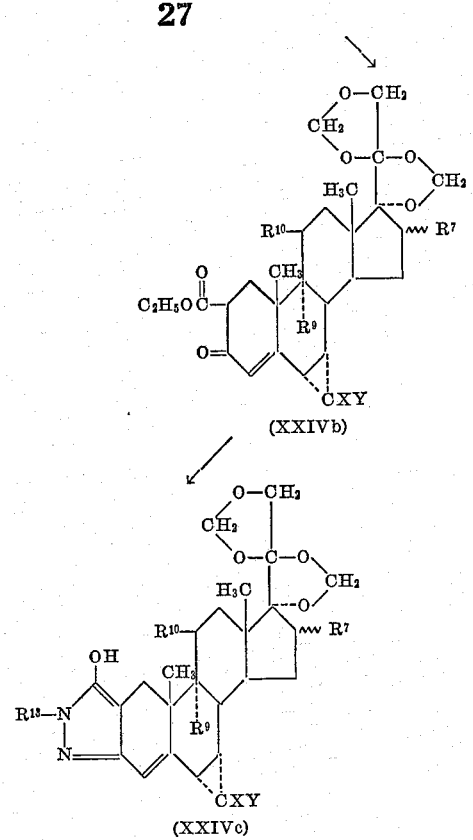

(XXIVb)

(XXIVc)

Cleavage of the bis methylenedioxy derivative (XXIVc) and information of the previously described side chain derivatives are effected as previously described.

Other novel derivatives which can be obtained from the compounds of the present invention include 3-desoxy compounds which are obtained via reduction of a 3-thioketal over Raney nickel. Typical of such derivatives are those of the formula:

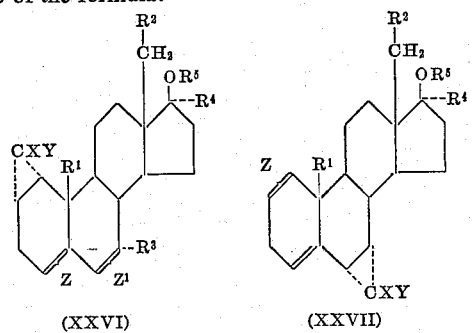

(XXVI)    (XXVII)

In the above formulas, $R^1$, $R^2$, $R^3$, $R^4$, $R^5$, X, Y, Z and Z' have the previously described meaning.

Further modifications which are possible with the compounds of this invention include preparation of spirolactones such as those of the following formulas wherein $R^1$, $R^2$, $R^3$, X, Y and Z are as previously described:

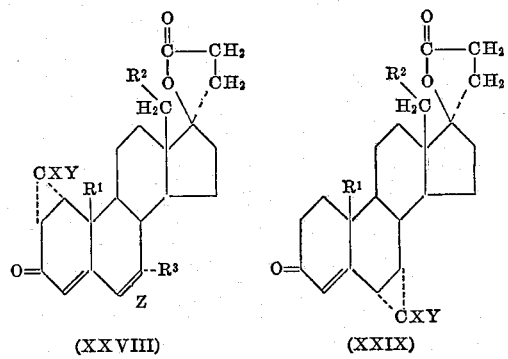

(XXVIII)    (XXIX)

These compounds, which are aldosterone antagonists, may be prepared from the corresponding 17α-ethynyl-17β-hydroxy compounds through carboxylation with carbon dioxide, reduction of the resulting 17α-carboxyethynyl derivative to the saturated acid, and ring closing as with acid.

In addition to the various classes of compounds possessing a single halocyclopropyl group, it is also possible to prepare compounds bearing two or more such groups or one such group and a cyclopropyl group. Depending upon the particular arrangement these may be obtained by extending the reaction conditions whereby upon completion of the addition across the most remote double bond, addition continues across the next most remote double bond. The process of this invention may also be carried out on a compound already bearing a halocyclopropyl or a cyclopropyl group. For example, a novel group of anabolic agents is obtained by utilizing the following transformation and thereafter elaborating at C-17 in the usual manner.

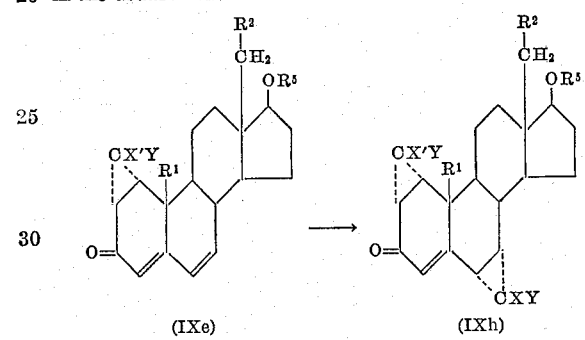

(IXe)    (IXh)

In the above formulas $R^1$, $R^2$, $R^5$, X and Y have the previously described meaning and X' is hydrogen, chloro or fluoro.

Other derivatives of the compounds of the present invention, including those of the pregnane and 19-norpregnane series, having various arrangements of two cyclopropyl or halocyclopropyl groups are apparent from the foregoing.

In addition, treatment of the fused halocyclopropyl compounds of the present invention with zinc and acetic acid effects ring opening with formation of a halomethyl group on the bridgehead carbon atom more remote from the keto group. Thus for example it is possible to obtain the compounds of Formula XXX and XXXI which are progestational and anabolic agents respectively.

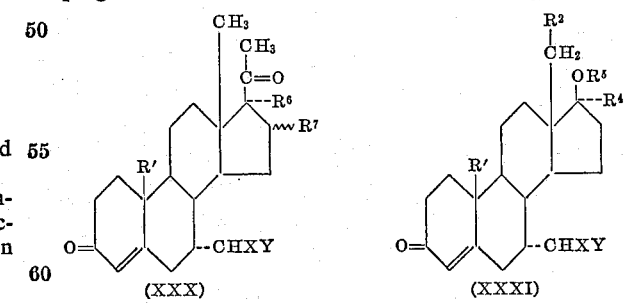

(XXX)    (XXXI)

In these formulas $R^1$, $R^2$, $R^4$, $R^5$, $R^6$, $R^7$, X and Y are as previously described.

While the foregoing classes of pregnanes have been represented as having normal ring configuration, the corresponding derivatives of the retropregnane series, i.e., 9β,-10α-pregnanes, may be prepared via totally analogous procedures.

The following examples will serve to further typify the nature of this invention but should not be construed as a limitation thereof.

*Example 1*

To a solution of 1 g. of 18-methyl-Δ⁴-estren-17β-ol-3-one in 15 ml. of benzene are added 2 ml. of dihydropyran.

About 1 ml. of solvent is removed by distillation and 0.4 g. of p-toluene-sulfonic acid is then added to the cooled distillation residue. This mixture is allowed to stand at room temperature for about four days and then washed in turn with aqueous sodium carbonate solution and water, dried over sodium sulfate and evaporated to dryness. The residue is chromatographed on 15 g. of neutral alumina and the material obtained upon elution with hexane is recrystallized from pentane to yield 17β-tetrahydropyranyloxy-18-methyl-$\Delta^4$-estren-3-one.

To a solution of 1 g. of 17β-tetrahydropyranyloxy-18-methyl-$\Delta^4$-estren-3-one in 75 ml. of tetrahydrofuran and 125 ml. of liquid ammonia, is added over a 20-minute period 0.27 g. of lithium. The mixture is refluxed with stirring for 2½ hours and its color then discharged by the careful addition of ethanol. The resulting solution is allowed to stand at room temperature until the ammonia has evaporated and the residue is next shaken with 100 ml. of 1:1 water:methylene chloride. The aqueous layer is separated and extracted with methylene chloride and the combined extracts and organic layer are dried over magnesium sulfate and evaporated. This residue is dissolved in 100 ml. of 5:9 methylene chloride:acetone and titrated with 8N chromic acid, maintaining a temperature of 25° C. Thirteen milliliters of water are then added with gentle shaking and the aqueous phase is separated and extracted with methylene chloride. The combined extracts and organic layer are dried over magnesium sulfate and evaporated to dryness to yield 17β-tetrahydropyranyloxy-18-methyl-5α-estran-3-one, which may be further purified through recrystallization from ether:hexane.

To a solution of 1 g. of this compound in 30 ml. of acetic acid is added 0.5 ml. of 2 N hydrochloric acid. The mixture is allowed to stand at room temperature for 5 hours, quenched with ice water and extracted with methylene chloride. These extracts are washed to neutrality, dried over anhydrous sodium sulfate and evaporated to dryness to yield 18-methyl-5α-estran-17β-ol-3-one which is recrystallized from acetone:hexane.

A mixture of 1 g. of 18-methyl-5α-estran-17β-ol-3-one, 4 ml. of pyridine and 2 ml. of acetic anhydride is maintained at room temperature for 15 hours. The mixture is then poured into water and the solid which forms is collected by filtration and dried to yield 17β-acetoxy-18-methyl-5α-estran-3-one which is further purified by recrystallization from acetone:hexane.

A solution of 1 g. of 17β-acetoxy-18-methyl-5α-estran-3-one in 20 ml. of acetic acid is treated with a few drops of hydrogen bromide in acetic acid. A solution of 1.1 molar equivalents of bromine in 10 ml. of acetic acid is then added in a dropwise fashion with stirring. Upon consumption of the bromine, water is added and the solid which forms is collected by filtration, washed with water to neutrality and dried under vacuum to yield 2α-bromo-17β-acetoxy-18-methyl-5α-estran-3-one which may be further purified by recrystallization from acetone:hexane.

Two grams of 2α-bromo-17β-acetoxy-18-methyl-5α-estran-3-one in 40 ml. of cold dimethylformamide are added over a 15 minute period to a refluxing suspension of 5 g. of finely divided calcium carbonate in 15 ml. of refluxing dimethylformamide. The mixture is refluxed for 30 additional minutes, cooled, and filtered. After diluting with water, the filtrate is extracted with ethyl acetate and these extracts are washed with dilute hydrochloric acid, water, anhydrous sodium bicarbonate solution, and again with water. After drying over sodium sulfate, the extracts are evaporated to dryness and chromatographed on silica gel to yield 17β-acetoxy-18-methyl-$\Delta^1$-5α-estren-3-one.

To a gently refluxing and stirred solution of 1 g. of 17β-acetoxy-18-methyl-$\Delta^1$-5α-estren-3-one in 8 ml. of dimethyl diethylene glycol ether is added over a two hour period in a dropwise fashion, a solution of 30 equivalents of sodium chlorodifluoroacetate in 30 ml. of dimethyl diethylene glycol ether. The mixture is refluxed until the reaction is substantially complete, as determined by observation of the U.V. spectra, and then filtered. The filtrate is evaporated to dryness in vacuo and the residue chromatographed on alumina, eluting with methylene chloride, to yield 1α,2α-difluoromethylene-17β-acetoxy-18-methyl-5α-estran-3-one.

If 17β-acetoxy-$\Delta^1$-5α-estren-3-one and 17β-acetoxy-$\Delta^1$-5α-androstene-3-one are utilized as starting materials there are respectively obtained 1α,2α-difluoromethylene-17β-acetoxy - 5α - estran - 3 - one and 1α,2α-difluoromethylene 17β-acetoxy-5α-androstan-3-one.

In the foregoing and following examples, some 1β,2β-dihalomethylene isomers can be isolated when the starting materials are 19-nor compounds.

*Example 2*

To a solution of 0.75 ml. of bromine in 15 ml. of dioxane containing a few drops of anhydrous hydrogen bromide is added 0.5 g. of 1α,2α-difluoromethylene-17β-acetoxy-5α-androstan-3-one. The mixture is stirred until the color disappears and then poured into ice water. The solid which forms is collected by filtration, washed well with water and dried. A solution of 0.4 g. of this product in 5 ml. of dimethylformamide is mixed with 0.25 g. of lithium bromide and 0.2 g. of lithium carbonate. This mixture is heated under nitrogen at 100° C. for 16 hours, filtered and evaporated to yield 1α,2α-difluoromethylene-17β-acetoxy-$\Delta^4$-androsten-3-one which may be further purified through recrystallization from acetone:hexane.

A mixture of 1 g. of 1α,2α-difluoromethylene-17β-acetoxy-$\Delta^4$-androsten-3-one in 50 ml. of methanol and 0.5 g. of potassium hydroxide in 1 ml. of water is refluxed for 3 hours and then poured into ice water. The solid which forms is collected by filtration, washed with water and dried to yield 1α,2α-difluoromethylene-$\Delta^4$-androsten-17β-ol-3-one which is recrystallized from acetone:hexane.

*Example 3*

A suspension of 1 g. of 1α,2α-difluoromethylene-17β-acetoxy-$\Delta^4$-androsten-3-one in 7.5 ml. of anhydrous, peroxide-free dioxane is treated with 1.2 ml. of freshly distilled ethyl orthoformate and 0.8 g. of p-toluenesulfonic acid. The mixture is stirred at room temperature for 15 minutes and then allowed to stand for 30 minutes. To the mixture is next added 0.8 ml. of pyridine, followed by water. The solid which forms is collected by filtration, washed with water and dried to yield 1α,2α-difluoromethylene-3-ethoxy-17β-acetoxy-$\Delta^{3,5}$-androstadiene which may be further purified by recrystallization from acetone: hexane.

To a cooled solution (0° C.) of 1 g. of 1α,2α-difluoromethylene-3-ethoxy-17β-acetoxy-$\Delta^{3,5}$-androstadiene in 20 ml. of tetrahydrofuran are added 1.05 molar equivalents of 2,3-dichloro-5,6-dicyano-1,4-benzoquinone and 100 mg. of p-toluenesulfonic acid. After stirring for 30 minutes at 0° C., the mixture is filtered and 100 ml. of methylene chloride are added to the filtrate. This organic solution is washed with 5% aqueous sodium hydroxide solution until the washings are colorless, washed with water to neutrality, dried over sodium sulfate and evaporated to dryness to yield 1α,2α-difluoromethylene-17β-acetoxy-$\Delta^{4,6}$-androstadien-3-one which may be further purified through recrystallization from acetone:hexane.

Alternatively, the 3-keto-$\Delta^{4,6}$-diene system is generated according to the procedure of Example 25, infra. The corresponding 17β-hydroxy compound is obtained upon basic hydrolysis as described in the last paragraph of Example 2.

*Example 4*

To 10 ml. of 3 M ethereal methyl magnesium bromide in 20 ml. of tetrahydrofuran, cooled in an ice bath and stirred under nitrogen, are added 0.16 g. of cuprous chloride and a solution of 1 g. of 1α,2α-difluoromethylene-17β-acetoxy-$\Delta^{4,6}$-androstadien-3-one in 13 ml. of tetrahydrofuran. The ice bath is removed and the mixture is stirred at room temperature for 25 minutes and then poured into a mixture of ether, ice and dilute hydrochloric acid which has been saturated with sodium chloride. The ether phase is separated and washed sequentially with dilute hydrochloric acid which is saturated with sodium chloride, saturated aqueous sodium chloride solution, dilute sodium hydroxide solution saturated with sodium chloride and saturated sodium chloride solution. These extracts are back extracted with ether and the combined ethereal extracts dried over magnesium sulfate and evaporated. The residue is chromatographed on Florisil to yield 1α,2α-difluoromethylene-7α-methyl-Δ$^4$-androsten-17β-ol-3-one.

*Example 5*

A suspension of 1 g. of 1α,2α-difluoromethylene-7α-methyl - Δ$^4$-androsten-17β-ol-3-one in 7.5 ml. of anhydrous, peroxide-free dioxane is treated with 1.2 ml. of freshly distilled ethyl orthoformate and 0.8 g. of p-toluenesulfonic acid. After being stirred at room temperature for 15 minutes, the mixture is allowed to stand 30 minutes. To the mixture is added 0.8 g. of pyridine. The solid which forms upon the addition of water is collected, washed with water, dried and recrystallized from acetone:hexane, to yield 1α,2α-difluoromethylene-3-ethoxy-7α-methyl-Δ$^{3,5}$-androstadiene-17β-ol.

A solution of 6 g. of 1α,2α-difluoromethylene-3-ethoxy-7α-methyl-Δ$^{3,5}$-androstadien-17β-ol in 120 ml. of pyridine is added to a mixture of 6 g. of chromic trioxide in 120 ml. of pyridine. The reaction mixture is allowed to stand at room temperature for 15 hours, diluted with ethyl acetate and filtered through Celite. The filtrate is washed well with water, dried over sodium sulfate and evaporated to dryness to yield 1α,2α-difluoromethylene-3-ethoxy-7α-methyl-Δ$^{3,5}$-androstadien-17-one which is further purified through recrystallization from acetone:hexane.

A solution of 5 g. of 1α,2α-difluoromethylene-3-ethoxy-7α-methyl-Δ$^{3,5}$-androstadien-17-one in 250 ml. of thiophene-free benzene is treated with 27.5 ml. of 4 N methylmagnesium bromide in anhydrous ethyl ether. The mixture is refluxed for 3 hours under anhydrous conditions and then cautiously treated with an excess of aqueous ammonium chloride solution and extracted with ethyl acetate. The extracts are washed with water, dried over sodium sulfate and evaporated to dryness to yield 1α,2α-difluoromethylene-3-ethoxy-7α,17α-dimethyl - Δ$^{3,5}$-androstadien-17β-ol which may be further purified by recrystallization from methylene chloride:hexane.

To a solution of 1 g. of 1α,2α-difluoromethylene-3-ethoxy-7α,17α-dimethyl-Δ$^{3,5}$-androstadien-17β-ol in 10 ml. of acetone are added a few drops of 36% hydrochloric acid. The mixture is heated a few minutes at steam bath temperatures, diluted with water and filtered. The solid thus collected is dried and recrystallized from acetone:hexane to yield 1α,2α-difluoromethylene-7α,17α-dimethyl-Δ$^4$-androsten-17β-ol-3-one.

By employing vinyl magnesium bromide, 1-propynyl-magnesium bromide and chloroethynyl magnesium bromide in place of methylmagnesium bromide in the procedure of this example, there are respectively obtained:

1α,2α-difluoromethylene-7α-methyl-17α-vinyl-Δ$^4$-androsten-17β-ol-3-one;
1α,2α-difluoromethylene-7α-methyl-17α-(1-propynyl)-Δ$^4$-androsten-17β-ol-3-one and
1α,2α-difluoromethylene-7α-methyl-17α-chloroethynyl-Δ$^4$-androsten-17β-ol-3-one.

Other typical compounds obtained in accordance with this and the foregoing examples include 1α,2α-difluoromethylene-17α-methyl-Δ$^4$-androsten-17β-ol-3-one;
1α,2α-difluoromethylene-17α-methyl-Δ$^4$-estren-17β-ol-3-one;
1α,2α-difluoromethylene-17α,18-dimethyl-Δ$^4$-estren-17β-ol-3-one;
1α,2α-difluoromethylene-7α,17α-dimethyl-Δ$^4$-estren-17β-ol-3-one;
1α,2α-difluoromethylene-7α,17α,18-trimethyl-Δ$^4$-estren-17β-ol-3-one;
1α,2α-difluoromethylene-17α-vinyl-Δ$^4$-estren-17β-ol-3-one;
1α,2α-difluoromethylene-17α-(1-propynyl)-Δ$^4$-estren-17β-ol-3-one;
1α,2α-difluoromethylene-17α-chloroethynyl-Δ$^4$-estren-17β-ol-3-one;
1α,2α-difluoromethylene-18-methyl-17α-vinyl-Δ$^4$-estren-17β-ol-3-one;
1α,2α-difluoromethylene-18-methyl-17α-(1-propynyl)-Δ$^4$-estren-17β-ol-3-one; and
1α,2α-difluoromethylene-18-methyl-17α-chloroethynyl)-Δ$^4$-estren-17β-ol-3-one.

*Example 6*

A solution of 1 g. of 1α,2α-difluoromethylene-3-ethoxy-Δ$^{3,5}$-androstadien-17-one in 30 ml. of anhydrous benzene is added under nitrogen to a solution of 1.4 g. of potassium in 30 ml. of t-amyl alcohol. Purified acetylene is slowly bubbled through the mixture over a 40 hour period. At the end of this time, the reaction mixture is diluted with water and extracted with benzene. These extracts are washed with water to neutrality, dried over sodium sulfate and evaporated to dryness. Upon chromatography with 2:3 hexane-benzene on alkaline alumina, there is obtained 1α,2α-difluoromethylene-3-ethoxy-17α, ethynyl-Δ$^{3,5}$-androstadien-17β-ol which is recrystallized from acetone:hexane. A solution of 1 g. of 1α,2α-difluoromethylene-3-ethoxy-17α-ethynyl - Δ$^{3,5}$-androstadien-17β-ol in 10 ml. of acetone containing a few drops of 36% hydrochloric acid is heated for 10 minutes at steam bath temperatures, diluted with water and filtered. The solid thus collected is dried and recrystallized from acetone:hexane to yield 1α,2α-difluoromethylene-17α, ethynyl-Δ$^4$-androsten-17β-ol-3-one.

In a similar fashion, there are obtained 1α,2α-difluoromethylene-17α-ethynyl-18-methyl-Δ$^4$-estren-17β-ol-3 - one and 1α,2α-difluoromethylene - 17α-ethynyl-Δ$^4$-estren-17β-ol-3-one from the corresponding 17-keto compounds.

*Example 7*

A solution of 3 g. of 1α,2α-difluoromethylene-3-ethoxy-17α-ethynyl-Δ$^{3,5}$-androstadien-17β-ol in 125 ml. of dioxane containing 0.5 g. of prehydrogenated 10% palladium-on-charcoal is hydrogenated at 25° C. atmospheric pressure until two equivalents of hydrogen are absorbed. The catalyst is then removed by filtration and the filtrate evaporated to dryness to yield 1α,2α-difluoromethylene-3-ethoxy-17α-ethyl-Δ$^{3,5}$-androstadien-17β-ol which is further purified by recrystallization from acetone:hexane. Upon treatment with acid as described in the last paragraph of Example 6, there is obtained, 1α,2α-difluoromethylene-17α-ethyl - Δ$^4$ - androsten - 17β - ol - 3-one. 1α,2α-difluoromethylene - 17α-ethyl-18-methyl-Δ$^4$-estren-17β-ol is obtained in a similar fashion from the corresponding 17-keto compound.

*Example 8*

To a refluxing mixture of 1 g. of 17β-acetoxy-Δ$^4$-androsten-3-one in 10 ml. of dimethyl triethylene glycol ether is added in a dropwise fashion over a two hour period a solution of 25 equivalents of sodium chlorodifluoroacetate in 30 ml. of dimethyl triethylene glycol ether. Heating at reflux is continued until the reaction is complete, as observable from the U.V. spectra. The mixture is filtered and evaporated to dryness under reduced pressure. Chromatography of the residue on alumina, eluting with methylene chloride, yields 4α,5α-difluoromethylene-17β-acetoxy-androstan-3-one.

By utilizing 17β - acetoxy - Δ$^4$ - estren-3-one and 17β-acetoxy - 18 - methyl-Δ$^4$-estren-3-one in place of 17β-acetoxy-Δ$^4$-androsten-3-one in the procedure of this example, there are respectively obtained, 4α,5α-difluoromethylene-17β-acetoxy-estran-3-one and 4α,5α - difluoromethylene-17β-acetoxy - 18 - methyl - estran-3-one. Similarly from 7α - methyl - 17β - acetoxy-Δ⁴-androsten-3-one, there is obtained 4α,5α-difluoromethylene-7α-methyl-17β-acetoxy-androstan-3-one.

*Example 9*

A mixture of 2 g. of 4α,5α-difluoromethylene-17β-acetoxy-androstan-3-one in 30 ml. of 2-methyl-2-ethyl-1,3-dioxolane and 70 mg. of p-toluenesulfonic acid is heated at reflux with distillation for one hour. The mixture is then cooled, diluted with water and extracted with ethyl acetate. The extracts are washed to neutrality, dried and evaporated to dryness to yield 3,3-ethylenedioxy-4α,5α-difluoromethylene - 17β - acetoxyandrostane which is recrystallized from acetone:hexane.

A solution of 1 g. of 3,3-ethylenedioxy-4α,5α-difluoromethylene-17β-acetoxyandrostane in 50 ml. of methanol is heated at reflux for 3 hours with a solution of potassium hydroxide in 1 ml. of water. The reaction mixture is then poured into ice water and the solid which forms collected by filtration, washed with water to neutrality and dried to yield 3,3-ethylenedioxy - 4α,5α - difluoromethyleneandrostan-17β-ol which is recrystallized from methylene chloride:ether.

A solution of 6 g. of 3,3-ethylenedioxy-4α,5α-difluoromethyleneandrostan-17β-ol in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3,3-ethylenedioxy-4α,5α-difluoromethyleneandrostan-17-one which may be further purified by recrystallization from acetone:hexane.

A solution of 1 g. of 3,3-ethylenedioxy-4α,5α-difluoromethyleneandrostane-17-one in 30 ml. of anhydrous benzene is added under nitrogen to a solution of 1.4 g. of potassium in 30 ml. of t-amyl alcohol. A slow current of purified acetylene is then passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yields 3,3-ethylenedioxy-4α,5α-difluoromethylene-17α-ethynylandrostan-17β-ol which is recrystallized from acetone:hexane.

A mixture of 0.5 g. of 3,3-ethylenedioxy-4α,5α-difluoromethylene - 17α - ethynylandrostan - 17β - ol in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 4α,5α-difluoromethylene - 17α - ethynylandrostan - 17β - ol - 3 - one which is recrystallized from acetone:hexane.

*Example 10*

A solution of 5 g. of 3,3-ethylenedioxy-4α,5α-difluoromethylene-7α-methylandrostan-17-one, obtained in the same manner as 3,3 - ethylenedioxy - 4α,5α - difluoromethyleneandrostan-17-one in Example 9, in 250 ml. of thiophene-free benzene is treated with 27.5 ml. of 4 N methylmagnesium bromide in anhydrous ether. The mixture is heated at reflux under anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 3,3-ethylenedioxy-4α,5α-difluoromethylene-7α,17α-dimethylandrostan-17β-ol which is recrystallized from methylene chloride:hexane.

A mixture of 0.5 g. of 3,3-ethylenedioxy-4α,5α-difluoromethylene-7α,17α-dimethylandrostan-17β-ol in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 4α,5α-difluoromethylene-7α,17α-dimethylandrostan - 17β - ol - 3 - one which is recrystallized from acetone:hexane.

*Example 11*

To a suspension of 1 g. of 17β-acetoxy-Δ⁴-androsten-3-one in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-17β-acetoxy-Δ³,⁵-androstadiene which is recrystallized from acetone:hexane.

To a solution of 1 g. of 3-ethoxy-17β-acetoxy-Δ³,⁵-androstadiene in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings were colorless and then with water to neutrality, dried over sodium sulfate and evaporated to dryness to yield 17β-acetoxy-Δ⁴,⁶-androstadien-3-one, which may be further purified through recrystallization from acetone:hexane.

To a refluxing solution of 1 g. of 17β-acetoxy-Δ⁴,⁶-androstadien-3-one in 10 ml. of dimethyl diethylene glycol ether is added over a two hour period in a dropwise fashion with stirring, a solution of 35 equivalents of sodium chlorodifluoroacetate in 40 ml. of dimethyl diethylene glycol ether. The mixture is refluxed until the U.V. spectra indicates the disappearance of the 3-keto-Δ⁴,⁶-diene system and is then filtered. The filtrate is evaporated to dryness and the residue is chromatographed on alumina, eluting with methylene chloride, to yield 6α,7α-difluoromethylene-17β-acetoxy-Δ⁴-androsten-3-one.

6α,7α - difluoromethylene - 17β-acetoxy-Δ⁴-estren-3-one and 6α,7α - difluoromethylene-18-methyl-Δ⁴-estren-3-one are similarly obtained via the procedure of this example, some 6β,7β-isomer also being formed with the 10-dimethyl starting material.

*Example 12*

A solution of 1 g. of 6α,7α-difluoromethylene-17β-acetoxy-Δ⁴-androstene-3-one in 50 ml. of methanol is heated at reflux for 3 hours with a solution of potassium hydroxide in 1 ml. of water. The reaction mixture is then poured into ice water and the solid which forms collected by filtration, washed with water to neutrality and dried to yield 6α,7α-difluoromethylene-Δ⁴-androsten-17β-ol-3-one which is recrystallized from methylene chloride:ether.

A solution of 6 g. of 6α,7α-difluoromethylene-Δ⁴-androsten-17β-ol-3-one in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed with water, dried and evaporated to yield 6α,7α-difluoromethylene-Δ⁴-androsten-3,17-dione, which may be further purified by recrystallization from acetone:hexane.

A solution of 5 g. of 6α,7α-difluoromethylene-Δ⁴-androsten-3,17-dione in 250 ml. of thiophene-free benzene is treated with an equimolar amount of methylmagnesium bromide in anhydrous ether. The mixture is heated at reflux under anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 6α,7α - difluoromethylene-17α-methyl-Δ⁴-androsten-17β-ol-3-one which is recrystallied from methylene chloride:hexane.

*Example 13*

A solution of 1 g. of 6α,7α-difluoromethylene-Δ⁴-estren-3,17-dione, obtained in the same fashion as the corresponding Δ⁴-androstene in Example 12, in 30 ml. of anhydrous benzene is added under nitrogen to a solution of 1.4 g. of potassium in 30 ml. of t-amyl alcohol. A slow current of purified acetylene is then passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yields 6α,7α-difluoromethylene-17α-ethynyl-Δ⁴-estren-17β-ol-3-one which is recrystallized from acetone:hexane.

*Example 14*

A mixture of 1 g. of Δ⁴,⁹⁽¹⁰⁾-estradien-17β-ol-3-one in 4 ml. of pyridine and 2 ml. of acetic anhydride is allowed to stand at room temperature for 15 hours. The mixture is then poured into ice water and the solid which forms is collected by filtration, washed with water and dried to yield 17β-acetoxy-Δ⁴,⁹⁽¹⁰⁾-estradien-3-one which may be further purified through recrystalliation from acetone:hexane.

To a gently refluxing and stirred solution of 1 g. of 17β-acetoxy-Δ⁴,⁹⁽¹⁰⁾-estradien-3-one in 8 ml. of dimethyl diethylene glycol ether, there is added in a dropwise fashion over a two hour period a solution of 30 equivalents of sodium chlorodifluoroacetate in 30 ml. of dimethyl diethylene glycol ether. Refluxing is continued until the reaction is complete, as indicated by the U.V. spectra, and the mixture is then filtered. The filtrate is then evaporated to dryness under reduced pressure and the residue chromatographed with methylene chloride on alumina to yield two major components comprising 9α,10α-difluoromethylene-17β-acetoxy-Δ⁴-estren-3-one and 9β,10β-difluoromethylene-17β-acetoxy-Δ⁴-estren-3-one, either of which may be employed in the following procedures.

To a suspension of 1 g. of 9α,10α-difluoromethylene-17β-acetoxy-Δ⁴-estren-3-one in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy - 9α,10α - difluoromethylene - 17β-acetoxy-Δ³,⁵⁽⁶⁾-estradiene which is recrystallized from acetone:hexane.

To a solution of 1 g. of 3-ethoxy-9α,10α-difluoromethylene-Δ³,⁵-estradiene in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings are colorless and then with water to neutrality, dried over sodium sulfate and evaporated to dryness to yield 9α,10α-difluoromethylene-17β-acetoxy-Δ⁴,⁶-estradien-3-one which may be further purified through recrystallization from acetone:hexane.

To 10 ml. of 3 M ethereal methylmagnesium bromide in 20 ml. of tetrahydrofuran, cooled in an ice bath and stirred under nitrogen are added the 0.16 g. of cuprous chloride and a solution of 1 g. of 9α,10α-difluoromethylene-17β-acetoxy-Δ⁴,⁶-estradien-3-one in 13 ml. of tetrahydrofuran. The ice bath is then removed and the mixture is stirred at room temperature for 25 minutes and poured into a mixture of ether, ice and dilute hydrochloric acid which has been saturated with sodium chloride. The ethereal phase is separated and washed sequentially with dilute hydrochloric acid, saturated aqueous sodium chloride solution, dilute sodium hydroxide solution and saturated sodium chloride solution. These extracts are back extracted with ether and the combined ethereal extracts are dried over magnesium sulfate and evaporated. The residue is chromatographed on Florisil absorbent to yield 7α-methyl-9α,10α-difluoromethylene-Δ⁴-estren-17β-ol-3-one.

To a suspension of 1 g. of 7α-methyl-9α,10α-difluoromethylene-Δ⁴-estren-17β-ol-3-one in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-7α-methyl - 9α,10α - difluoromethylene-Δ³,⁵⁽⁶⁾-estradien-17β-ol which is recrystallized from acetone:hexane.

A solution of 6 g. of 3-ethoxy-7α-methyl-9α,10α-difluoromethylene-Δ³,⁵-estradien-17β-ol in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3-ethoxy-7α-methyl-9α,10α-difluoromethylene-Δ³,⁵-estradien-17-one.

A solution of 1 g. of 3-ethoxy-7α-methyl-9α,10α-difluoromethylene-Δ³,⁵-estradien-17-one in 30 ml. of anhydrous benzene is added under nitrogen to a solution of 1.4 g. of potassium in 30 ml. of t-amyl alcohol. A slow current of purified acetylene is then passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yields 3-ethoxy-7α-methyl-9α,10α - difluoromethylene-17α-ethynyl-Δ³,⁵-estradien-17β-ol which is recrystallized from acetone:hexane.

To a solution of 1 g. of 3-ethoxy-7α-methyl-9α,10α-difluoromethylene - 17α - ethynyl-Δ³,⁵-estradien-17β-ol in 10 ml. of acetone are added a few drops of 36% hydrochloric acid. The mixture is heated a few minutes at steam bath temperatures, diluted with water and filtered. The solid thus collected is dried and recrystallized from acetone:hexane to yield 7α-methyl-9α,10α-difluoromethylene-17α-ethynyl-Δ⁴-estren-17β-ol-3-one.

7α-methyl-9β,10β-difluoromethylene - 17α - ethynyl-Δ⁴-estren-17β-ol-3-one is obtained in a similar fashion.

*Example 15*

To a vigorously refluxing and stirred solution of 1 g. of 17β-benzoyloxy-Δ⁴,⁹⁽¹⁰⁾,¹¹-estratrien-3-one in 15 ml. of s-dimethoxyethane is added in a dropwise fashion over a two-hour period, a solution of 5 equivalents of sodium trichloroacetate in 40 ml. of the same solvent. Refluxing is continued until the U.V. spectra indicates the disappearance of the Δ¹¹ double bond and the mixture is then filtered. The filtrate is evaporated to dryness under reduced pressure and the residue is chromatographed on alumina, eluting with methylene chloride to yield 11α,12α - dichloromethylene - 17β - benzoyloxy-Δ⁴,⁹⁽¹⁰⁾-estradien-3-one.

A solution of 1 g. of 11α,12α-dichloromethylene-17β-benzoyloxy-Δ⁴,⁹⁽¹⁰⁾-estradien-3-one in 50 ml. of methanol is heated at reflux for 3 hours with a solution of potassium hydroxide in 1 ml. of water. The reaction mixture is then poured into ice water and the solid which forms collected by filtration, washed with water to neutrality and dried to yield 11α,12α-dichloromethylene-Δ⁴,⁹⁽¹⁰⁾-estradiene - 17β - ol - 3 - one which is recrystallized from methylene chloride:ether.

A solution of 6 g. of 11α,12α-dichloromethylene-Δ⁴,⁹⁽¹⁰⁾-estradien-17β-ol-3-one in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 11α,12α-dichloromethylene-Δ⁴,⁹⁽¹⁰⁾-estradien-3,17-dione which may be further purified by recrystallization from acetone:hexane.

A solution of 5 g. of 11α,12α-dichloromethylene-Δ⁴,⁹⁽¹⁰⁾-estradiene-3,17-dione in 250 ml. of thiophene-free benzene is treated with an equimolar amount of methylmagnesium bromide in anhydrous ether. The mixture is heated at reflux under anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 11α,12α-dichloromethylene-17α-methyl-Δ⁴,⁹⁽¹⁰⁾-estradien-17β-ol-3-one which is recrystallized from methylene chloride:hexane.

*Example 16*

A mixture of 1 g. of 3 - acetoxy-5β-androstan-17-one, 25 ml. of dry benzene, 5 ml. of ethylene glycol and 50 mg. of p-toluene-sulfonic acid monohydrate is refluxed for 15 hours using a water separator. The reaction mixture is then washed with aqueous sodium bicarbonate solution and water, dried and evaporated to dryness to yield 3-acetoxy-17,17-ethylenedioxy-5β-androstane.

A solution of 1 g. of 3-acetoxy-17,17-ethylenedioxy-5β-androstane in 15 ml. of tetrahydrofuran is treated with an equimolar amount of phenyltrimethylammonium tribromide. The mixture is stirred at room temperature until colorless and then poured into water. The solid thus formed is collected by filtration, washed with water and dried to yield 3 - acetoxy-16-bromo-17,17-ethylenedioxy-5β-androstane.

A mixture of 4 g. of 3-acetoxy-16-bromo-17,17-ethylenedioxy-5β-androstane, 6 g. of potassium acetate 120 ml. of acetone and 100 ml. of water is heated at reflux for 6 hours. At the end of this time, the mixture is diluted with water and extracted with ethyl acetate. These extracts are washed with water, dried over sodium sulfate and evaporated to dryness to yield 3-acetoxy-17,17-ethylenedioxy-Δ¹⁵-androstene which is recrystallized from methylene chloride:methanol.

A mixture of 0.5 g. of 3-acetoxy-17,17-ethylenedioxy-Δ¹⁵-androstene in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 3-acetoxy-Δ¹⁵-5β-androsten-17-one which is recrystallized from acetone:hexane.

To a stirred solution of 1 g. of 3-acetoxy-Δ¹⁵-5β-androsten-17-one in 10 ml. of dimethyl diethylene glycol ether, heated at reflux, is added in a dropwise fashion over a two hours period, a solution of 30 equivalents of sodium dichlorofluoroacetate in 30 ml. of dimethyl diethylene glycol ether. Heating at reflux is continued until the U.V. spectrum indicated the disappearance of the Δ¹⁶-unsaturation and the mixture is filtered. Upon evaporation in vacuo of the filtrate to dryness and chromatography of the residue on alumina with methylene chloride, there are obtained 3-acetoxy-15α-16α-chlorofluoromethylene - 5β-androstan-17 - one and 3-acetoxy-15β,16β-chlorofluoromethylene-5β-androstan-17-one, either of which may be subjected to the following procedures.

A solution of 1 g. of 3-acetoxy-15α-16α-chlorofluoromethylene-5β-androstan-17-one in 50 ml. of methanol is heated at reflux for 3 hours with a solution of potassium hydroxide in 1 ml. of water. The reaction mixture is then poured into ice water and the solid which forms collected by filtration, washed with water to neutrality and dried to yield 15α-16α-chlorofluoromethylene-5β-androstan - 3-ol-17-one which is recrystallized from methylene chloride: ether.

To a stirred solution of 1 g. of 15α,16α-chlorofluoromethylene-5β-androstan-3-ol-17-one in 10 ml. of acetone, cooled to 0° C., is added under nitrogen a solution of 8N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0.5° C. and diluted with water. The solid which forms is collected by filtration, washed with water, and dried under vacuum to yield 15α,16α-chlorofluoromethylene-5β-androstane-3,17-dione which may be further purified by recrystallization from acetone:hexane.

To a stirred solution of 1 g. of 15α,16α-chlorofluoromethylene-5β-androstane-3,17-dione in 17 ml. of chloroform and 20 ml. of glacial acetic acid, cooled to −10° C., are added a few drops of a 15% solution of hydrogen bromide in acetic acid followed by a solution of 0.46 g. of bromine in 12 ml. of chloroform, the latter at such a rate that the reaction mixture maintains a pale yellow color. A cold solution of 2.5 g. of sodium acetate in 17 ml. of water is then added. The layers are separated and the aqueous layer is extracted with chloroform. The combined extracts and organic layer are washed with water, dilute potassium bicarbonate solution and with water, dried over sodium sulfate and evaporated to dryness to yield the 4-bromo intermediate, 1 g. of which is dissolved in 20 ml. of dimethylformamide containing 0.5 g. of lithium chloride. This solution is stirred under nitrogen at steam bath temperatures for four hours. After cooling to 10° C., 11 ml. of water are added with stirring at such a rate that the temperature is maintained below 30° C. Stirring in an ice bath is continued until solid forms and this material is then collected by filtration, washed with cold 1:1 water:dimethylformamide and then water and dried to yield 15α,16α-chlorofluoromethylene-Δ⁴-androstene-3,17-dione which is further purified through recrystallization from acetone with charcoal decolorization as necessary.

A solution of 15α,16α-chlorofluoromethylene-Δ⁴-androstene-3,17-dione in 30 ml. of anhydrous benzene is added under nitrogen to a solution of 1.4 g. of potassium in 30 ml. of t-amyl alcohol. A slow current of purified acetylene is then passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yields 15α,16α-chlorofluoromethylene-17α-ethynyl - Δ⁴-androsten-17β-ol-3-one which is recrystallized from acetone:hexane.

*Example 17*

A solution of 5 g. of 3-acetoxy-15β, 16β-difluoromethylene-5β-androstan-17-one, obtained in the same fashion as 3-acetoxy-15α, 16α-chlorofluoromethylene-5β-androstan-17-one in Example 16 using however, sodium chlorodifluoroacetate in refluxing dimethyl diethylene glycol ether, in place of sodium dichlorofluoroacetate, in 250 ml. of thiophene-free benzene is treated with 27.5 ml. of 4 N methylmagnesium bromide in anhydrous ether. The mixture is heated at reflux under anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 15β, 16β-difluoromethylene-17α- methyl-5β-androstane-3, 17β-diol which is recrystallized from methylene chloride:hexane.

To a stirred solution of 1 g. of 15β, 16β-difluoromethylene-17α-methyl-5β-androstane-3, 17β-diol in 10 ml. of acetone, cooled to 0° C., is added under nitrogen a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes ot 0.5° C., and diluted with water. The solid which forms is collected by filtration, washed with water and dried under vacuum to yield 15β, 16β-difluoromethylene - 17α - methyl - 5β - androstan - 17β-ol-3-one which may be further purified by recrystallization from acetone:hexane.

To a stirred solution of 1 g. of 15β, 16β-difluoromethylene-17α-methyl-5β-androstan-17β-ol-3-one in 17 ml. of chloroform and 20 ml. of glacial acetic acid, cooled to −10° C., are added a few drops of a 15% solution of hydrogen bromide in acetic acid followed by a solution of 0.46 g. of bromine in 12 ml. of chloroform, the latter at such a rate that the reaction mixture maintains a pale yellow color. A cold solution of 2.5 g. of sodium acetate in 17 ml. of water is then added. The layers are separated and the aqueous layer is extracted with chloroform. The combined extracts and organic layer are washed with water, dilute potassium bicarbonate solution and with water, dried over sodium sulfate and evaporated to dryness to yield the 4-bromo intermediate, 1 g. of which is dissolved in 20 ml. of dimethylformamide containing 0.5 g. of lithium chloride. This solution is stirred under nitrogen at steam bath temperatures for four hours. After cooling to 10° C., 11 ml. of water are added with stirring at such a rate that the temperature is maintained below 30° C. Stirring in an ice bath is continued until solid forms and this material is then collected by filtration, washed with cold 1:1 water:dimethylformamide and then water and dried to yield 15β, 16β-difluoromethylene-17α-methyl-Δ⁴-androsten-17β-ol-3-one which is further purified through recrystallization from acetone with charcoal decolorization as necessary.

*Example 18*

To a solution of 5 g. of Δ⁴-pregnene-11β, 17α, 21-triol-3,20-dione, in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate and evaporated to dryness to yield 17α,20;20,21-bismethylenedioxy-Δ⁴-pregnen-11β-ol-3-one which is recrystallized from methanol:ether.

To a solution of 1 g. of 17α,20;20,21-bismethylenedioxy-Δ⁴-pregnen-11β-ol-3-one in 75 ml. of tetrahydrofuran and 125 ml. of liquid ammonia is added over a 20-minute period 0.27 g. of lithium. The mixture is refluxed with stirring for 2½ hours and its color then discharged by the careful addition of ethanol. The resulting solution is allowed to stand at room temperature until the ammonia has evaporated and the residue is next shaken with 100 ml. of 1:1 water:methylene chloride. The aqueous layer is separated and extracted with methylene chloride and the combined extracts and organic layer are dried over magnesium sulfate and evaporated. This residue is dissolved in 100 ml. of 5:9 methylene chloride:acetone and titrated with 8 N chromic acid, maintaining a temperature of 25° C. Thirteen milliliters of water are then added with gentle shaking and the aqueous phase is separated and extracted with methylene chloride. The combined extracts and organic layer are dried over magnesium sulfate and evaporated to dryness to yield 17α,20;20,21 - bismethylenedioxy - 5α- pregnan - 11β- ol-3-one which may be further purified through recrystallization from ether:hexane.

To a stirred solution of 1 g. of 17α,20;20,21-bismethylenedioxy-5α-pregnan-11β-ol-3-one and 6.6 g. of p-toluenesulfonic acid in 300 ml. of glacial acetic acid is added, over a 10 minute period, a solution of 1.1 molar equivalent of bromine and 2.45 g. of sodium acetate in 110 ml. of glacial acetic acid. After stirring for an additional 10 minute period, a solution of 75 g. of sodium acetate in 150 ml. of glacial acetic acid is added and stirring is then continued at 20° C. for 5 minutes. The reaction mixture is next poured into 1 liter of ice water and solid which forms is collected and dissolved in methylene chloride. This solution is washed with water, dilute sodium bicarbonate solution and water, dried and evaporated to dryness. The residue is dissolved in 60 ml. of dimethylformamide and added to a well stirred suspension of 12.5 g. of calcium carbonate in 440 ml. of dimethylacetamide, heated at reflux. Refluxing is continued for 45 minutes and the mixture is then filtered and concentrated to about 60 ml. under reduced pressure. Afater the addition of 5 ml. of hexane, the mixture is filtered and the filtrate is evaporated to dryness. This residue is chromatographed on acid washed alumina with 3:1 benzene:chloroform to yield 17α,20;20,21-bismethylenedioxy-Δ¹-5α-pregnen-11β-ol-3-one which may be recrystallized from cyclohexane:ethyl acetate.

A solution of 45 equivalents of sodium chlorodifluoroacetate in 50 ml. of dimethyl diethylene glycol ether is added in a dropwise fashion to a refluxing solution of 17α,20;20,21 - bismethylenedioxy - Δ¹ - 5α - pregnen - 11β-ol-3-one in 10 ml. of dimethyl diethylene glycol ether. Refluxing is discontinued upon the absence of any change in the U.V. spectra and the mixture is then filtered and evaporated to dryness under reduced pressure. The residue is then heated at reflux for one hour with a 1% methanolic solution of potassium hydroxide. At the end of this time, the reaction mixture is neutralized with dilute hydrochloric acid and evaporated to dryness. The residue is then chromatographed on alumina with methylene chloride to yield 1α,2α - difluoromethylene - 17α,20;20,21-bismethylenedioxy-5α-pregnan-11β-ol-3-one.

To a stirred solution of 1 g. of 1α,2α-difluoromethylene-17α,20;20,21 - bismethylenedioxy - 5α-pregnan-11β-ol-3-one and 6.6 g. of p-toluenesulfonic acid in 330 ml. of glacial acetic acid is added, over a 10 minute period, a solution of 1.1 molar equivalent of bromine and 2.45 g. of sodium acetate in 110 ml. of glacial acetic acid. After stirring for an additional 10 minute period a solution of 75 g. of sodium acetate in 150 ml. of glacial acetic acid is added and stirring is then continued at 20° C. for 5 minutes. The reaction mixture is next poured into 1 liter of ice water and solid which forms is collected and dissolved in methylene chloride. This solution is washed with water, dilute sodium bicarbonate solution and water, dried and evaporated to dryness. The residue is dissolved in 60 ml. of dimethylformamide and added to a well stirred suspension of 12.5 g. of calcium carbonate in 440 ml. of dimethylacetamide, heated at reflux. Refluxing is continued for 45 minutes and the mixture is then filtered and concentrated to about 60 ml. under reduced pressure. After the addition of 5 ml. of hexane, the mixture is filtered and the filtrate is evaporated to dryness. This residue is chromatographed on acid washed alumina with 3:1 benzene:chloroform to yield 1α,2α-difluoromethylene-17α,20;20,21 - bismethylenedioxy-Δ⁴-pregnen-11β-ol-3-one which may be recrystallized from cyclohexane:ethyl acetate.

A suspension of 1 g. of 1α,2α-difluoromethylene-17α,20;20,21 - bismethylenedioxy - Δ⁴-pregnen-11β-ol-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane: ethyl acetate to yield 1α,2α-difluoromethylene-Δ⁴-pregnene-11β,17α,21-triol-3,20-dione which may be further purified through recrystallization from isopropanol.

In a similar fashion the following compounds are obtained by employing the correspondingly substituted starting materials in place of Δ⁴-pregnene-11β,17α,21-triol-3,20-dione:

1α,2α-difluoromethylene-16α-methyl-Δ⁴-pregnene-11β,-17α,21-triol-3,20-dione;
1α,2α-difluoromethylene-16β-methyl-Δ⁴-pregnene-11β,-17α,21-triol-3,20-dione;
1α,2α-difluoromethylene-Δ⁴-pregnene-11β,16α,17α,21-tetrol-3,20-dione;
1α,2α-difluoromethylene-Δ⁴-pregnene-17α,21-diol-3,20-dione;
1α,2α-difluoromethylene-6α-methyl-Δ⁴-pregnene-11β,-17α,21-triol-3,20-dione;
1α,2α-difluoromethylene-Δ⁴-pregnene-17α,21-diol-3,11,-20-trione; and
1α,2α-difluoromethylene-6α,16α-dimethyl-Δ⁴-pregnen-11β,17α,21-triol-3,20-dione.

Example 19

To 120 ml. of acetone containing 1 g. of 1α,2α-difluoromethylene - Δ⁴-pregnene-11β,16α,17α,21-tetrol-3,20-dione are added 30 drops of 70% perchloric acid. The mixture is allowed to stand 1 hour at room temperature, 30 drops of pyridine are added and the solution is evaporated to dryness under reduced pressure. Thirty milliliters of water are added to the residue and this mixture is extracted several times with ethyl acetate. The combined extracts are washed to neutrality with water, dried over sodium sulfate and evaporated to dryness. The residue upon trituration with methanol yields 1α,2α-difluoromethylene - 16α,17α - isopropylidenedioxy-Δ⁴-pregnene-11β,21-diol-3,20-dione which is recrystallized from methanol.

A mixture of 1 g. of 1α,2α-difluoromethylene-16α,17α-isopropylidenedioxy - Δ⁴-pregnene-11β,21-diol-3,20-dione, 4 ml. of pyridine and 2 ml. of acetic anhydride is allowed to stand at room temperature for 15 hours. The mixture is then poured into ice water and the solid which forms is collected by filtration, washed with water and dried to yield 1α,2α - difluoromethylene-16α,17α-isopropylidenedioxy-21-acetoxy-Δ⁴-pregnen-11β-ol-3,20-dione which may be further purified through recrystallization from acetone: hexane.

Example 20

One gram of 1α,2α-difluoromethylene-17α,20;20,21-bis methylenedioxy-Δ⁴-pregnen-11β-ol-3-one is dissolved with slow heating in 12.5 ml. of dimethylformamide. To the cooled mixture is then added 0.42 g. of methanesulfonyl chloride and 0.5 ml. of pyridine. After heating the reaction mixture at 80° C. for 30 minutes it is cooled, diluted with water and extracted with ethyl acetate. The extracts are washed with water, dried over sodium sulfate and evaporated to yield 1α,2α-difluoromethylene-17α,20;20,-21 - bis methylenedioxy-Δ⁴,⁹⁽¹¹⁾-pregnadien-3-one which may be further purified by recrystallization from acetone:hexane.

Twenty-eight grams of N-bromoacetamide are added over a one hour period with stirring, in the dark and at room temperature, to a mixture of 50 g. of 1α,2α-difluoromethylene - 17α,20;20,21 - bis methylenedioxy-Δ⁴,-⁹⁽¹¹⁾-pregnadien-3-one, 500 ml. of pure dioxane and 8 ml. of 0.4 N perchloric acid. The reaction mixture is stirred for an additional hour and a solution of 10% sodium sulfite is then added until negative to potassium iodide starch indicator paper. Ice is added and the mixture extracted with chloroform. These extracts are washed consecutively with water, 5% aqueous sodium bicarbonate solution and water, and the solvent then removed by distillation in vacuo. The residue is triturated with acetone to yield the bromohydrin intermediate.

A mixture of 20 g. of anhydrous potassium acetate and 200 ml. of acetone is heated almost to boiling and a solution of 17 g. of the bromohydrin intermediate in 200 ml. of acetone is then slowly added with stirring. The mixture is refluxed for 10 hours, cooled and almost all of the acetone is removed by distillation. Iced water is then added and the solid which forms collected by filtration, washed with water and dried, to yield 1α,2α-difluoromethylene - 9β,11β-oxido-17α,20;20,21-bis methylenedioxy-Δ⁴-pregnen-3-one which may be further purified through recrystallization from methylene chloride:benzene.

To a stirred solution of 1.8 g. of 1α,2α-difluoromethylene - 9β,11β - oxido - 17α,20;20,21-bismethylenedioxy-Δ⁴-pregnen-3-one in 30 ml. of methylene chloride, cooled to 0° C., is added a cooled solution (−70° C.) of 2.11 g. of anhydrous hydrogen fluoride in 3.7 ml. of tetrahydrofuran over a period of 20 minutes. The mixture is stirred at a temperature below 10° C. for 6 hours and then neutralized by the cautious addition of 5% aqueous sodium bicarbonate solution. The organic layer is separated, washed with water, dried over sodium sulfate and concentrated until solid forms. The cooled mixture is then filtered and the solid dissolved in hot ethyl acetate. This solution is filtered hot and then cooled and the solid which forms collected by filtration to yield 1α,2α-difluoromethylene-9α-fluoro-17α,20;20,21-bis methylenedioxy-Δ⁴-pregnen-11β-ol-3-one.

A suspension of 1 g. of 1α,2α-difluoromethylene-9α-fluoro - 17α,20;20,21-bis methylenedioxy-Δ⁴-pregnen-11β-ol-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 1α,2α-difluoromethylene-9α - fluoro-Δ⁴-pregnen-11β,17α,21-triol-3,20-dione, which may be further purified through recrystallization from isopropanol.

In a similar fashion, the following compounds are obtained:

1α,2α-difluoromethylene-9α-fluoro-16α-methyl-Δ⁴-pregnene-11β,17α,21-triol-3,20-dione;
1α,2α - difluoromethylene - 9α - fluoro-16β-methyl-Δ⁴-pregnene-11β,17α,21-triol-3,20-dione; and
1α,2α - difluoromethylene - 6α - methyl-9α-fluoro-Δ⁴-pregnene-11β,17α-21-triol-3,20-dione.

Likewise by subjecting 1α,2α-difluoromethylene-16α, 17α - isopropylidenedioxy - 21-acetoxy-Δ⁴-pregnen-11β-ol-3,20-dione to the procedure of this example save for the final hydrolysis with hydrofluoric acid, there is obtained, 1α,2α - difluoromethylene - 9α - fluoro-16α,17α-isopropylidenedioxy-Δ⁴-pregnene-11β,21-diol-3,20-dione while execution of the final hydrolysis step yields 1α,2α-difluoromethylene - 9α - fluoro-Δ⁴-pregnene-11β,16α,17α-21-tetrol-3,20-dione.

Example 21

To a suspension of 1 g. of 1α,2α-difluoromethylene-17α,20;20,21-bismethylenedioxy-Δ⁴-pregnene-3,11-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 1α,2α-difluoromethylene-3-ethoxy-17α,20;20,21 - bismethylenedioxy - Δ³,⁵⁽⁶⁾ - pregnadien-11-one which is recrystallized from acetone:hexane.

A stream of perchloryl fluoride is passed through a solution of 1 g. of 1α,2α-difluoromethylene-3-ethoxy-17α, 20;20,21-bismethylenedioxy-Δ³,⁵⁽⁶⁾-pregnadien - 11-one in 25 ml. of dimethylformamide, cooled to 0° C., for 5 minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro isomers. The latter, which predominates, is dissolved in 50 ml. of glacial acetic acid and through this solution is passed a stream of dry hydrogen chloride for a period of 24 hours and at a temperature of 15° C. The mixture is poured into cold water and the solid which forms is collected by filtration, washed with water and dried to yield 1α,2α-difluoromethylene - 6α - fluoro - 17α,20;20,21-bismethylenedioxy-$\Delta^4$-pregnene-3,11-dione which is recrystallized from acetone:hexane.

A solution of 2 g. of sodium borohydride in 30 ml. of methanol is added with stirring to a solution of 2 g. of 1α,2α - difluoromethylene - 6α - fluoro - 17α,20;20,21-bis-methylenedioxy-$\Delta^4$-pregnene-3,11-dione in 40 ml. of tetrahydrofuran. The mixture is allowed to stand at room temperature for 15 hours and the excess reagent is then decomposed by the addition of acetic acid. The mixture is next concentrated to small volume under reduced pressure, diluted with water and extracted with ethyl acetate. These extracts are washed with water, dried and evaporated to yield 1α,2α-difluoromethylene-6α-fluoro-17α,20; 20,21-bismethylenedioxy-$\Delta^4$-pregnene-3,11-diol which is further purified through recrystallization from acetone: hexane.

A mixture of 1 g. of 1α,2α-difluoromethylene-6α-fluoro-17α,20;20,21-bismethylenedioxy-$\Delta^4$-pregnene-3,11-diol in 20 ml. of dioxane, and 1.1 molar equivalents of 2,3-dichloro-5,6-dicyano-1,4-benzoquinone is allowed to stand at room temperature for 3 hours. The solid formed during the reaction is removed by filtration and the filtrate evaporated to dryness. The residue is dissolved in acetone and filtered through 20 g. of alumina to yield 1α,2α-difluoromethylene - 6α - fluoro - 17α,20;20,21-bismethylenedioxy-$\Delta^4$-pregnen-11β-ol-3-one which may be further purified by recrystallization from acetone:hexane.

A suspension of 1 g. of 1α,2α-difluoromethylene-6α-fluoro - 17α,20;20,21 - bismethylenedioxy - $\Delta^4$ - pregnen-11β-ol-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 1α,2α-difluoromethylene-6α-fluoro-$\Delta^4$-pregnene - 11β,17α,21 - triol-3,20-dione which may be further purified through recrystallization from isopropanol.

Example 22

To a cooled solution (0° C.) of 3.4 g. of 1α,2α-difluoromethylene - 9α - fluoro-16α-methyl-$\Delta^4$-pregnene-11β,17α, 21-triol-3,20-dione in 20 ml. of 9:1 chloroform:pyridine is added in small portions 1.4 g. of methanesulfonyl chloride. The reaction mixture is allowed to stand for 14 hours at 0° C. and is then washed with dilute hydrochloric acid, water and sodium bicarbonate solution. The chloroform is removed by evaporation under reduced pressure and the residue is dissolved in 20 ml. of acetone treated at room temperature and under stirring with 4 g. of sodium iodide. Sodium thiosulfate solution is added to decolorize the mixture, followed by the addition of water. The solid which forms is collected by filtration and dried in vacuum to yield 1α,2α - difluoromethylene-9α-fluoro-16α-methyl-21-iodo-$\Delta^4$-pregnene-11β,17α-diol-3,20-dione. This material is dissolved in 20 ml. of acetonitrile and treated dropwise with 1.4 g. of silver fluoride in 3 ml. of water. The mixture is allowed to stand at room temperature for 24 hours and then filtered. The filtrate is concentrated under vacuum and the solid which forms is collected and dried to yield 1α,2α - difluoromethylene - 9α,21 - difluoro-16α-methyl-$\Delta^4$-pregnene-11β,17α-diol-3,20-dione which is recrystallized from methanol:acetone.

Example 23

A mixture of 1 g. of 1α,2α-difluoromethylene-9α-fluoro-$\Delta^4$-pregnene-11β,17α,21-triol-3,20-dione, 4 ml. of pyridine and 2 ml. of acetic anhydride is allowed to stand at room temperature for 15 hours. The mixture is then poured into ice water and the solid which forms is collected by filtration, washed with water and dried to yield 1α,2α-difluoromethylene - 9α - fluoro-21-acetoxy-$\Delta^4$-pregnene-11β,17α-diol-3,20-dione which may be further purified through recrystallization from acetone:hexane.

To a suspension of 1 g. of 1α,2α-difluoromethylene-9α-fluoro-21-acetoxy-$\Delta^4$-pregnene-11β,17α-diol-3,20-dione in 27 ml. of methanol and 1 ml. of water, under nitrogen, is added 1.4 g. of semi-carbazide hydrochloride and 0.74 g. of sodium bicarbonate. The mixture is heated at reflux for three hours and then at 45° C. for 20 hours. The suspension is cooled and 36 ml. of water are slowly added to it. The solid is collected by filtration, washed with water and dried to yield 1α,2α-difluoromethylene-9α-fluoro-21-acetoxy-$\Delta^4$-pregnene-11β,17α-diol-3,20-bis semicarbazone which is recrystallized from pyridine:methanol.

A solution of 1 g. of 1α,2α-difluoromethylene-9α-fluoro-21-acetoxy-$\Delta^4$-pregnene - 11β,17α - diol-3,20-bis semicarbazone in 20 ml. of acetic acid and 1 ml. of acetic anhydride is heated at reflux under nitrogen for 1 hour. The reaction mixture is then concentrated under reduced pressure to a volume of about 12 ml. and treated with 6 ml. of water and 3 ml. of pyruvic acid. The mixture is allowed to stand at room temperature for 40 hours and at 60° C. for 2 hours and is then diluted with water and extracted with chloroform. These extracts are washed with water, dilute potassium bicarbonate solution and water, dried over magnesium sulfate and evaporated to dryness under reduced pressure. The residue is chromatographed on neutral alumina with benzene to yield 1α,2α-difluoromethylene - 9α - fluoro-21-acetoxy-$\Delta^{4,16}$-pregnadien-11β-ol-3,20-dione which may be recrystallized from acetone: ether.

A solution of 1 g. of 1α,2α-difluoromethylene-9α-fluoro-21-acetoxy-$\Delta^{4,16}$-pregnadien-11β-ol-3,20-dione in 30 ml. of ethereal solution of diazomethane is allowed to stand at room temperature for 24 hours. One milliliter of acetic acid is then added to the mixture which is then evaporated to dryness under reduced pressure. The residue is heated gradually to 180° C. in vacuo, cooled and recrystallized from acetone:hexane to yield 1α,2α-difluoromethylene - 9α - fluoro-16-methyl-21-acetoxy-$\Delta^{4,16}$-pregnadien-11β-ol-3,20-dione.

To a stirred solution of 5 g. of 1α,2α-difluoromethylene - 9 - fluoro - 16-methyl-21-acetoxy-$\Delta^{4,16}$-pregnadien-11β-ol-3,20-dione in 350 ml. of methanol is added 20 ml. of 4 N aqueous sodium hydroxide and 20 ml. of 30% hydrogen peroxide, maintaining a temperature of approximately 15° C. The solution is allowed to stand at 0° C. for 15 hours and then poured into ice water. The solid which forms is collected by filtration, washed with water and dried, to yield 1α,2α-difluoromethylene-9α-fluoro-16α, 17α - oxido - 16β - methyl-21-acetoxy-$\Delta^4$-pregnen-11β-ol-3,20-dione which may be further purified by recrystallization from acetone:hexane.

To a solution of 1 g. of 1α,2α-difluoromethylene-9α-fluoro - 16α,17α - oxido - 16β - methyl-21-acetoxy-$\Delta^4$-pregnen-11β-ol-3,20-dione in 10 ml. of dioxane is added 0.5 ml. of a 50% w./v. solution of hydrogen bromide in acetic acid. After being allowed to stand for 10 minutes at room temperature, the mixture is poured into water and extracted with ether. These ethereal extracts are dried over sodium sulfate and evaporated to dryness to yield 1α,2α - difluoromethylene - 9α - fluoro-16-methylene-21-acetoxy-$\Delta^4$-pregnene-11β,17α-diol-3,20-dione.

A solution of 1 g. of 1α,2α-difluoromethylene-9α-fluoro-16 - methylene-21-acetoxy-$\Delta^4$-pregnene-11β,17α-diol-3,20- dione, in 50 ml. of methanol is heated at reflux for 1 hour with a solution of 1 g. of potassium carbonate in water. The reaction mixture is then poured into ice water and the solid collected by filtration, washed with water to neutrality and dried to yield 1α,2α-difluoromethylene-9α-fluoro-16-methylene-Δ⁴-pregnene - 11β,17α,21 - triol-3,20-dione which is recrystallized from methylene chloride: ether.

*Example 24*

A mixture of 1.34 g. of 1α,2α-difluoromethylene-Δ⁴-pregnene-17α,21-diol-3,20-dione, 0.38 ml. of methanesulfonyl chloride and 10 ml. of pyridine is allowed to stand at room temperature for 16 hours and is then poured into ice water and extracted with methylene chloride. The extracts are washed with 2 N hydrochloric acid, aqueous potassium bicarbonate solution and saturated aqueous sodium chloride solution, dried over magnesium sulfate and evaporated to dryness. The residue is heated with 3.6 g. of sodium iodide and 150 ml. of acetone at boiling for 40 minutes and then evaporated under reduced pressure. The residue is extracted with methylene chloride and these extracts are washed with saturated aqueous sodium chloride, dried over magnesium sulfate and evaporated to dryness. A suspension of the residue and 2.6 g. of sodium metabisulfite in 300 ml. of 80% of aqueous ethanol is heated at reflux for one hour and then evaporated under reduced pressure at a temperature below 45° C. The residue is partitioned between water and methylene chloride, the phases are separated, the organic phase being washed with an aqueous sodium chloride solution, dried and evaporated to dryness to yield 1α,2α-difluoromethylene - Δ⁴ - pregnen - 17α - ol - 3,20 - dione which may be recrystallized from acetone.

*Example 25*

A mixture of 1 g. of 1α,2α-difluoromethylene-Δ⁴-pregnen-17α-ol-3,20-dione, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 1α,2α-difluoromethylene - 17α - acetoxy - Δ⁴ - pregnene - 3,20-dione which is recrystallized from acetone:ether.

A mixture of 1 g. of 1α,2α-difluoromethylene-17α-acetoxy-Δ⁴-pregnen-3,20-dione, 1.5 ml. of ethylorthoformate, 70 mg. of 2,4-dinitrobenzenesulfonic acid and 6 ml. of dioxane are stirred at room temperature for 7 hours. At the end of this time, the mixture is neutralized with pyridine and concentrated to remove the dioxane. The residue is partitioned between methylene chloride and aqueous potassium bicarbonate solution, separated and the organic phase washed with saturated aqueous sodium chloride solution, dried over sodium sulfate and evaporated to yield 1α,2α-difluoromethylene-3-ethoxy-17α-acetoxy-Δ³,⁵⁽⁶⁾-pregnadiene-3,20-dione. This material is dissolved in 8 ml. of 80% ethanol and 0.4 g. of sodium acetate are added. The suspension is cooled to 0° C., adding up to 10% methylene chloride as necessary to prevent precipitation, and 0.84 g. of N-bromosuccinimide is then added. The mixture is stirred for 30 minutes at 0° C. and then concentrated under reduced pressure. The residue is partitioned between water and methylene chloride, the phases are separated and the organic phase is washed with water and saturated aqueous sodium chloride solution, dried and evaporated to dryness under reduced pressure. The residue is dissolved in 20 ml. of dimethylacetamide and this solution is added rapidly to a stirred boiling suspension of 2 g. of calcium carbonate in 100 ml. of dimethylacetamide under nitrogen. The mixture is refluxed for 90 minutes and then evaporated to dryness. The residue is extracted with methylene chloride and these extracts are chromatographed on alumina, eluting with 5% ethyl acetate in methylene chloride to yield 1α,2α - difluoromethylene - 17α - acetoxy - Δ⁴,⁶-pregnadiene-3,20-dione.

*Example 26*

To a solution of 0.1 g. of 1α,2α-difluoromethylene-17α-acetoxy-Δ⁴,⁶-pregnadien-3,20-dione in 2.5 ml. of methylene chloride, cooled to −10° C., is added 0.5 ml. of freshly distilled chromyl chloride. The temperature of the mixture is allowed to reach 0° C. and is held at this level for 3½ hours. At the end of this time, excess reagent is decomposed by the addition of aqueous sodium metasulfite. The aqueous layer is extracted with methylene chloride and the combined extracts and organic layer are washed with aqueous potassium bicarbonate and aqueous saturated sodium chloride solution, dried and evaporated to dryness. The residue is added to 10 ml. of glacial acetic acid which is saturated with dry hydrogen chloride and this mixture is heated at reflux for 2 hours. The acetic acid is then removed under reduced pressure and the residue is partitioned between methylene chloride and aqueous potassium bicarbonate solution. The organic layer is washed with saturated aqueous sodium chloride solution, dried and evaporated to dryness. This residue is then chromatographed on alumina, eluting with 2% ethyl acetate in methylene chloride to yield 1α,2α - difluoromethyl - 6 - chloro - 17α - acetoxy - Δ⁴,⁶-pregnadiene-3,20-dione.

*Example 27*

By subjecting 1α,2α-difluoromethylene-6α,16α-dimethyl-Δ⁴-pregnen-11β,17α,21-triol-3,20-dione to the alternative procedure of Example 24, there is obtained 1α,2α-difluoromethylene - 6α,16α - dimethyl - Δ⁴ - pregnene-11β,17α-diol-3,20-dione.

*Example 28*

To a suspension of 1 g. of 1α,2α-difluoromethylene-Δ⁴-pregnen-17α-ol-3,20-dione in 27 ml. of methanol and 1 ml. of water, under nitrogen, is added 1.4 g. of semicarbazide hydrochloride and 0.74 g. of sodium bicarbonate. The mixture is heated at reflux for three hours and then at 45° C. for 20 hours. The suspension is cooled and 36 ml. of water are slowly added to it. The solid is collected by filtration, washed with water and dried to yield 1α,2α - difluoromethylene - Δ⁴ - pregnen - 17α - ol - 3,20-bis semicarbazone which is recrystallized from pyridine: methanol.

A solution of 1 g. of 1α,2α-difluoromethylene-Δ⁴-pregnen-17α-ol-3,20-bis semicarbazone in 20 ml. of acetic acid and 1 ml. of acetic anhydride is heated at reflux under nitrogen for 1 hour. The reaction mixture is then concentrated under reduced pressure to a volume of about 12 ml. and treated with 6 ml. of water and 3 ml. of pyruvic acid. The mixture is allowed to stand at room temperature for 40 hours and at 60° C. for 2 hours and is then diluted with water and extracted with chloroform. These extracts are washed with water, dilute potassium bicarbonate solution and water, dried over magnesium sulfate and evaporated to dryness under reduced pressure. The residue is chromatographed on neutral alumina with benzene to yield 1α,2α - difluoromethylene - Δ⁴,¹⁶ - pregnadiene-3,20-dione which may be recrystallized from acetone:ether.

A solution of 1 g. of 1α,2α-difluoromethylene-Δ⁴,¹⁶-pregnadiene-3,20-dione in 30 ml. of an ethereal solution of diazomethane is allowed to stand at room temperature for 24 hours. One milliliter of acetic acid is then added to the mixture which is then evaporated to dryness under reduced pressure. The residue is heated gradually to 180° C. in vacuo, cooled and recrystallized from acetone:hexane to yield 1α,2α-difluoromethylene-16-methyl-Δ⁴,¹⁶- pregnadiene-3,20-dione.

A solution of 2.5 g. of 1α,2α-difluoromethylene-16-methyl-Δ⁴,¹⁶-pregnadiene-3,20-dione in 100 ml. of chloroform is cooled to 0° C. and mixed with a solution of 1.1 molar equivalents of monoperphthalic acid in ether. The mixture is allowed to stand at room temperature for 20 hours and then diluted with water. The organic layer is separated, washed with aqueous sodium bicarbonate solution and then with water to neutrality, dried over sodium sulfate and evaporated to dryness to yield 1α,2α-difluoromethylene-16α,17α-oxido-16β-methyl-Δ⁴-pregnene - 3,20-dione.

To a solution of 1 g. of 1α,2α-difluoromethylene-16α,17α-oxido-16β-methyl-Δ⁴-pregnene-3,20 - dione in 10 ml. of dioxane is added 0.5 ml. of a 50% w./v. solution of hydrogen bromide in acetic acid. After being allowed to stand for 10 minutes at room temperature, the mixture is poured into water and extracted with ether. These ethereal extracts are dried over sodium sulfate and evaporated to dryness to yield 1α,2α-difluoromethylene-16-methylene-Δ⁴-pregnen-17α-ol-3,20-dione, which may be further purified through recrystallization from acetone: hexane.

*Example 29*

A mixture of 1 g. of 16α-methyl-17α,20;20,21-bismethylene-dioxy-Δ⁴-pregnen-11β-ol-3-one, 2 g. of chloranil and 50 ml. of t-butanol is refluxed for eight hours and then cooled. The excess chloranil is removed by filtration and washed with a large volume of ethyl acetate. The combined filtrate and ethyl acetate washings are in turn washed with cold 10% aqueous sodium hydroxide solution until the washings are colorless. The organic layer is then separated, dried over sodium sulfate and evaporated to dryness to yield 16α-methyl-17α,20;20,21-bismethylenedioxy-Δ⁴,⁶-pregnadien-11β-ol-3-one which may be further purified by decolorization with alumina and recrystallization from methylene chloride:ether.

By refluxing 1 g. of 16α-methyl-17α,20;20,21-bismethylene-dioxy-Δ⁴-pregnen-11β-ol-3-one with 2 g. of chloranil and 10 ml. of n-amyl alcohol under a nitrogen atmosphere for an additional 24 hours, washing the cooled reaction mixture with a 10% aqueous sodium hydroxide solution until the washings are colorless, and removing the n-amyl alcohol by evaporation, there is obtained instead 16α-methyl-17α,20;20,21-bismethylene-dioxy - Δ¹,⁴,⁶ - pregnatrien-11β-ol-3-one.

To a gently refluxing and stirred solution of 1 g. of 16α-methyl-17α,20;20,21 - bismethylenedioxy-Δ⁴,⁶-pregnadien-11β-ol-3-one in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride, to yield 6α,7α-difluoromethylene - 16α - methyl-17α,20;20,21 - bismethylenedioxy-Δ⁴-pregnen-11β-ol-3-one.

A suspension of 1 g. of 6α,7α-difluoromethylene-16α-methyl-17α,20;20,21-bis methylenedioxy-Δ⁴-pregnen-11β-ol-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 6α,7α-difluoromethylene-16α-methyl-Δ⁴-pregnene-11β,17α,21-triol-3,20-dione which may be further purified through recrystallization from isopropanol.

By utilizing 16α - methyl - 17α,20;20,21 - bismethylenedioxy-Δ¹,⁴,⁶-pregnatrien-11β-ol - 3 - one there is obtained according to the foregoing procedures, 6α,7α-difluoromethylene-16α - methyl - Δ¹,⁴ - pregnadiene - 11β,17α,21-triol-3,20-dione.

In a similar fashion the following compounds are obtained from the bis methylenedioxy derivatives of the corresponding starting material:

6α,7α-difluoromethylene-16β-methyl-Δ⁴-pregnene-11β, 17α,21-triol-3,20-dione;

6α,7α-difluoromethylene-16α-methyl-Δ⁴-pregnene-17α,21-diol-3,20-dione;

6α,7α-difluoromethylene-16α-chloro-Δ⁴-pregnene-11β, 17α,21-triol-3,20-dione;

6α,7α-difluoromethylene-16α-fluoro-Δ⁴-pregnene-11β,17α, 21-triol-3,20-dione;

6α,7α-difluoromethylene-Δ⁴-pregnene-17α,21-diol-3,20-dione;

6α,7α-difluoromethylene-Δ⁴-pregnene-11β,16α,17α,21-tetrol-3,20-dione;

6α,7α-difluoromethylene-Δ⁴-pregnene-11β,17α,21-triol-3,20-dione;

6α,7α-difluoromethylene-16α-methyl-Δ¹,⁴-pregnadiene-11β,17α,21-triol-3,20-dione;

6α,7α-difluoromethylene-16β-methyl-Δ¹,⁴-pregnadiene-11β,17α,21-triol-3,20-dione;

6α,7α-difluoromethylene-16α-chloro-Δ¹,⁴-pregnadiene-11β,17α,21-triol-3,20-dione;

6α,7α-difluoromethylene-16α-fluoro-Δ¹,⁴-pregnadiene-11β,17α,21-triol-3,20-dione;

6α,7α-difluoromethylene-Δ¹,⁴-pregnadiene-17α,21-diol-3,20-dione;

6α,7α-difluoromethylene-Δ¹,⁴-pregnadiene-11β,16α,17α, 21-tetrol-3,20-dione; and

6α,7α-difluoromethylene-Δ¹,⁴-pregnadiene-11β,17α,21-triol-3,20-dione.

The 16α-chloro and 16α-fluoro starting materials recited above may be obtained in the following manner. 20,21-oxido-Δ⁴,¹⁶-pregnadien-11β-ol-3-one is treated with hydrogen fluoride and then acetic anhydride in the manner described by Magerlein et al., J. Med. Chem., 7, 748 (1964) to yield 16α-fluoro-21-acetoxy-Δ⁴,¹⁷(²⁰)-pregnadien-11β-ol-3-one, or with hydrogen chloride and then acetic acid in the manner of Kagan et al., J. Med. Chem., 7, 751 (1964) to yield 16α-chloro-21-acetoxy-Δ⁴,¹⁷(²⁰)-pregnadien-11β-ol-3-one. Each of these compounds is then oxidized with osmium tetroxide and N-methylmorpholine oxide-hydrogen peroxide, as described in both of these references, to yield 16α-fluoro-21-acetoxy-Δ⁴-pregnene-11β,17α-diol-3,20-dione and 16α-chloro-21-acetoxy-Δ⁴ - pregnene-11β,17α-diol-3,20-dione, which are hydrolysed with base to yield the free 21-hydroxy compounds used in forming the bis methylenedioxy starting materials.

*Example 30*

One gram of 6α,7α-difluoromethylene-16α-methyl-17α, 20;20,21-bis methylenedioxy-Δ⁴-pregnen-11β-ol-3 - one is dissolved with slow heating in 12.5 ml. of dimethylformamide. The mixture is cooled and 0.42 g. of mesylchloride and 0.5 ml. of pyridine are added. The solution is heated at 80° C. for 30 minutes, then cooled, diluted with water and extracted with ethyl acetate. The extracts are washed with water, dried over sodium sulfate and evaporated to yield 6α,7α-difluoromethylene-16α-methyl-17α, 20;20,21-bis methylenedioxy-Δ⁴,⁹(¹¹))-pregnadien-3 - one which may be further purified through recrystallization from acetone:hexane.

Twenty-eight grams of N-bromoacetamide are added over a one hour period with stirring, in the dark and at room temperature, to a mixture of 50 g. of 6α,7α-difluoromethylene-16α-methyl-17α,20;20,21-bis methylenedioxy-Δ⁴,⁹(¹¹)-pregnadien-3-one, 500 ml. of pure dioxane and 8 ml. of 0.4 N perchloric acid. The reaction mixture is stirred for an additional hour and a solution of 10% sodium sulfite is then added until negative to potassium iodide starch indicator paper. Ice is added and the mixture extracted with chloroform. These extracts are washed consecutively with water, 5% aqueous sodium bicarbonate solution and water, and the solvent then removed by distillation in vacuo. The residue is triturated with acetone to yield the bromohydrin intermediate.

A mixture of 20 g. of anhydrous potassium acetate and 200 ml. of acetone is heated almost to boiling and a solution of 17 g. of the bromohydrin intermediate in 200 ml. of acetone is then slowly added with stirring. The mixture is refluxed for 10 hours, cooled and almost all of the acetone is removed by distillation. Iced water is then added and the solid which forms collected by filtration, washed with water and dried to yield $6\alpha,7\alpha$-difluoromethylene-$9\beta,11\beta$-oxido-$16\alpha$-methyl-$17\alpha,20;20,21$-bis methylenedioxy-$\Delta^4$-pregnen-3-one which may be further purified through recrystallization from methylene chloride:benzene.

To a stirred solution of 1.8 g. of $6\alpha,7\alpha$-difluoromethylene-$9\beta,11\beta$-oxido-$16\alpha$-methyl-$17\alpha,20;20,21$-bis methylenedioxy-$\Delta^4$-pregnen-3-one in 30 ml. of methylene chloride, cooled to 0° C., is added a cooled solution ($-70°$ C.) of 2.11 g. of anhydrous hydrogen fluoride in 3.7 ml. of tetrahydrofuran over a period of 20 minutes. The mixture is stirred at a temperature below 10° C. for 6 hours and then neutralized by the cautious addition of 5% aqueous sodium bicarbonate solution. The organic layer is separated, washed with water, dried over sodium sulfate and concentrated until solid forms. The cooled mixture is then filtered and the solid dissolved in hot ethyl acetate. This solution is filtered hot and then cooled and the solid which forms collected by filtration to yield $6\alpha,7\alpha$-difluoromethylene-$9\alpha$-fluoro-$16\alpha$-methyl-$17\alpha,20;20,21$-bis methylenedioxy-$\Delta^4$-pregnen-$11\beta$-ol-3-one.

A mixture of 0.5 g. of $6\alpha,7\alpha$-difluoromethylene-$9\alpha$-fluoro-$16\alpha$-methyl-$17\alpha,20;20,21$-bis methylenedioxy-$\Delta^4$-pregnen-$11\beta$-ol-3-one, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield $6\alpha,7\alpha$-difluoromethylene-$9\alpha$-fluoro-$16\alpha$-methyl-$17\alpha,20;20,21$-bis methylenedioxy-$\Delta^{1,4}$-pregnadien-$11\beta$-ol-3-one which is further purified by recrystallization from acetone:hexane.

A suspension of 1 g. of $6\alpha,7\alpha$-difluoromethylene-$9\alpha$-fluoro-$16\alpha$-methyl-$17\alpha,20;20,21$-bis methylenedioxy-$\Delta^{1,4}$-pregnadien-$11\beta$-ol-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield $6\alpha,7\alpha$-difluoromethylene-$9\alpha$-fluoro-$16\alpha$-methyl-$\Delta^{1,4}$-pregnadiene-$11\beta,17\alpha,21$-triol-3,20-dione which may be further purified through recrystallization from isopropanol.

In a similar fashion, $6\alpha,7\alpha$-difluoromethylene-$9\alpha$-fluoro-$16\alpha$-methyl-$\Delta^4$-pregnene-$11\beta,17\alpha,21$-triol-3,20-dione is obtained from its corresponding bis methylenedioxy derivative according to this procedure.

*Example 31*

A mixture of 1 g. of $6\alpha,7\alpha$-difluoromethylene-$\Delta^4$-pregnene-$11\beta,17\alpha,21$-triol-3,20-dione, 4 ml. of pyridine and 2 ml. of acetic anhydride is allowed to stand at room temperature for 15 hours. The mixture is then poured into ice water and the solid which forms is collected by filtration, washed with water and dried to yield $6\alpha,7\alpha$-difluoromethylene-21-acetoxy-$\Delta^4$-pregnene-$11\beta,17\alpha$-diol-3,20-dione which may be further purified through recrystallization from acetone:hexane.

To a suspension of 1 g. of $6\alpha,7\alpha$-difluoromethylene-21-acetoxy-$\Delta^4$-pregnene-$11\beta,17\alpha$-diol-3,20-dione in 27 ml. of methanol and 1 ml. of water, under nitrogen, is added 1.4 g. of semicarbazide hydrochloride and 0.74 g. of sodium bicarbonate. The mixture is heated at reflux for three hours and then at 45° C. for 20 hours. The suspension is cooled and 36 ml. of water are slowly added to it. The solid is collected by filtration, washed with water and dried to yield $6\alpha,7\alpha$-difluoromethylene-21-acetoxy-$\Delta^4$-pregnene-$11\beta,17\alpha$-diol-3,20-bis semicarbazone which is recrystallized from pyridine:methanol.

A solution of 1 g. of $6\alpha,7\alpha$-difluoromethylene-21-acetoxy-$\Delta^4$-pregnene-$11\beta,17\alpha$-diol-3,20-bis semicarbazone in 20 ml. of acetic acid and 1 ml. of acetic anhydride is heated at reflux under nitrogen for 1 hour. The reaction mixture is then concentrated under reduced pressure to a volume of about 12 ml. and treated with 6 ml. of water and 3 ml. of pyruvic acid. The mixture is allowed to stand at room temperature for 40 hours and at 60° C. for 2 hours and is then diluted with water and extracted with chloroform. These extracts are washed with water, dilute potassium bicarbonate solution and water, dried over magnesium sulfate and evaporated to dryness under reduced pressure. The residue is chromatographed on neutral alumina with benzene to yield $6\alpha,7\alpha$-difluoromethylene-21-acetoxy-$\Delta^{4,16}$-pregnadien-$11\beta$-ol-3,20-dione which may be recrystallized from acetone:ether.

A solution of 1 g. of $6\alpha,7\alpha$-difluoromethylene-21-acetoxy-$\Delta^{4,16}$-pregnadien-$11\beta$-ol-3,20-dione in 30 ml. of an ethereal solution of diazomethane is allowed to stand at room temperature for 24 hours. One milliliter of acetic acid is then added to the mixture which is then evaporated to dryness under reduced pressure. The residue is heated gradually to 180° C. in vacuo, cooled and recrystallized from acetone:hexane to yield $6\alpha,7\alpha$-difluoromethylene-16-methyl-21-acetoxy-$\Delta^{4,16}$-pregnadien-$11\beta$-ol-3,20-dione.

To a stirred solution of 5 g. of $6\alpha,7\alpha$-difluoromethylene-16-methyl-21-acetoxy-$\Delta^{4,16}$-pregnadien-$11\beta$-ol-3,20-dione, in 350 ml. of methanol is added 20 ml. of 4 N aqueous sodium hydroxide and 20 ml. of 30% hydrogen peroxide, maintaining a temperature of approximately 15° C. The solution is allowed to stand at 0° C. for 15 hours and then poured into ice water. The solid which forms is collected by filtration, washed with water and dried, to yield $6\alpha,7\alpha$-difluoromethylene-$16\alpha,17\alpha$-oxido-$16\beta$-methyl-21-acetoxy-$\Delta^4$-pregnen-$11\beta$-ol-3,20-dione which may be further purified by recrystallization from acetone:hexane.

To a solution of 1 g. of $6\alpha,7\alpha$-difluoromethylene-$16\alpha,17\alpha$-oxido-$16\beta$-methyl-21-acetoxy-$\Delta^4$-pregnen-$11\beta$-ol-3,20-dione in 10 ml. of dioxane is added 0.5 ml. of a 50% w./v. solution of hydrogen bromide in acetic acid. After being allowed to stand for 10 minutes at room temperature, the mixture is poured into water and extracted with ether. These ethereal extracts are dried over sodium sulfate and evaporated to dryness to yield $6\alpha,7\alpha$-difluoromethylene-16-methylene-21-acetoxy-$\Delta^4$-pregnen-$11\beta,17\alpha$-diol-3,20-dione which may be further purified through recrystallization from acetone:hexane.

A mixture of 0.5 g. of $6\alpha,7\alpha$-difluoromethylene-16-methylene-21-acetoxy-$\Delta^4$-pregnen-$11\beta,17\alpha$-diol-3,20-dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield $6\alpha,7\alpha$-difluoromethylene-16-methylene-21-acetoxy-$\Delta^{1,4}$-pregnadiene-$11\beta,17\alpha$-diol-3,20-dione which is further purified by recrystallization from acetone:hexane.

One gram of $6\alpha,7\alpha$-difluoromethylene-16-methylene-21-acetoxy-$\Delta^{1,4}$-pregnadiene-$11\beta,17\alpha$-diol-3,20-dione is allowed to stand at room temperature for 15 hours with 1 g. of potassium bicarbonate in 10 ml. of water and 90 ml. of methanol. At the end of this time, the methanol is extracted with ethyl acetate and water. Evaporation of the ethyl acetate from these extracts yields $6\alpha,7\alpha$-difluoromethylene-16-methylene-$\Delta^{1,4}$-pregnadiene-$11\beta,17\alpha,21$-triol-3,20-dione which is collected by filtration and recrystallized from acetone:hexane.

*Example 32*

To a cooled solution (0° C.) of 3.4 g. of $6\alpha,7\alpha$-difluoromethylene-$\Delta^{1,4}$-pregnadiene-11$\beta$,17$\alpha$,21-triol-3,20-dione in 20 ml. of 9:1 chloroform:pyridine is added in small portions 1.4 g. of methanesulfonyl chloride. The reaction mixture allowed to stand for 14 hours at 0° C. and is then washed with dilute hydrochloric acid, water and sodium bicarbonate solution. The chloroform removed by evaporation under reduced pressure and the residue is dissolved in 20 ml. of acetone treated at room temperature and under stirring with 4 g. of sodium iodide. Sodium thiosulfate solution is added to decolorize the mixture, followed by the addition of water. The solid which forms is collected by filtration and dried in vacuum to yield 6$\alpha$,7$\alpha$-difluoromethylene-21-iodo-$\Delta^{1,4}$-pregnadiene-11$\beta$,17$\alpha$-diol-3,20-dione. This material is dissolved in 20 ml. of acetonitrile and treated dropwise with 1.4 g. of silver fluoride in 3 ml. of water. The mixture is allowed to stand at room temperature for 24 hours and then filtered. The filtrate is concentrated under vacuum and the solid which forms is collected and dried to yield 6$\alpha$,7$\alpha$ - difluoromethylene - 21-fluoro - $\Delta^{1,4}$-pregnadiene-11$\beta$,17$\alpha$-diol-3,20-dione, which is recrystallized from methanol:acetone.

*Example 33*

To 120 ml. of acetone containing 1 g. of 6$\alpha$,7$\alpha$-difluoromethylene-$\Delta^4$-pregnene - 11$\beta$,16$\alpha$,17$\alpha$,21 - tetrol - 3,20-dione are added 30 drops of 70% perchloric acid. The mixture is allowed to stand 1 hour at room temperature, 30 drops of pyridine are added and the solution is evaporated to dryness under reduced pressure. Thirty milliliters of water are added to the residue and this mixture is extracted several times with ethyl acetate. The combined extracts are washed to neutrality with water, dried over sodium sulfate and evaporated to dryness. The residue upon trituration with methanol yields 6$\alpha$,7$\alpha$-difluoromethylene - 16$\alpha$,17$\alpha$ - isopropylidenedioxy - $\Delta^4$-pregnene-11$\beta$,21-diol-3,20-dione which is recrystallized from methanol.

A mixture of 1 g. of 6$\alpha$,7$\alpha$-difluoromethylene-16$\alpha$,17$\alpha$-isopropylidenedioxy-$\Delta^4$-pregnene-11$\beta$,21-diol-3,20-dione, 4 ml. of pyridine and 2 ml. of acetic anhydride is allowed to stand at room temperature for 15 hours. The mixture is then poured into ice water and the solid which forms is collected by filtration, washed with water and dried to yield 6$\alpha$,7$\alpha$-difluoromethylene-16$\alpha$,17$\alpha$-isopropylidenedioxy-21-acetoxy-$\Delta^4$-pregnen-11$\beta$-ol-3,20-dione which may be further purified through recrystallization from acetone:hexane.

One gram of 6$\alpha$,7$\alpha$-difluoromethylene-16$\alpha$,17$\alpha$-isopropylidenedioxy-21-acetoxy-$\Delta^4$-pregnen-11$\beta$-ol-3,20-dione is dissolved with slow heating in 12.5 ml. of dimethylformamide. The mixture is cooled and 0.42 g. of mesylchloride and 0.5 ml. of pyridine are added. The solution is heated at 80° C. for 30 minutes, then cooled, diluted with water and extracted with ethyl acetate. The extracts are washed with water, dried over sodium sulfate and evaporated to yield 6$\alpha$,7$\alpha$-difluoromethylene-16$\alpha$,17$\alpha$-isopropylidenedioxy - 21 - acetoxy-$\Delta^{4,9(11)}$-pregnadiene-3,20-dione which may be further purified through recrystallization from acetone:hexane.

Twenty-eight grams of N-bromoacetamide are added over a one hour period with stirring, in the dark and at room temperature, to a mixture of 50 g. of 6$\alpha$,7$\alpha$-difluoromethylene - 16$\alpha$,17$\alpha$ - isopropylidenedioxy - 21-acetoxy-$\Delta^{4,9(11)}$-pregnadiene-3,20-dione, 500 ml. of pure dioxane and 8 ml. of 0.4 N perchloric acid. The reaction mixture is stirred for an additional hour and a solution of 10% sodium sulfite is then added until negative to potassiumiodide-starch indicator paper. Ice is added and the mixture extracted with chloroform. These extracts are washed consecutively with water, 5% aqueous sodium bicarbonate solution and water, and the solvent then removed by distillation in vacuo. The residue is triturated with acetone to yield the bromohydrin intermediate.

A mixture of 20 g. of anhydrous potassium acetate and 200 ml. of acetone is heated almost to boiling and a solution of 17 g. of the bromohydrin intermediate in 200 ml. of acetone is then slowly added with stirring. The mixture is refluxed for 10 hours, cooled and almost all of the acetone is removed by distillation. Iced water is then added and the solid which forms collected by filtration, washed with water and dried, to yield 6$\alpha$,7$\alpha$-difluoromethylene - 9$\beta$,11$\beta$ - oxido - 16$\alpha$,17$\alpha$ - isopropylidenedioxy-21-acetoxy-$\Delta^4$-pregnene-3,20-dione which may be further purified through recrystallization from methylene chloride:benzene.

To a stirred solution of 1.8 g. of 6$\alpha$,7$\alpha$-difluoromethylene - 9$\beta$,11$\beta$ - oxido - 16$\alpha$,17$\alpha$ - isopropylidenedioxy - 21-acetoxy-$\Delta^4$-pregnene-3,20-dione in 30 ml. of methylene chloride, cooled to 0° C., is added a cooled solution (−70° C.) of 2.11 g. of anhydrous hydrogen fluoride in 3.7 ml. of tetrahydrofuran over a period of 20 minutes. The mixture is stirred at a temperature below 10° C. for 6 hours and then neutralized by the cautious addition of 5% aqueous sodium bicarbonate solution. The organic layer is separated, washed with water, dried over sodium sulfate and concentrated until solid forms. The cooled mixture is then filtered and the solid dissolved in hot ethyl acetate. This solution is filtered hot and then cooled and the solid which forms collected by filtration to yield 6$\alpha$,7$\alpha$ - difluoromethylene - 9$\alpha$ - fluoro - 16$\alpha$,17$\alpha$ - isopropylidenedioxy - 21 - acetoxy-$\Delta^4$-pregnen - 11$\beta$ - ol-3,20-dione.

A mixture of 0.5 g. of 6$\alpha$,7$\alpha$-difluoromethylene-9$\alpha$-fluoro-16$\alpha$,17$\alpha$ - isopropylidenedioxy - 21 - acetoxy-$\Delta^4$-pregnen-11$\beta$-ol-3,20-dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 6$\alpha$,7$\alpha$-difluoromethylene-9$\alpha$-fluoro - 16$\alpha$,17$\alpha$ - isopropylidenedioxy - 21 - acetoxy-$\Delta^{1,4}$-pregnadien-11$\beta$-ol-3,20-dione which is further purified by recrystallization from acetone:hexane.

A solution of 1 g. of 6$\alpha$,7$\alpha$-difluoromethylene-9$\alpha$-fluoro-16$\alpha$,17$\alpha$ - isopropylidenedioxy-21-acetoxy-$\Delta^{1,4}$ - pregnadien-11$\beta$-ol-3,20-dione in 50 ml. of methanol is heated at reflux for 3 hours with a solution of potassium hydroxide in 1 ml. of water. The reaction mixture is then poured into ice water and the solid which forms collected by filtration, washed with water to neutrality and dried to yield 6$\alpha$,7$\alpha$ - difluoromethylene-9$\alpha$-fluoro-16$\alpha$,17$\alpha$-isopropylidenedioxy - $\Delta^{1,4}$ - pregnadiene-11$\beta$,21-diol-3,20 - dione which is recrystallized from methylene chloride:ether.

*Example 34*

To a solution of 1.6 g. of 6$\alpha$,7$\alpha$-difluoromethylene-16$\alpha$,17$\alpha$ - isopropylidenedioxy - 21 - acetoxy-$\Delta^{4,9(11)}$-pregnadiene-3,20-dione in 4 ml. of chloroform is added over a 5 minute period with continuous stirring, a solution of 0.3 g. of chlorine in 10 ml. of carbon tetrachloride. After being allowed to stand at room temperature for 20 minutes, the mixture is treated with 10 ml. of 5% aqueous sodium carbonate solution and extracted with chloroform. The chloroform extracts are washed with water to neutrality, dried over sodium sulfate and evaporated to dryness to yield 6$\alpha$,7$\alpha$-difluoromethylene-9$\alpha$,11$\beta$-dichloro-16$\alpha$,17$\alpha$ - isopropylidenedioxy-21-acetoxy-$\Delta^4$-pregnene-3,20-dione which may be recrystallized from acetone:hexane.

A mixture of 0.5 g. of 6$\alpha$,7$\alpha$-difluoromethylene-9$\alpha$,11$\beta$-dichloro - 16$\alpha$,17$\alpha$ - isopropylidenedioxy - 21 - acetoxy-$\Delta^4$-pregnene-3,20-dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 6$\alpha$,7$\alpha$-difluoromethylene-9$\alpha$,11$\beta$-dichloro - 16$\alpha$,17$\alpha$ - isopropylidenedioxy - 21 - acetoxy-$\Delta^{1,4}$-pregnadiene-3,20-dione which is further purified by recrystallization from acetone:hexane.

One gram of 6α,7α-difluoromethylene-9α,11β-dichloro-16α,17α-isopropylidenedioxy-21-acetoxy-Δ$^{1,4}$-pregnadiene-3,20-dione is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 6α,7α-difluoromethylene-9α,11β-dichloro-16α,17α-isopropylidenedioxy-Δ$^{1,4}$-pregnadien-21-ol-3,20-dione which is collected by filtration and recrystallized from acetone:hexane.

Example 35

To a mixture of 700 mg. of 6α,7α-difluoromethylene-9α-fluoro-16α-methyl-Δ$^{1,4}$-pregadiene-11β,17α,21-triol-3,20-dione, 7 ml. of dry dimethylformamide and 1.4 ml. of methyl orthocaproate are added 10 mg. of dry p-toluenesulfonic acid. The reaction mixture is heated at reflux for one hour and then poured into an aqueous solution of soduim bicarbonate. This mixture is extracted with benzene and evaporated to dryness to yield 6α,7α-difluoromethylene-9α-fluoro-16α-methyl-17α,21-(1-methoxyhex-1,1-ylidenedioxy)-Δ$^{1,4}$-pregnadien-11β-ol-3,20-dione which is separated into its diastereoisomers through chromatography over alumina.

Example 36

To a suspension of 1 g. of 19-nor-Δ$^4$-pregnen-17α-ol-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration washed with water and air dried to yield 3-ethoxy-19-nor-Δ$^{3,5(6)}$-pregnadien-17α-ol-3,20-dione which is recrystallized from acetone:hexane.

To a solution of 1 g. of 3-ethoxy-19-nor-Δ$^{3,5(6)}$-pregnadien-17α-ol-3,20-dione in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings are colorless and then with water to neutrality, dried over sodium sulfate and evaporated to dryness to yield 19-nor-Δ$^{4,6}$-pregnadien-17α-ol-3,20-dione which may be further purified through recrystallization from acetone:hexane.

To a gently refluxing solution of 1 g. of 19-nor-Δ$^{4,6}$-pregnadien-17α-ol-3,20-dione in 20 ml. of dimethyl diethylene glycol ether is added with stirring and in a dropwise fashion a 1:2 w./v. solution of sodium chlorodifluoroacetate in dimethyl diethylene glycol ether. The addition is stopped after the introduction of about five equivalents of reagent fails to substantially change the U.V. spectra. The mixture is then filtered and evaporated to dryness. The residue thus obtained is refluxed briefly in methanolic potassium hydroxide and chromatographed on alumina with methylene chloride to yield 6α,7α-difluoromethylene-19-nor-Δ$^4$-pregnen-17α-ol-3,20-dione.

Example 37

A solution of 5 g. of 6α,7α-difluoromethylene-Δ$^4$-pregnene-17α,21-diol-3,20-dione in 25 ml. of pyridine is cooled to 0° C. and 1.3 g. of tosyl chloride, is added with stirring. The mixture is maintained at 0° C. for 16 hours, diluted with 100 ml. of chloroform, washed with dilute hydrochloric acid, water, aqueous sodium bicarbonate solution and again with water, dried over anhydrous sodium sulfate and evaporated to dryness under reduced pressure to yield 6α,7α-difluoromethylene-21-tosyloxy-Δ$^4$-pregnen-17α-ol-3,20-dione which may be used in the next procedure without further purification.

A solution of 2.5 g. of this compound in 100 ml. of glacial acetic acid is treated with 7 g. of sodium iodide. The mixture is heated at reflux for 2 hours, poured into ice water and extracted several times with methylene chloride. These extracts are combined, washed successively with aqueous sodium carbonate solution, sodium sulfite solution and water and then evaporated to yield 6α,7α-difluoromethylene-Δ$^4$-pregnen-17α-ol-3,20-dione which may be further purified by recrystallization from acetone:hexane.

A mixture of 1 g. of 6α,7α-difluoromethylene-Δ$^4$-pregnen-17α-ol-3,20-dione, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 6α,7α-difluoromethylene-17α-acetoxy-Δ$^4$-pregnene-3,20-dione which is recrystallized from acetone:ether.

Alternatively this compound is prepared by subjecting 17α-acetoxy-Δ$^{4,6}$-pregnadiene-3,20-dione to the final procedure of Example 36.

Example 38

16α,17α-oxido-16β-methyl-Δ$^{4,6}$-pregnadiene-3,20-dione is subjected to the final procedure of Example 36 to yield 6α,7α-difluoromethylene-16α,17α-oxido-16β-methyl-Δ$^4$-pregnene-3,20-dione.

To a solution of 1 g. of 6α,7α-difluoromethylene-16α,17α-oxido-16β-methyl-Δ$^4$-pregnene-3,20-dione in 10 ml. of dioxane is added 0.5 ml. of a 50% w./v. solution of hydrogen bromide in acetic acid. After being allowed to stand for 10 minutes at room temperature, the mixture is poured into water and extracted with ether. These ethereal extracts are dried over sodium sulfate and evaporated to dryness to yield 6α,7α-difluoromethylene-16-methylene-Δ$^4$-pregnen-17α-ol-3,20-dione which may be further purified through recrystallization from acetone:hexane.

A mixture of 1 g. of 6α,7α-difluoromethylene-16-methylene-Δ$^4$-pregnen-17α-ol-3,20-dione, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 6α,7α-difluoromethylene-16-methylene-17α-acetoxy-Δ$^4$-pregnene-3,20-dione which is recrystallized from acetone:ether.

Alternatively this compound may be prepared by subjecting 6α,7α-difluoromethylene-Δ$^4$-pregnene-17α,21-diol-3,20-dione to the procedure of Example 31 to yield 6α,7α-difluoromethylene-16-methylene-21-acetoxy-Δ$^4$-pregnen-17α-ol-3,20-dione which, after hydrolysis of the 21-acetoxy group, is treated according to the principal procedure of Example 37.

Example 39

To a stirred solution of 1 g. of 21-acetoxy-5α-Δ$^{16}$-pregnen-3α-ol-11,20-dione in 10 ml. of acetone, cooled to 0° C., is added under nitrogen a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at —5° C. and diluted with water. The solid which forms is collected by filtration, washed with water and dried under vacuum to yield 21-acetoxy-5α-Δ$^{16}$-pregnene-3,11,20-trione which may be further purified by recrystallization from acetone:hexane.

To a stirred solution of 1 g. of 21-acetoxy-5α-Δ$^{16}$-pregnene-3,11,20-trione in 10 ml. of dimethyl diethylene glycol ether, heated at reflux, is added in a dropwise fashion a 1:2 w./v. solution of sodium chlorodifluoroacetate in dimethyl diethylene glycol ether. When the U.V. spectra show no change upon the introduction of 5 additional equivalents of reagent, the refluxing is discontinued and the mixture filtered and evaporated to dryness. The residue is chromatographed on alumina with methylene chloride to yield 16α,17α-difluoromethylene-5α-pregnane-3,11-20-trione.

Two equivalents of bromine in 15 ml. of glacial acetic acid are added dropwise to a solution of 1 g. of 16α,17α-difluoromethylene-21-acetoxy-5α-pregnane - 3,11,20 - trione in 25 ml. of acetic acid containing a few drops of 4 N hydrogen bromide in acetic acid. After being allowed to stand for five hours at room temperature, the mixture is poured into ice water and the solid which forms is collected by filtration, washed well with water and dried. This material is then refluxed for 14 hours with 2 g. of sodium iodide in 40 ml. of 2-butanone, allowed to stand at room temperature for 12 hours, diluted with water, and extracted with ether. These extracts are washed with sodium thiosulfate solution and water and evaporated under reduced pressure. The residue is combined with 10 ml. of colidine and refluxed for 30 minutes. The cooled solution is filtered and the filtrate is diluted with ether, washed with dilute hydrochloric acid, aqueous sodium bicarbonate solution and water. The dried organic phase is evaporated to yield 16α,17α-difluoromethylene-21-acetoxy-Δ⁴-pregnene-3,11,20-trione which is recrystallized from ether:hexane.

*Example 40*

To a suspension of 1 g. of 16α,17α-difluoromethylene-21-acetoxy-Δ⁴-pregnene-3,11,20-trione in 7.5 ml. of anhydrous peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy - 16α,17α - difluoromethylene-21-acetoxy-Δ³,⁵⁽⁶⁾-pregnadiene-11,20-dione which is recrystallized from acetone:hexane.

A stream of perchloryl fluoride is passed through a solution of 1 g. of 3-ethoxy-16α,17α-difluoromethylene-21-acetoxy-Δ³,⁵⁽⁶⁾-pregnadiene-11,20-dione in 25 ml. of dimethylformamide, cooled to 0° C., for 5 minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro isomers. The latter, which predominates, is dissolved in 50 ml. of glacial acetic acid and through this solution is passed a stream of dry hydrogen chloride for a period of 24 hours and at a temperature of 15° C. The mixture is poured into cold water and the solid which forms is collected by filtration, washed with water and dried to yield 6α-fluoro-16α,17α-difluoromethylene - 21 - acetoxy-Δ⁴-pregnene - 3,11,20-trione which is recrystallized from acetone:hexane.

*Example 41*

To a suspension of 1 g. of 6α-fluoro-16α,17α-difluoromethylene-21-acetoxy-Δ⁴-pregnene-3,11,20-trione in 27 ml. of methanol and 1 ml. of water, under nitrogen, is added 1.4 g. of semicarbazide hydrochloride and 0.74 g. of sodium bicarbonate. The mixture is heated at reflux for three hours and then at 45° C. for 20 hours. The suspension is cooled and 36 ml. of water are slowly added to it. The solid is collected by filtration, washed with water and dried to yield 6α-fluoro-16α,17α-difluoromethylene-21-acetoxy-Δ⁴-pregnen-11-one-3,20 - bis semicarbazone which is recrystallized from pyridine:methanol.

A solution of 1 g. of sodium borohydride in 3 ml. of water is added to an ice-cooled solution of 1 g. of 6α-fluoro-16α,17α-difluoromethylene - 21 - acetoxy-Δ⁴-pregnen-11-one-3,20-bis semicarbazone in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 6α-fluoro-16α,17α-difluoromethylene-21-acetoxy-Δ⁴-pregnen-11β-ol-3,20-bis semicarbazone which may be further purified by recrystallization from acetone:hexane.

A solution of 2 g. of 6α-fluoro-16α,17α-difluoromethylene-21-acetoxy-Δ⁴-pregnen-11β-ol - 3,20 - bis semicarbazone in 15 ml. of acetic anhydride and 40 ml. of pyridine is warmed for one hour at 75° C., allowed to stand at 25° C. for 18 hours, and then poured into water. The solid which forms is collected by filtration and chromatographed on Florisil absorbent to yield 6α-fluoro-16α,17α-difluoromethylene-21-acetoxy-Δ⁴ - pregnen - 11β-ol-3,20-dione which may be further purified by recrystallization from acetone:hexane.

One gram of 6α-fluoro-16α,17α-difluoromethylene-21-acetoxy-Δ⁴-pregnen-11β-ol-3,20-dione is dissolved with slow heating in 12.5 ml. of dimethylformamide. To the cooled mixture is then added 0.42 g. of methanesulfonyl chloride and 0.5 ml. of pyridine. After heating the reaction mixture at 80° C. for 30 minutes it is cooled, diluted with water and extracted with ethyl acetate. The extracts are washed with water, dried over sodium sulfate and evaporated to yield 6α-fluoro-16α,17α-difluoromethylene - 21 - acetoxy-Δ⁴,⁹⁽¹¹⁾-pregnadien-3,20 - dione which may be further purified by recrystallization from acetone:hexane.

Twenty-eight grams of N-bromoacetamide are added over a one hour period with stirring, in the dark and at room temperature, to a mixture of 50 g. of 6α-fluoro-16α,17α - difluoromethylene - 21 - acetoxy-Δ⁴,⁹⁽¹¹⁾-pregnadien-3,20-dione, 500 ml. of pure dioxane and 8 ml. of 0.4 N perchloric acid. The reaction mixture is stirred for an additional hour and a solution of 10% sodium sulfite is then added until negative to potassium iodide-starch indicator paper. Ice is added and the mixture extracted with chloroform. These extracts are washed consecutively with water, 5% aqueous sodium bicarbonate solution and water, and the solvent then removed by distillation in vacuo. The residue is triturated with acetone to yield the bromohydrin intermediate.

A mixture of 20 g. of anhydrous potassium acetate and 200 ml. of acetone is heated almost to boiling and a solution of 17 g. of the bromohydrin intermediate in 200 ml. of acetone is then slowly added with stirring. The mixture is refluxed for 10 hours, cooled and almost all of the acetone is removed by distillation. Iced water is then added and the solid which forms collected by filtration, washed with water and dried, to yield 6α-fluoro-9β,11β-oxido-16α,17α-difluoromethylene-21-acetoxy - Δ⁴ - pregnene-3,20-dione.

To 0.22 g. of anhydrous hydrogen fluoride, cooled in an acetone-dry ice bath, are slowly added with stirring 2.8 ml. of boron trifluoride etherate. To a solution of 1 g. of 6α-fluoro - 9β,11β - oxido-16α,17α-difluoromethylene-21-acetoxy-Δ⁴-pregnene-3,20-dione in 5 ml. of benzene and 5 ml. of ether is added 1.3 ml. of the fluoroboric acid reagent. This mixture is allowed to stand for three hours at room temperature and is then washed four times with water, dried over anhydrous sodium sulfate and evaporated under reduced pressure to yield 6α,9α-difluoro-16α,17α-difluoromethylene-21-acetoxy-Δ⁴-pregnen - 11β-ol-3,20-dione which is recrystallized from acetone:hexane.

A mixture of 0.5 g. of 6α,9α-difluoro-16α,17α-difluoromethylene-21-acetoxy-Δ⁴-pregnen-11β-ol-3,20 - dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 6α,9α-difluoro - 16α,17α - difluoromethylene - 21- acetoxy-Δ⁴-pregnadien-11β-ol-3,20-dione which is further purified by recrystallization from acetone:hexane.

A solution of 1 g. of 6α,9α-difluoro-16α,17α-difluoromethylene-21-acetoxy-Δ¹,⁴-pregnadien-11β - ol-3,20-dione in 50 ml. of methanol is heated at reflux for 3 hours with a solution of potassium hydroxide in 1 ml. of water. The reaction mixture is then poured into ice water and the solid which forms collected by filtration, washed with water to neutrality and dried to yield 6α,9α-difluoro-16α,17α - difluoromethylene-Δ¹,⁴ - pregnadiene - 11β,21-diol-3,20-dione which is recrystallized from methylene chloride:ether.

*Example 42*

Upon treating Δ¹⁶-pregnene-3,20-dione with sodium chlorodifluoroacetate in the manner described in Example 41, there is obtained 16α,17α-difluoromethylene pregnane-3,20-dione.

To a stirred solution of 1 g. of 16α,17α-difluoromethylene pregnane-3,20-dione in 17 ml. of chloroform and 20 ml. of glacial acetic acid, cooled to −10° C., are added a few drops of a 15% solution of hydrogen bromide in acetic acid followed by a solution of 0.46 g. of bromine in 12 ml. of chloroform, the latter at such a rate that the reaction mixture maintains a pale yellow color. A cold solution of 2.5 g. of sodium acetate in 17 ml. of water is then added. The layers are separated and the aqueous layer is extracted with chloroform. The combined extracts and organic layer are washed with water, dilute potassium bicarbonate solution and with water, dried over sodium sulfate and evaporated to dryness to yield the 4-bromo intermediate, 1 g. of which is dissolved in 20 ml. of dimethylformamide containing 0.5 g. of lithium chloride. This solution is stirred under nitrogen at steam bath temperatures for four hours. After cooling to 10° C., 11 ml. of water are added with stirring at such a rate that the temperature is maintained below 30° C. Stirring in an ice bath is continued until solid forms and this material is then collected by filtration, washed with cold 1:1 water:dimethylformamide and then water and dried to yield 16α,17α-difluoromethylene-Δ⁴-pregnene-3,20-dione which is further purified through recrystallization from acetone with charcoal decolorization as necessary.

One gram of 16α, 17α-difluoromethylene-Δ⁴-pregnene-3,20-dione and 2 g. of chloranil in 50 ml. of t-butanol are heated at reflux for 8 hours. The cooled reaction mixture is filtered and the solid thus separated is washed with a large volume of ethyl acetate. The combined filtrate and washings are in turn washed with cold 10% aqueous sodium hydroxide until the washings are colorless, dried over sodium sulfate and evaporated to dryness to yield 16α,17α-difluoromethylene-Δ⁴,⁶-pregnadiene - 3,20 - dione which may be further purified through clarification with alumina and recrystallization from methylene chloride:ether.

A solution of 3 g. of 16α,17α-difluoromethylene-Δ⁴,⁶-pregnadiene-3,20-dione in 200 ml. of methylene chloride is mixed with 200 ml. of a 5.5% ethereal solution of monoperphthalic acid. The mixture is allowed to stand for 48 hours at room temperature and then washed with 5% aqueous sodium carbonate solution and with water, dried over sodium sulfate and concentrated until solidification begins. Upon cooling, the solid which forms is collected by filtration and air dried to yield 6α,7α-oxido-16α,17α-difluoromethylene-Δ⁴-pregnene-3,20-dione which may be further purified by recrystallization from acetone:hexane.

To a suspension of 1 g. of 6α,7α-oxido-16α,17α-difluoromethylene-Δ⁴,⁶-pregnadiene-3,20-dione in 10 ml. of glacial acetic acid are added 0.75 ml. of concentrated hydrochloric acid. The mixture is heated at steam bath temperatures for 20 minutes and then poured into iced salt water. The solid which forms is collected by filtration, washed well with water to neutrality, dried and recrystallized from methylene chloride:ether to yield 6-chloro-16α,17α-difluoromethylene-Δ⁴,⁶-pregnadiene-3,20-dione.

*Example 43*

A solution of 6 g. of 6α,7α-difluoromethylene-9α-fluoro-16α - methyl-17α,20;20,21-bismethylenedioxy-Δ⁴-pregnen-11β-ol-3-one in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 6α,7α - difluoromethylene-9α-fluoro-16α-methyl-17α,20;20, 21-bis methylenedioxy-Δ⁴-pregnene-3,11-dione which may be further purified by recrystallization from acetone: hexane.

To a stirred solution of 3 g. of 6α,7α-difluoromethylene-9α-fluoro-16α-methyl-17α,20;20,21-bis methylenedioxy-Δ⁴-pregnene-3,11-dione in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum and suspended in aqueous hydrochloric acid. This suspension is stirred at room temperature for half an hour and then filtered. The solid thus collected is washed with water and dried to yield 2-hydroxymethylene - 6α,7α-difluoromethylene-9α-fluoro-16α-methyl-17α,20;20,21-bis methylenedioxy - Δ⁴ - pregnene-3,11-dione which is recrystallized from methylene chloride:hexane.

A suspension of 1 g. of 2-hydroxymethylene-6α,7α-difluoromethylene - 9α - fluoro-16α-methyl-17α,20;20,21-bis methylenedioxy-Δ⁴-pregnene-3,11-dione in 45 ml. of absolute ethanol is treated with 0.38 ml. of hydrazine hydrate under nitrogen. The mixture is quickly heated to reflux temperature and held there for 1 hour. At the end of this time, the mixture is evaporated to dryness. The residue is treated with water and filtered to yield 6α,7α-difluoromethylene - 9α - fluoro-11-oxo-16α-methyl-17α,20; 20,21 - bis methylenedioxy - Δ⁴ - pregneno-[3,2-c]pyrazole which may be further purified through recrystallization from ethanol.

A solution of 1 g. of sodium borohydride in 3 ml. of water is added to an ice-cooled solution of 1 g. of 6α,7α-difluoromethylene - 9α - fluoro-11-oxo-16α-methyl-17α,20; 20,21-bis methylenedioxy-Δ⁴-pregneno-[3,2-c]pyrazole in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 6α,7α-difluoromethylene-9α - fluoro - 11β - hydroxy-16α-methyl-17α,20;20,21-bis methylenedioxy-Δ⁴-pregneno-[3,2-c]pyrazole which may be further purified by recrystallization from acetone: hexane.

A suspension of 1 g. of 6α,7α-difluoromethylene-9α-fluoro - 11β - hydroxy - 16α - methyl - 17α,20;20,21 - bis methylenedioxy - Δ⁴ - pregneno - [3,2-c]pyrazole in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 6α, 7α-difluoromethylene-9α-fluoro-11β,17α-21 - trihydroxy - 16α - methyl - 20 - oxo - Δ⁴ - pregneno-[3,2-c]pyrazole which may be further purified through recrystallization from isopropanol.

To a cooled solution (0° C.) of 3.4 g. of 6α,7α-difluoromethylene - 9α - fluoro - 11β,17α,21 - trihydroxy - 16α-methyl-20-oxo-Δ⁴-pregneno-[3,2-c]pyrazole in 20 ml. of 9:1 chloroform:pyridine is added in small portions 1.4 g. of methanesulfonyl chloride. The reaction mixture is allowed to stand for 14 hours at 0° C. and is then washed with dilute hydrochloric acid, water and sodium bicarbonate solution. The chloroform removed by evaporation under reduced pressure and the residue is dissolved in 20 ml. of acetone treated at room temperature and under stirring with 4 g. of sodium iodide. Sodium thiosulfate solution is added to decolorize the mixture, followed by the addition of water. The solid which forms is collected by filtration and dried in vacuum to yield 6α,7α-difluoromethylene - 9α - fluoro - 11β,17α - dihydroxy - 16α - methyl - 20 - oxo - 21 - iodo - Δ⁴ - pregneno - [3,2-c]pyrazole. This material is dissolved in 20 ml. of acetonitrile and treated dropwise with 1.4 g. of silver fluoride in 3 ml. of water. The mixture is allowed to stand at room temperature for 24 hours and then filtered. The filtrate is concentrated under vacuum and the solid which forms is collected and dried to yield 6α,7α-difluoromethylene-9α, 21 - difluoro - 11β,17α - dihydroxy - 16α - methyl - 20-oxo-Δ⁴-pregneno-[3,2-c]pyrazole which is recrystallized from methanol:acetone.

*Example 44*

Two milliliters of dihydropyran are added to a solution of 1 g. of 6α,7α-difluoromethylene-9α,11β-dichloro-16α, 17α-isopropylidenedioxy-Δ⁴-pregnen-21-ol-3,20 - dione in 15 ml. of benzene. About 1 ml. is removed by distillation to remove moisture and 0.4 g. of p-toluene sulfonic acid is added to the cooled solution. This mixture is allowed to stand at room temperature for 4 days, and is then washed with aqueous sodium carbonate solution and water, dried and evaporated. The residue is chromatgraphed on neutral alumina, eluting with hexane, to yield 6α,7α - difluoromethylene-9α,11β-dichloro-16α,17α-isopropylidenedioxy - 21 - tetrahydropyranyloxy - Δ⁴-pregnene-3,20-dione which is recrystallized from pentane.

To a stirred solution of 3 g. of 6α,7α-difluoromethylene-9α,11β - dichloro - 16α,17α -isopropylidenedioxy - 21-tetrahydropyranyloxy-Δ⁴-pregnene-3,20-dione in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum and suspended in aqueous hydrochloric acid. This suspension is stirred at room temperature for half an hour and then filtered. The solid thus collected is washed with water and dried to yield 2-hydroxymethylene-6α,7α - difluoromethylene - 9α, 11β - dichloro - 16α,17α -isopropylidenedioxy - 21 - tetrahydropyranyloxy-Δ⁴-pregnene-3,20-dione which is recrystallized from methylene chloride:hexane.

To 1.5 g. of 2-hydroxymethylene-6α,7α-difluoromethylene - 9α,11β - dichloro - 16α,17α - isopropylidenedioxy - 21 - tetrahydropyranyloxy - Δ⁴ - pregnene - 3,20 - dione in 18 ml. of absolute ethanol is added 0.45 ml. of p-fluorophenylhydrazine under nitrogen. The mixture is refluxed for 45 minutes, cooled and filtered to yield predominantly 6α,7α - difluoromethylene - 9α,11β - dichloro-16α,17α - isopropylidenedioxy - 20 - oxo - 21 - tetrahydropyranyloxy - 2' - (p - fluorophenyl) - Δ⁴ - pregneno-[3,2-c]pyrazole which is further purified through recrystallization from acetone:hexane.

To a solution of 1 g. of 6α,7α-difluoromethylene-9α,11β-dichloro - 16α,17α - isopropylidenedioxy - 20 - oxo - 21-tetrahydropyranyloxy - 2' - (p - fluorophenyl) - Δ⁴ - pregneno-[3,2-c]pyrazole in 30 ml. of acetic acid is added 0.5 ml. of 2 N hydrochloric acid. The mixture is allowed to stand 5 hours at room temperature and then diluted with ice water and extracted with methylene chloride. The extracts are washed with water to neutrality, dried over sodium sulfate and evaporated to dryness to yield 6α,7α-difluoromethylene - 9α,11β - dichloro - 16α,17α - isopropylidenedioxy - 20 - oxo - 21 - hydroxy - 2' - (p - fluorophenyl)-Δ⁴-pregneno-[3,2-c]pyrazole which is recrystallized from acetone:hexane.

Similarly by utilizing 6α,7α - difluoromethylene-9α-fluoro-16α,17α-isopropylidenedioxy-Δ⁴-pregnene - 11β,21-diol-3,20-dione in the procedure of this example, there is obtained 6α,7α - difluoromethylene - 9α - fluoro - 11β,21-dihydroxy - 16α,17α - isopropylidenedioxy - 20 - oxo - 2'-(p - fluorophenyl) - Δ⁴ - pregneno - [3,2-c]pyrazole.

*Example 45*

To a stirred solution of 3 g. of 6α,9α-difluoro-16α,17α-difluoromethylene - 21 - acetoxy - Δ⁴ - pregnen - 11β - ol-3,20-dione in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum and suspended in aqueous hydrochloric acid. This suspension is stirred at room temperature for half an hour and then filtered. The solid thus collected is washed with water and dried to yield 2-hydroxymethylene-6α,9α-difluoro - 16α,17α - difluoromethylene - 21 - acetoxy - Δ⁴-pregnen-11β-ol-3,20-dione which is recrystallized from methylene chloride:hexane.

A suspension of 1 g. of 2-hydroxymethylene-6α,9α-difluoro - 16α,17α - difluoromethylene - 21 - acetoxy - Δ⁴-pregnen-11β-ol-3,20-dione in 15 ml. of absolute ethanol is treated under nitrogen with 0.3 ml. of phenylhydrazine. The mixture is refluxed for 40 minutes, cooled and filtered to yield predominantly 6α,9α-difluoro-11β-hydroxy-20-oxo - 16α,17α - difluoromethylene - 21 - acetoxy - 2'-phenyl-Δ⁴-pregneno-[3,2-c]pyrazole.

*Example 46*

A mixture of 5 g. of 6α,7α-difluoromethylene-9α-fluoro-16α-methyl-17α,20;20,21-bis methylenedioxy-Δ⁴-pregnen-11β-ol-3-one in 40 ml. of anhydrous thiophene-free benzene, 2 ml. of ethyl formate and 1.5 g. of sodium hydride is stirred for 8 hours under nitrogen. The solid which forms is collected by filtration, washed with benzene and then hexane and dried in vacuo. This material is then cautiously added in portions to excess ice-cold dilute hydrochloric acid with stirring. The solid which forms is collected by filtration, washed with water and air dried. One gram of the product in 15 ml. of methanol is hydrogenated with 0.4 g. of prehydrogenated 10% palladium carbon catalyst at 25° C. atmospheric pressure until two moles of hydrogen are absorbed. The mixture is then filtered, the catalyst is washed with hot methanol and the combined solutions are evaporated to dryness to yield 2α,16α - dimethyl - 6α,7α - difluoromethylene - 9α - fluoro-17α,20;20,21 - bis methylenedioxy-Δ⁴-pregnene-11β-ol-3-one which is recrystallized from acetone:hexane.

One gram of 2α,16α-dimethyl-6α,7α-difluoromethylene-9α-fluoro-17α,20;20,21-bis methylenedioxy - Δ⁴-pregnene-11β-ol-3-one in 20 ml. of 60% formic acid is heated at steam bath temperature for one hour. The mixture is cooled, diluted with water and filtered. The solid thus collected is washed with water, dried and recrystallized from acetone:hexane to yield 2α,16α-dimethyl-6α,7α-difluoromethylene - 9α - fluoro - Δ⁴ - pregnene - 11β,17α,21 - triol-3,20-dione.

*Example 47*

A stirred solution of .19 g. of 6α,7α-difluoromethylene-17α-acetoxy-Δ⁴-pregnene-3,20-dione in 5 ml. of acetic acid is heated at reflux for 1 hour with several portions of zinc dust. The mixture is then stirred at room temperature for 1 hour, filtered, the residue being washed with acetic acid, and diluted with 10 ml. of water. This mixture is extracted with methylene chloride and the methylene chloride extracts are in turn washed with water, 2N sodium bicarbonate solution, and water. After drying this organic solution over magnesium sulfate, it is evaporated to dryness, and chromatographed on alumina with hexane: methylene chloride followed by methylene chloride:ethyl acetate to yield 7α-difluoromethyl-17α-acetoxy-Δ⁴-pregnene-3,20-dione.

We claim:
1. The process for the introduction into a steroid molecule having at least one keto group and carbon-carbon unsaturation in conjugation with the keto group, of a fused halocyclopropyl group through the addition of a halomethylene radical across the conjugated double bond most remote to the keto group which comprises treating the steroid with an alkali metal salt of an acid of the formula W—CXY—COOH in which W is chloro, bromo, or iodo, X is chloro or fluoro and Y is hydrogen, chloro or fluoro, in the presence of an inert anhydrous polar organic solvent and at a temperature above that causing decomposition of the salt.

2. The process of claim 1 wherein X and Y are both cholro and the reaction is conducted at a temperature above 80° C.

3. The process of claim 1 wherein X and Y are both fluoro and the reaction is conducted at a temperature above 150° C.

4. The process for the preparation of a 1α,2α-dihalomethylene-3-keto steroid wherein the halogen atoms are chloro or fluoro which comprises treating a 3-keto-Δ¹-steroid with the sodium or potassium salt of trichloroacetic acid or chlorodifluoroacetic acid respectively in an inert anhydrous polar organic solvent and at a temperature above that causing decomposition of the salt.

5. The process for the preparation of a 3-keto-6α,7α-dihalomethylene-Δ⁴-steroid or 3-keto-6α,7α-dihalomethylene-Δ¹,⁴-steroid wherein the halogen atoms are chloro or fluoro which comprises treating a 3-keto-Δ⁴,⁶-steroid or 3-keto-Δ¹,⁴,⁶-steroid with the sodium or potassium salt of trichloroacetic acid or chlorodifluoroacetic acid respectively in an inert anhydrous polar organic solvent and at a temperature above that causing decomposition of the salt.

6. The process for the preparation of a 1α,2α-difluoromethylene - 3 - ketopregnane; 1α,2α-difluoromethylene-3-keto-19-norpregnane; 1α,2α - difluoromethylene-3-ketoandrostane; 1α,2α-difluoromethylene-3-ketoestrane or 1α,2α-difluoromethylene-3-keto-18-methylestrane which comprises treating the corresponding 3-keto-Δ¹-steroid with sodium chlorodifluoroacetate at a temperature above 150° C. and in the presence of an inert anhydrous polar organic solvent.

7. The process for the preparation of a 6α,7α-difluoromethylene-3-keto-Δ⁴-pregnene, 6α,7α-difluoromethylene-3-keto-19-nor-Δ⁴-pregnene, 6α,7α-difluoromethylene-3-keto-Δ⁴-androstene, 6α,7α-difluoromethylene-3-keto-Δ⁴-estrene which comprises treating the corresponding 3-keto-Δ⁴,⁶-steroid with sodium chlorodifluoroacetate at a temperature above 150° C. and in the presence of an inert anhydrous polar organic solvent.

8. The process for the preparation of a 6α,7α-difluoromethylene 3-keto - Δ¹,⁴ - pregnadine or 6α,7α - difluoromethylene-3-keto - Δ¹,⁴ - androstadiene which comprises treating the corresponding 3-keto-Δ¹,⁴,⁶-triene with sodium chlorodifluoroacetate at a temperature above 150° C. and in the presence of an inert anhydrous organic solvent.

9. A compound having the formula:

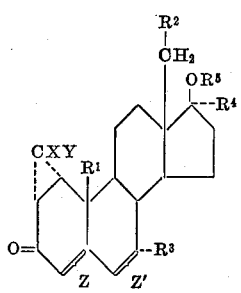

wherein each of $R^1$, $R^2$ and $R^3$ is hydrogen or methyl;
$R^4$ is hydrogen or an alkyl, alkenyl, alkynyl, or haloalkynyl group of less than 6 carbon atoms;
$R^5$ is hydrogen, tetrahydropyranyloxy or a hydrocarbon carboxylic acyl group of less than 12 carbon atoms;
Z and Z' are each a carbon-carbon double bond or a carbon-carbon single bond, Z being a double bond when Z' is a double bond;
X is chloro or fluoro; and
Y is hydrogen, chloro or fluoro.

10. Compounds according to claim 9 wherein each of X and Y is fluoro.

11. Compounds of the formula:

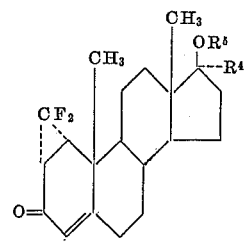

wherein
$R^4$ is an alkyl, alkenyl, alkynyl or haloalkynyl group of less than 6 carbon atoms and
$R^5$ is hydrogen, tetrahydropyranyl or hydrocarbon carboxylic acyl group of less than 12 carbon atoms.

12. Compounds of the formula:

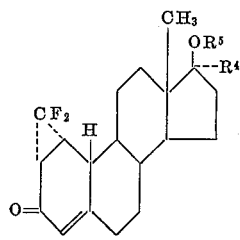

wherein
$R^4$ is an alkyl, alkenyl, alkynyl or haloalkynyl group of less than 6 carbon atoms and
$R_5$ is hydrogen, tetrahydropyranyl or a hydrocarbon carboxylic acyl group of less than 12 carbon atoms.

13. Compounds of the formula:

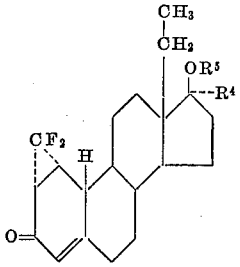

wherein
$R^4$ is an alkyl, alkenyl, alkynyl or haloalkynyl group of less than 6 carbon atoms and
$R^5$ is hydrogen, tetrahydropyranyl or a hydrocarbon carboxylic acyl group of less than 12 carbon atoms.

14. 1α,2α - difluoromethylene-17α-methyl-Δ⁴-androsten-17β-ol-3-one.

15. 1α,2α - difluoromethylene - 7α,17α - dimethyl-Δ⁴-androsten-17β-ol-3-one.

16. 1α,2α-difluoromethylene - 7α,17α - dimethyl - Δ⁴-estren-17β-ol-3-one.

17. 1α,2α - difluoromethylene - 17α-ethynyl-18-methyl-Δ⁴-estren-17β-ol-3-one.

18. 1α,2α - difluoromethylene - 17α-ethynyl-Δ⁴-estren-17β-ol-3-one.

19. 1α,2α - difluoromethylene - 7α - methyl-17α-ethynyl-Δ⁴-estren-17β-ol-3-one.

20. 1α,2α - difluoromethylene - 7α,17α,18-trimethyl-Δ⁴-stren-17β-ol-3-one.

21. 1α,2α - difluoromethylene - 17α - chloroethynyl-Δ⁴-estren-17β-ol-3-one.

22. 1α,2α - difluoromethylene-17α-ethyl-18-methyl-Δ⁴-estren-17β-ol-3-one.

No references cited.

LEWIS GOTTS, *Primary Examiner*.
H. A. FRENCH, *Assistant Examiner*.